(12) United States Patent
Drijfhout

(10) Patent No.: US 10,072,179 B2
(45) Date of Patent: Sep. 11, 2018

(54) VINYL FUNCTIONALIZED URETHANE RESINS FOR POWDER COATING COMPOSITIONS

(71) Applicant: DSM IP ASSETS B.V., Heerlen (NL)

(72) Inventor: Jan Pieter Drijfhout, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/786,277

(22) PCT Filed: Apr. 22, 2014

(86) PCT No.: PCT/EP2014/058056
§ 371 (c)(1),
(2) Date: Oct. 22, 2015

(87) PCT Pub. No.: WO2014/173861
PCT Pub. Date: Oct. 30, 2014

(65) Prior Publication Data
US 2016/0068707 A1    Mar. 10, 2016

(30) Foreign Application Priority Data

Apr. 26, 2013 (EP) .................................... 13165556

(51) Int. Cl.
| | | |
|---|---|---|
| C09D 175/14 | (2006.01) | |
| C08G 18/32 | (2006.01) | |
| C08G 18/28 | (2006.01) | |
| C08G 18/34 | (2006.01) | |
| C08L 75/14 | (2006.01) | |
| B29C 35/08 | (2006.01) | |
| C09D 5/03 | (2006.01) | |
| B05D 1/06 | (2006.01) | |
| B05D 3/04 | (2006.01) | |
| B29C 37/00 | (2006.01) | |
| B29C 41/22 | (2006.01) | |
| C08G 18/73 | (2006.01) | |

(Continued)

(52) U.S. Cl.
CPC ............. *C09D 175/14* (2013.01); *B05D 1/06* (2013.01); *B05D 3/0413* (2013.01); *B29C 35/08* (2013.01); *B29C 37/0028* (2013.01); *B29C 41/22* (2013.01); *C08F 283/00* (2013.01); *C08F 299/065* (2013.01); *C08G 18/2835* (2013.01); *C08G 18/3206* (2013.01); *C08G 18/341* (2013.01); *C08G 18/6715* (2013.01); *C08G 18/73* (2013.01); *C08L 75/14* (2013.01); *C09D 5/03* (2013.01); *C09D 167/06* (2013.01); *C09D 175/16* (2013.01); *B29C 2035/0827* (2013.01); *B29C 2035/0877* (2013.01); *B29C 2037/0039* (2013.01); *B29K 2075/00* (2013.01); *C08G 2150/20* (2013.01); *C08L 2205/025* (2013.01)

(58) Field of Classification Search
CPC ................... B05D 1/06; B05D 3/0413; B29C 2035/0827; B29C 2035/0877; B29C 2037/0039; B29C 35/08; B29C 37/0027; B29C 41/22; B29K 2075/00; C08F 283/00; C08F 299/065; C08G 18/2835; C08G 18/3206; C08G 18/341; C08G 18/6715; C08G 18/73; C08G 2150/20; C08L 2205/025; C08L 75/14; C09D 167/06; C09D 175/14; C09D 175/16; C09D 5/03; Y10T 428/31551
USPC ...... 525/191; 528/65, 75, 76, 85; 428/423.1; 427/551, 553, 595, 384
See application file for complete search history.

(56) References Cited

U.S. PATENT DOCUMENTS

| | | |
|---|---|---|
| 4,751,273 A | 6/1988 | Lapin et al. |
| 5,159,098 A | 10/1992 | Plotkin et al. |

(Continued)

FOREIGN PATENT DOCUMENTS

| | | |
|---|---|---|
| EP | 0431656 | 6/1991 |
| EP | 0 636 669 | 2/1995 |

(Continued)

OTHER PUBLICATIONS

International Search Report for PCT/EP2014/058056, dated Jun. 2, 2014, 4 pages.

*Primary Examiner* — Thao T Tran
(74) *Attorney, Agent, or Firm* — Nixon & Vanderhye P.C.

(57) ABSTRACT

The invention relates to a vinyl functionalized urethane resin (VFUR) useful as a curing agent in thermosetting powder coating compositions, a process for making said vinyl functionalized urethane resin, a vinyl functionalized urethane resin composition (VFURC) useful as a curing agent in thermosetting powder coating compositions, a process for making vinyl functionalized urethane resin composition, a thermosetting powder coating composition (TPCC), a process for the preparation thereof, a cured thermosetting powder coating composition, processes for coating an article with said thermosetting powder coating composition and an article coated with said thermosetting powder coating composition as well as uses of the vinyl functionalized urethane resin or of the vinyl functionalized urethane resin composition or of the thermosetting powder coating composition or of the articles having coated and cured thereon said thermosetting powder coating composition. The invention relates also to thermosetting powder coating composition useful for powder-in-mold coating articles such as reinforced polymeric e.g. polyester resin articles and to powder-in-mold coating methods employing the thermosetting powder coating composition and use of the in-mold coated article.

82 Claims, No Drawings

(51) Int. Cl.
  *C08G 18/67* (2006.01)
  *C09D 167/06* (2006.01)
  *C08F 283/00* (2006.01)
  *C09D 175/16* (2006.01)
  *C08F 299/06* (2006.01)
  *B29K 75/00* (2006.01)

(56) References Cited

U.S. PATENT DOCUMENTS

| | | | |
|---|---|---|---|
| 5,304,332 | A | 4/1994 | Richart |
| 5,480,726 | A | 1/1996 | Richart |
| 5,703,198 | A | 12/1997 | Twigt et al. |
| 6,005,017 | A | 12/1999 | Daly et al. |
| 6,028,212 | A | 2/2000 | Shah et al. |
| 6,048,949 | A | 4/2000 | Muthiah et al. |
| 6,194,525 | B1 | 2/2001 | Ortiz et al. |
| 6,235,228 | B1 | 5/2001 | Nicholl et al. |
| 6,291,541 | B1 | 9/2001 | Shah et al. |
| 2003/0165766 | A1* | 9/2003 | Zhang ............... G03G 9/08764 430/124.1 |
| 2006/0058427 | A1* | 3/2006 | O'Neill ............... C09D 5/033 523/319 |
| 2011/0262637 | A1* | 10/2011 | Jansen ............... C09D 167/06 427/180 |
| 2011/0269908 | A1* | 11/2011 | Jansen ............... C09D 167/06 525/132 |

FOREIGN PATENT DOCUMENTS

| | | |
|---|---|---|
| EP | 0636669 | 2/1995 |
| EP | 0844286 | 5/1998 |
| EP | 0942050 | 9/1999 |
| EP | 0957141 | 11/1999 |
| EP | 0957142 | 11/1999 |
| EP | 0980901 | 2/2000 |
| EP | 1221452 | 12/2000 |
| EP | 1195392 | 4/2002 |
| EP | 1195393 | 4/2002 |
| EP | 1023353 | 2/2004 |
| EP | 1398357 | 3/2004 |
| EP | 1424142 | 6/2004 |
| EP | 1477534 | 11/2004 |
| JP | 47-026189 | 7/1972 |
| JP | 55-27324 | 2/1980 |
| WO | 90/03988 | 4/1990 |
| WO | 93/19132 | 9/1993 |
| WO | 97/27253 | 7/1997 |
| WO | 97/38034 | 10/1997 |
| WO | 99/14254 | 3/1999 |
| WO | 01/52290 | 7/2001 |
| WO | WO 02/100957 | 12/2002 |
| WO | 03/070794 | 8/2003 |
| WO | 2006/082080 | 8/2006 |
| WO | 2007/045609 | 4/2007 |
| WO | 2007/134736 | 11/2007 |
| WO | 2010/052290 | 5/2010 |
| WO | 2010/052291 | 5/2010 |
| WO | 2010/052293 | 5/2010 |
| WO | 2010/052294 | 5/2010 |
| WO | 2010/052295 | 5/2010 |
| WO | 2010/052296 | 5/2010 |
| WO | 2011/138431 | 11/2011 |
| WO | WO 2011/138432 | 11/2011 |
| WO | 2012/144838 | 10/2012 |
| WO | 2014/173861 | 10/2014 |

\* cited by examiner

VINYL FUNCTIONALIZED URETHANE RESINS FOR POWDER COATING COMPOSITIONS

This application is the U.S. national phase of International Application No. PCT/EP2014/058056 filed 22 Apr. 2014, which designated the U.S. and claims priority to EP Patent Application No. 13165556.5 filed 26 Apr. 2013, the entire contents of each of which are hereby incorporated by reference.

The invention relates to a vinyl functionalized urethane resin (VFUR) useful as a curing agent in thermosetting powder coating compositions, a process for making said vinyl functionalized urethane resin, a vinyl functionalized urethane resin composition (VFURC) useful as a curing agent in thermosetting powder coating compositions, a process for making vinyl functionalized urethane resin composition, a thermosetting powder coating composition (TPCC), a process for the preparation thereof, a cured thermosetting powder coating composition, processes for coating an article with said thermosetting powder coating composition and an article coated with said thermosetting powder coating composition as well as uses of the vinyl functionalized urethane resin or of the vinyl functionalized urethane resin composition or of the thermosetting powder coating composition or of the articles having coated and cured thereon said thermosetting powder coating composition. The invention relates also to thermosetting powder coating composition useful for powder-in-mould coating articles such as reinforced polymeric e.g. polyester resin articles and to powder-in-mould coating methods employing the thermosetting powder coating composition and use of the in-mould coated article.

Powder coating compositions (commonly referred to as "powders") which are dry, finely divided, free flowing, solid materials at room temperature and at atmospheric pressure, have gained considerable popularity in recent years over liquid coating compositions for a number of reasons. For one powder coatings are user and environmentally friendly materials since they are virtually free of harmful volatile organic solvents carriers that are normally present in liquid coating compositions. Therefore, powder coatings give off little, if any, volatile materials to the environment when cured. This eliminates the solvent emission problems associated with liquid coating compositions such as air pollution and dangers to the health of workers employed in coating operations. Powder coating compositions are also clean and convenient to use since they are applied in a clean manner over the substrate because they are in dry solid form. The powders are easily swept up in the event of a spill and do not require special cleaning and spill containment supplies, as do liquid coating compositions. Working hygiene is thus improved. Moreover, powder coating compositions are essentially 100% recyclable since the sprayed powders can be fully reclaimed and recombined with fresh powder feed. Recycling of liquid coatings during application is often not done, which leads to increased waste and hazardous waste disposal costs. In addition, powder coating compositions are ready to use, i.e., no thinning or dilution is required.

Powder coating compositions are typically applied on a substrate via an electrostatic spray process; the powder coating composition is dispersed in an air stream and passed through a corona discharge field where the particles acquire an electrostatic charge. The charged particles are attracted to and deposited on the grounded article to be coated. The article, usually at room temperature, is then placed in an oven where the powder melts and forms a powder coating. A hybrid process based on a combination of high voltage electrostatic charging and fluidized-bed application techniques (electrostatic fluidized bed) has evolved, as well as triboelectric spray application methods. Powder coating compositions and their process of application are the preferred coating compositions and process for coating many familiar items such as lawn and garden equipment, patio and other metal furniture, electrical cabinets, lighting, shelving and store fixtures, and many automotive components. Today, powder coating compositions are widely accepted, with thousands of installations in the factories of original equipment manufacturers (OEMS) and custom coating job shops.

Powder coating compositions can be thermosetting or thermoplastic. The invention relates to the field of thermosetting powder coating compositions (TPCC). The preparation of thermosetting powder coating compositions is described by Misev in "Powder Coatings, Chemistry and Technology" (pp. 224-300; 1991, John Wiley & Sons Ltd.).

As shown by the article "Overview of the powder coatings market worldwide" by G. Maggiore in Pitture e Vernice Europe 1/92, pp. 15-22 and by the lecture by D. Richart "Powder Coating: Current Developments, Future Trends" (Waterborne, High-Solids and Powder Coatings Symposium, Feb. 22-24, 1995), the search is still continuing for thermosetting powder coating compositions which can be cured with little thermal stress of the substrate and which consequently are suitable for use on heat-sensitive substrates such as, for example, wood and plastic.

Vinyl ether terminated urethane resins are extremely reactive and are known to undergo rapid polymerization when exposed to radiation. According to U.S. Pat. No. 6,291,541 B1 (column 1, lines 18-55) and to U.S. Pat. No. 6,028,212 (column 1, lines 14-54), these compounds are particularly useful as curing agents in applications which require high speed curing of a coating formulation such as radiation curable coating compositions. One disadvantage attendant to the use of such vinyl ether functionalized urethanes is that their commercial availability is relatively limited. In general the available vinyl ether terminated urethane resins constitute liquid or semi-solid (with extremely low Tg) materials. U.S. Pat. No. 4,751,273 provides specific examples of such liquid and semi-solid vinyl ether terminated urethane resins. Vinyl ether terminated urethane resins are typically used as curing agents, though extremely useful in liquid radiation curable coatings, have only limited use in thermosetting powder coating compositions and powder coatings. Typically because of their liquid or semi-solid state they cannot be used beyond a few percent (<5%) in powder coatings. Greater amounts typically cause the powder to block or sinter in storage which renders the powder unsprayable during electrostatic coating applications. Solid vinyl ether terminated urethane resins which are more conductive for use in radiation curable powder coatings have been proposed. EP 0636669 A provides one example of a crystalline vinyl ether functionalized urethane resin that remains a solid at room temperature (melt range of 90-108° C.). This resin is prepared from the reaction of 4-hydroxybutyl vinyl ether (HBVE) with hexamethylene diisocyanate (HDI) monomer in a 1:1 (stoichiometric) molar ratio of hydroxyl to isocyanate groups. The reaction product is a short chain crystalline urethane resin (HBVE-HDI-HBVE). U.S. Pat. No. 6,291,541 B1 (column 1, lines 50-55) and U.S. Pat. No. 6,028,212 (column 1, lines 48-54), further point out one serious disadvantage with the use of such a crystalline vinyl ether terminated urethane resin in powder coatings; the use of said crystalline vinyl ether terminated urethane resin in powder coatings makes manufacture of the powders extremely troublesome. Powders based on crystalline materials take longer to recrystallize after melt extrusion, making subsequent grinding and handling very messy and difficult. In order to overcome the aforementioned problem and provide thermosetting powder coating compositions comprising such reactive type of curing agents as the vinyl ether functionalized urethane resins, each of U.S. Pat. No. 6,291,541 B1 and U.S. Pat. No. 6,028,212 propose the use of an amorphous (non-crystalline) vinyl ether functionalized urethane resin of a specific chemical formula as depicted in claim 1 of each of U.S. Pat. No. 6,291,541 B1 and U.S. Pat. No. 6,028,212.

It would be thus desirable to obtain a thermosetting powder coating composition comprising a crystalline and highly reactive vinyl functionalized urethane resin, said powder coating composition having enhanced processability during and after the melt extrusion having for example less stickiness to the cooling rollers of an extruder and/or taking shorter time to recrystallize thus enabling easy manufacturing whilst preferably at the same time said powder coating composition can still be ground, flaked and sieved. Enhanced processability during and after the melt extrusion and/or taking shorter time to recrystallize thus enabling easy manufacturing whilst preferably at the same time said powder coating composition can still be ground, flaked and sieved are useful for commercially viable powders since said compositions can prepared in existing powder paint production lines without major investments in new equipment or fundamentally different processes. Furthermore, it would be desirable said powder coating composition to have good storage stability and upon curing provide powder coatings having acceptable smoothness, good flexibility so that said powder coatings may sustain substrate stresses without been delaminated and/or cracked, would also be desirable. Good flexibility is especially useful when the article to be powder coated has a complex three-dimensional shape and/or when a coating is used on furniture, such as wooden/metal chairs and kitchen cabinets. Additional coating film properties such as resistance to acetone and/or to coffee would also be desirable since liquids such as acetone, coffee are typical stains to coated articles. Furthermore it would be desirable that the scratch resistance of powder coatings is not significantly compromised, preferably is not compromised, even more preferably is enhanced. Moreover, it would be also desirable said powder coating composition to be curable at relatively low temperatures for example 80-150° C., preferably 80-130° C., thus been suitable for coating heat-sensitive articles.

It is therefore an object of the invention to address some or all of the problems and/or some or all of the desired properties identified herein.

Therefore, broadly in accordance with the invention there is provided a vinyl functionalized urethane resin (VFUR) wherein
  the VFUR is crystalline; and
  the VFUR has a $R_{VFUR}$ of at least 1.04 and of at most 1.80, whereas $R_{VFUR}$ is defined as the following ratio described in Formula I:

$R_{VFUR}$=[peak area of the chemical shift of the urethane proton ( . . . —NH— . . . ) of the urethane bonds ( . . . —NH—C(=O)—O— . . . ) in VFUR]/[peak area of the chemical shift of the methine proton ( . . . —CH= . . . ) of the vinyl groups ( . . . —CH=CH$_2$) in VFUR]  (Formula I)

and $R_{VFUR}$ is measured via $^1$H-NMR spectroscopy according to the method entitled "$^1$H-NMR method $R_{VFUR}$" described in the Examples.

Preferably, the vinyl functionalized urethane resin (VFUR) of the invention is prepared from
  at least a compound A comprising isocyanate groups; and
  at least a compound B comprising hydroxyl groups and said compound B is selected from the group consisting of compounds comprising vinyl ether groups (VET) and compounds comprising vinyl ester groups (VES) and compounds comprising vinyl ether and vinyl ester groups (VET-VES); and
  at least an organic compound C comprising hydroxyl groups.

Preferably the compound B is selected from the group consisting of a compound comprising vinyl ether groups (VET) and a compound comprising vinyl ester groups (VES). Preferably, the compound B is a compound comprising vinyl ether groups (VET). Preferably the compound B is a vinyl ether alcohol.

Preferably, the VFUR of the invention has a $R_{VFUR}$ of at least 1.06 and of at most 1.80.

Preferably, the VFUR of the invention has a $R_{VFUR}$ of at least 1.10 and of at most 1.80.

Preferably, the VFUR of the invention has a $R_{VFUR}$ of at least 1.10 and of at most 1.71.

Preferably, the VFUR of the invention has a $R_{VFUR}$ of at least 1.15 and of at most 1.80.

Preferably, the VFUR of the invention has a $R_{VFUR}$ of at least 1.15 and of at most 1.71.

Preferably, the VFUR of the invention has a $R_{VFUR}$ of at least 1.18 and of at most 1.45.

Preferably, the VFUR of the invention is solid at 23° C. and at atmospheric pressure.

In another aspect of the invention there is provided a process for making a VFUR of the invention, said process comprising the step of reacting a compound A, said compound A comprising isocyanate groups, with a compound B and an organic compound C, said compound B comprising hydroxyl groups and said compound B is selected from the group consisting of compounds comprising vinyl ether groups (VET), compounds comprising vinyl ester groups (VES), compounds comprising vinyl ether and vinyl ester groups (VET-VES), said organic compound C comprises hydroxyl groups, to afford the VFUR or alternatively said process comprising the steps of:
  reacting compound A with organic compound C to form an isocyanate terminated adduct of compound A with the organic compound C, and
  reacting the isocyanate terminated adduct of compound A with the organic compound C with compound B to afford said resin.

In another aspect of the invention there is provided a vinyl functionalized urethane resin composition (VFURC) comprising at least a first vinyl functionalized urethane resin (FVFUR) and a second vinyl functionalized urethane resin (SVFUR),
wherein
  at least one of the FVFUR or the SVFUR is crystalline; and
  the VFURC is crystalline; and
  the VFURC has a ratio $R_{VFURC}$ of at least 1.04 and at most 1.80, whereas $R_{VFURC}$ is defined as the following ratio described in Formula II:

$R_{VFURC}$=[peak area of the chemical shift of the urethane proton ( . . . —NH— . . . ) of the urethane bonds ( . . . —NH—C(=O)—O— . . . ) in VFURC]/[peak area of the chemical shift of the methine proton ( . . . —CH= . . . ) of the vinyl groups ( . . . —CH=CH$_2$) in VFURC]  (Formula II)

and $R_{VFURC}$ is measured via $^1$H-NMR spectroscopy according to the method entitled "$^1$H-NMR method $R_{VFURC}$" described in the Examples.

Preferably, in the vinyl functionalized urethane resin composition (VFURC) of the invention, at least one of the FVFUR or the SVFUR is prepared from:
  at least a compound A comprising isocyanate groups; and
  at least a compound B having hydroxyl groups and said compound B is selected from the group consisting of compounds comprising vinyl ether groups (VET) and compounds comprising vinyl ester groups (VES) and compounds comprising vinyl ether and vinyl ester groups (VET-VES); and
  at least an organic compound C comprising hydroxyl groups.

Preferably, the VFURC of the invention has a $R_{VFURC}$ of at least 1.06 and of at most 1.80.
Preferably, the VFURC of the invention has a $R_{VFURC}$ of at least 1.10 and of at most 1.80.
Preferably, the VFURC of the invention has a $R_{VFURC}$ of at least 1.10 and of at most 1.71.
Preferably, the VFURC of the invention has a $R_{VFURC}$ of at least 1.15 and of at most 1.80.
Preferably, the VFURC of the invention has a $R_{VFURC}$ of at least 1.15 and of at most 1.71.
Preferably, the VFURC of the invention has a $R_{VFURC}$ of at least 1.18 and of at most 1.45.
Preferably, the VFURC of the invention is solid at 23° C. and at atmospheric pressure.

In another aspect of the invention there is provided a process for making a vinyl functionalized urethane resin composition (VFURC) of the invention, said process comprising the steps of:
  providing a FVFUR;
  providing a SVFUR;
  mixing together the FVFUR and SVFUR to obtain said vinyl functionalized urethane resin composition (VFURC).

In another aspect of the invention there is provided a process for making a FVFUR or a SVFUR resin as defined herein, comprising the step of reacting compound A, said compound A comprising isocyanate groups, with a compound B and an organic compound C, said compound B comprising hydroxyl groups and said compound B is selected from the group consisting of compounds comprising vinyl ether groups (VET), compounds comprising vinyl ester groups (VES), compounds comprising vinyl ether and vinyl ester groups (VET-VES), said organic compound C comprises hydroxyl groups to afford said FVFUR or SVFUR, or alternatively said process comprising the steps:
  reacting compound A with organic compound C to form an isocyanate terminated adduct of compound A with the organic compound C, and
  reacting the isocyanate terminated adduct of compound A with the organic compound C with compound B to afford said FVFUR or SVFUR.

In another aspect of the invention there is provided a thermosetting powder coating composition comprising the vinyl functionalized urethane resin (VFUR) of the invention and/or the vinyl functionalized urethane resin composition (VFURC) of the invention and an unsaturated resin comprising ethylenic unsaturations (UR).

Preferably, in the thermosetting powder coating composition of the invention the ethylenic unsaturations are di-acid ethylenic unsaturations.

Preferably, in the thermosetting powder coating composition of the invention the di-acid ethylenic unsaturations are 2-butenedioic acid ethylenic unsaturations.

Preferably, in the thermosetting powder coating compositions of the invention the unsaturated resin comprising ethylenic unsaturations is selected from the group consisting of polyester resins, acrylic resins, polyurethanes, epoxy resins, polyamides, polyesteramides, polycarbonates, polyureas and combinations thereof.

Preferably, in the thermosetting powder coating compositions of the invention the unsaturated resin comprising ethylenic unsaturations is an unsaturated polyester resin comprising 2-butenedioic acid ethylenic unsaturations.

Preferably, the thermosetting powder coating composition of the invention further comprises a radical initiator and optionally: a) an accelerator and/or b) a co-accelerator and/or c) an inhibitor.

In another aspect of the invention, there is provided a process for making a thermosetting powder coating composition of the invention comprising the steps of:
  a. mixing the components of the thermosetting powder coating composition to obtain a premix;
  b. heating the premix, preferably in an extruder, to obtain an extrudate;
  c. cooling down the extrudate to obtain a solidified extrudate; and
  d. grinding the solidified extrudate into smaller particles to obtain the thermosetting powder coating composition.

In another aspect of the invention, there is provided a cured thermosetting powder coating composition of the invention; preferably, the cured thermosetting powder coating composition of the invention, is a powder coating.

In another aspect of the invention, there is provided an article having coated and cured thereon a thermosetting powder coating composition of the invention. Preferably said article is selected from the group consisting of heat-sensitive articles and non-heat sensitive articles. Preferably, said article is selected from the group consisting of wood, low density fibre board, medium density fibreboard, high density fibreboard, plastic, thermoplastic composite, thermoset composite, fibre reinforced composites, sandwich materials, metal and combinations thereof.

In another aspect of the invention, there is provided a process for making a coated article comprising the steps of:
  applying a thermosetting powder coating composition of the invention to an article said article is selected from the group consisting of articles comprising heat-sensitive components and articles comprising non-heat sensitive components and articles comprising a combination of heat-sensitive and non-heat sensitive components;
  heating and/or irradiating the thermosetting powder coating composition for enough time and at a suitable temperature to cure the thermosetting powder coating composition to obtain the coated article.

In another aspect of the invention, there is provided a process for making a coated article comprising the steps of:
  applying a thermosetting powder coating composition of the invention to the interior wall of a mould;
  subsequently introducing a fill compound in the mould in order said fill compound to form an article said article is selected from the group consisting of articles comprising heat-sensitive components and articles comprising non-heat sensitive components and articles comprising a combination of heat-sensitive and non-heat sensitive components;

heating and/or irradiating the thermosetting powder coating composition and optionally also the fill compound to obtain the coated article.

In another aspect of the invention, there is provided a use of:
- a vinyl functionalized urethane resin (VFUR) of the invention; or
- a vinyl functionalized urethane resin composition (VFURC) of the invention; or
- a thermosetting powder coating composition of the invention; or
- an article having coated and cured thereon a thermosetting powder coating composition of the invention;

in powder coatings, powder-in-mould coatings, 3D-printing, automotive applications, marine applications, aerospace applications, medical applications, defense applications, sports/recreational applications, architectural applications, bottling applications, household applications, machinery applications, can applications, coil applications, energy applications, textile applications and electrical applications.

The vinyl functionalized urethane resin (VFUR) and/or the vinyl functionalized urethane resin composition (VFURC) and/or the thermosetting powder coating compositions (TPCC) of the invention are each characterized by at least the following important factors:
a) the VFUR and the VFURC are each crystalline; and
b) the $R_{VFUR}$ and the $R_{VFURC}$—as these ratios are defined and measured herein—are each within a certain range (from 1.04 to 1.80) as explained in detail herein.

The vinyl functionalized urethane resin (VFUR) and/or the vinyl functionalized urethane resin composition (VFURC) of the invention when used in thermosetting powder coating compositions provide inventive thermosetting powder coating compositions having enhanced processability during and after the melt extrusion, taking shorter time to recrystallize thus enabling easy manufacturing whilst preferably at the same time said powder coating composition can still be ground and sieved. Furthermore, the thermosetting powder coating compositions of the invention have good storage stability and upon curing provide powder coatings having acceptable smoothness and good flexibility. In addition, the thermosetting powder coating compositions of the invention may provide upon heat and/or radiation curing powder coatings having good coffee resistance and/or good scratch resistance and/or good acetone resistance. Moreover, the thermosetting powder coating compositions of the invention may be also cured at relatively low temperatures for example 80-150° C. preferably 80-130° C., thus been suitable for coating heat-sensitive articles.

Definitions

By "enhanced processability" is meant herein that white pigmented thermosetting powder coating compositions are transported with ease via the cooling rollers of an extruder and have reduced or not at all stickiness to said cooling rollers as visually inspected during melt extrusion and they can be ground, flaked and sieved in considerably less time upon extrusion and have a D (as this is defined and measured herein) of at most 35° C. (D≤35° C.), preferably a D of at least 0° C. and of at most 35° C. (0° C.≤D≤35° C.). The reduced stickiness and the ability to be ground, flaked and sieved of a white pigmented thermosetting powder coating composition in considerably less time upon extrusion, is to be compared to the corresponding properties of a white pigmented thermosetting powder coating composition comprising the same kind of a white pigment, an unsaturated resin having ethylenic unsaturations (as this is defined herein including any one of its preferred embodiments) and Uracross® P3307 (currently supplied by DSM) as the only curing agent each of which in amounts equal to those of a white pigmented thermosetting powder coating composition according to the invention that is to be compared with. Enhanced processability enables easy/easier manufacturing of thermosetting powder coating compositions.

By "D" of a thermosetting powder coating composition (TPCC) is meant herein:

$$D = (T_g \text{ of UR}) - (T_g \text{ of a blend of UR with either i)} \\ \text{VFUR or ii) VFURC or iii) VFUR and} \\ \text{VFURC)},$$

depending on the presence of VFUR and/or VFURC in the thermosetting powder coating composition. For example in case the TPCC comprises only one UR and one VFUR then $D = (T_g \text{ of UR}) - (T_g \text{ of a blend of UR with VFUR})$. In case the TPCC comprises two or more UR, then D is as follows:

$$D = (T_g \text{ of blend of UR}) - (T_g \text{ of blend of UR with} \\ \text{either i) VFUR or ii) VFURC or iii) VFUR and} \\ \text{VFURC)}$$

depending on the presence of VFUR and/or VFURC in the thermosetting powder coating composition. In all cases, D is measured according to the method described in the Examples (see Examples, Method D).

By "good storage stability" is meant herein that the physical powder storage stability (PPS) of a white pigmented thermosetting powder coating composition (as this is defined and measured in the Examples) is at least 5. In the context of the invention, thermosetting powder coating compositions having PPS of at least 5 are considered as storage stable.

By "acceptable smoothness" is meant herein that white powder coatings derived upon curing of white pigmented thermosetting powder coating compositions have smoothness (as this is defined and measured in the Examples) of at least 1.

By "good flexibility" is meant herein that the direct impact resistance (as this is defined and measured in the Examples) of white powder coatings derived upon curing of white pigmented thermosetting powder coating compositions is at least 2 inch pounds (=23 mm Kg).

By "good acetone resistance" is meant herein that the acetone resistance (as this is defined and measured in the Examples) of white powder coatings derived upon curing of white pigmented thermosetting powder coating compositions is at least 3.

By "good coffee resistance" is meant herein that the coffee resistance (as this is defined and measured in the Examples) of white powder coatings derived upon curing of white pigmented thermosetting powder coating compositions is at least 3.

By "good scratch resistance" is meant herein that the scratch resistance (as this is defined and measured in the Examples) of white powder coatings measured on powder coated sheet moulding compounds (SMC), said powder coatings been derived upon curing of white pigmented thermosetting powder coating compositions via powder-in-mould-coating process (see Examples/b. Preparation of InvPC14-15 via powder-in-mould-coating process) is at least 1 N, preferably is at least 2 N, more preferably is at least 3 N, even more preferably is at least 4 N and/or is not significantly compromised, preferably is not compromised, even more preferably is enhanced when compared to a corresponding comparative composition.

By "curing" or "cure" is meant herein the process of becoming "set" that is to form an irreversibly crosslinked network (the so-called "cured form"), a material that can no longer flow, be melted or dissolved. Herein, the terms "curing" "cure" and "crosslinking" are used interchangeably. Preferably, the curing of the heat-curable thermosetting powder coating composition of the invention takes place using heat and in that case the curing can be called "heat curing". For clarity, the term heat curing does not include ultraviolet (UV) or electron beam induced curing. Optionally, a combination of heat and pressure can be used to cure the heat-curable thermosetting powder coating compositions of the invention. In the context of the invention, the term "heat curing" does not exclude the application of pressure along with heat in order to cure the heat-curable thermosetting powder coating compositions of the invention.

By "curing at relatively low temperatures" is meant herein that the powder coating composition is suitable for curing at low temperatures such as from 80 to 150° C., preferably from 80 to 140° C., more preferably from 80 to 130° C., even more preferably from 90 to 130° C., more preferably from 100 to 130° C.; and preferably for a time period of at most 60 min, more preferably for at most 45 min, even more preferably for at most 30 min, most preferably for at most 20 min, especially for at most 10 min, more especially for at most 5 min.

By "room temperature" is meant herein a temperature of 23° C.

By an "organic compound C comprising hydroxyl groups" or for simplicity "organic compound C" is meant herein an organic monomer, oligomer or polymer comprising hydroxyl groups; for example said organic compound C may be a mono-alcohol, a polyol e.g. di-alcohol (diol), tri-alcohol (triol) or poly-alcohol that is an alcohol having more than three hydroxyl groups per molecule, a hydroxyl functional oligomer, a hydroxyl functional polymer e.g. a hydroxyl functional polyester resin. Preferably the organic compound C is selected from the group consisting of mono-alcohol, polyol, hydroxyl functional oligomer, hydroxyl functional polymer, more preferably the organic compound C is selected from the group consisting of diols, triols, polyalcohols, hydroxyl functional oligomer, hydroxyl functional polymer, even more preferably the organic compound C is selected from the group consisting of diols, triols, polyalcohols, most preferably the organic compound C is a diol.

A "resin" is herein understood to have the same meaning as it has to a skilled person in thermosetting polymer chemistry, namely as a low molecular weight organic monomer, oligomer or polymer having reactive moieties such as for example ethylenic unsaturations, said resin is able to crosslink; said reactive moieties via a chemical reaction preferably induced by means of heat and/or radiation, ultimately connect the polymer chains together through the formation of permanent covalent (crosslink) bonds, resulting to the cured resin. The term "low molecular weight" means a theoretical number average molecular weight ($M_n$) lying between a few hundred Da, e.g. 200 Da, and a few thousand Da, e.g. 20000 Da. Preferably a resin has a $M_n$ of at least 200, more preferably of at least 205, even more preferably of at least 210, most preferably of at least 215, especially of at least 220, more especially of at least 250, most especially of at least 300, for example of at least 310, for example of at least 315, for example of at least 350, for example of at least 400, for example of at least 450, for example of at least 500, for example of at least 600, for example of at least 700, for example of at least 800. Preferably, a resin has a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da. A resin is classified as acid functional in case its hydroxyl value (OHV) is lower than its acid value (AV). A resin is classified as hydroxyl functional in case its acid value is lower than its hydroxyl value. In the context of the invention the acid value of a resin (AV in mg KOH/g of resin) is measured titrimetrically according to ISO 2114-2000, whereas the hydroxyl value of a resin (OHV in mg KOH/g of resin) is measured using ISO 4629-1978. The acid value of a polyester resin is a measure for the amount of acid groups in the polyester resin whereas the hydroxyl value of a polyester resin is a measure for the amount of hydroxyl groups in the polyester resin.

By "urethane resin" is meant herein a resin comprising urethane moieties . . . —NH—(C═O)—O— . . . .

By "composition" is meant herein the combining and/or mixture of distinct chemical substances and/or components to form a whole.

By "vinyl functionalized urethane resin (VFUR)" is meant herein a urethane resin comprising vinyl groups . . . —CH═CH$_2$.

The term "vinyl groups" is used herein interchangeably with the term "vinyl unsaturations".

The term "vinyl" is used herein interchangeably with the term "ethenyl".

By "vinyl ether functionalized urethane resin (VEFUR)" is meant herein a urethane resin comprising vinyl ether groups as those disclosed herein.

By "vinyl ester functionalized urethane resin (VESFUR)" is meant herein a urethane resin comprising vinyl ester groups as those disclosed herein.

By "vinyl(ether-ester) functionalized urethane resin (VEESFUR)" is meant herein a urethane resin comprising vinyl ether and vinyl ester groups as those disclosed herein.

VEFUR, VESFUR and VEESFUR as well as their preferred embodiments are each a vinyl functionalized urethane resin. Vinyl ether and vinyl ester groups are described herein.

By "vinyl functionalized urethane resin composition (VFURC)" is meant herein a composition substantially comprising, preferably consisting of vinyl functionalized urethane resins.

By "$R_{VFUR}$" is meant herein the following ratio as described in Formula I:

$$R_{VFUR} = \frac{[\text{peak area of the chemical shift of the urethane proton } (\ldots -NH-\ldots) \text{ of the urethane bonds } (\ldots -NH-C(=O)-O-\ldots) \text{ in VFUR}]}{[\text{peak area of the chemical shift of the methine proton } (\ldots -CH=\ldots) \text{ of the vinyl groups } (\ldots -CH=CH_2) \text{ in VFUR}]} \quad \text{(Formula I)}$$

and measured via $^1$H-NMR spectroscopy according to the method entitled—for simplicity—"$^1$H-NMR method $R_{VFUR}$" which is presented herein. According to Formula I, $R_{VFUR}$ has no unit. The $R_{VFUR}$ is associated to the ratio of the total number of urethane bonds ( . . . —NH—C(═O)—O— . . . ) present in the VFUR versus the total number of vinyl groups ( . . . —CH═CH$_2$) present in the VFUR.

By "$R_{VFURC}$" is meant herein the following ratio as described in Formula II:

$$R_{VFURC} = [\text{peak area of the chemical shift of the urethane proton } (\ldots -NH-\ldots) \text{ of the urethane bonds } (\ldots -NH-C(=O)-O-\ldots)$$

in VFURC]/[peak area of the chemical shift of the methine proton ( . . . —CH= . . . ) of the vinyl groups ( . . . —CH=CH$_2$) in VFURC]    (Formula II)

and measured via $^1$H-NMR spectroscopy according to the method entitled—for simplicity—"$^1$H-NMR method R$_{VFURC}$" which is presented herein. According to Formula II, R$_{VFURC}$ has no unit. The R$_{VFURC}$ is associated to the ratio of the total number of urethane bonds ( . . . —NH—C(=O)—O— . . . ) present in the VFURC versus the total number of vinyl groups ( . . . —CH=CH$_2$) present in the VFURC.

By "powder" is meant herein, a substantially dry solid substance at room temperature and at atmospheric pressure reduced to a state of fine, loose particles wherein the individual particles have preferably a maximum particle size of at most 200, more preferably of at most 180, even more preferably of at most 160, most preferably of at most 150, especially of at most 140, more especially of at most 130, most especially of at most 120, for example of at most 110, for example of at most 100, for example of at most 90 μm at 23° C. and at atmospheric pressure; the individual particles have preferably a minimum particle size of at least 10, more preferably of at least 15, even more preferably of at least 20, most preferably of at least 25, especially of at least 30, more especially of at least 35, most especially of at least 40, for example of at least 45, for example of at least 50, for example of at least 60, for example of at least 70 μm at 23° C. and at atmospheric pressure. A particle is defined as a small object that: a) has mean linear dimensions as described herein after and b) behaves as a whole unit in terms of its transport and properties. The particle size distribution (PSD) of a powder is a list of values or a mathematical function that defines the relative amounts of particles present, sorted according to size. The terms "particle size" and "particle size distribution" will be used interchangeably in the context of the invention when used in relation to a powder. The method used to measure the particle size of the thermosetting powder coating compositions of the invention is sieve analysis. According to it, the powder is separated on sieves of different sizes. Thus, the PSD is defined in terms of discrete size ranges: e.g. "% of sample powder has particle size in the range of 75 microns to 90 microns", when sieves of these sizes are used. Preferably, 90% of the thermosetting powder coating compositions of the invention have a particle size in the range of 20 to 200 micron. The PSD can be determined for example by the following method: a certain amount of thermosetting powder coating composition, for example 100 g, is brought onto a Fritsch Analysette Spartan sieving apparatus equipped with a 200 micron sieve. The sample is sieved for 15 minutes at a 2.5 mm amplitude. The fraction of the sample which remained on the sieve was weighed after sieving. The fraction of the sample that went through the sieve (sieved fraction) is collected and is placed on a 160 micron sieve and is sieved as mentioned herein above. Once the same measurements (weighing) are performed as mentioned herein above, the same procedure is repeated using sequentially a 140, a 125, a 112, a 100, a 90, a 75, a 50 and a 20 micron sieve; the last sieved fraction with a size smaller than 20 micron is also weighed. Summing up the various weight fractions, this should yield the initial amount of sample, in this example 100 g. The various weight fractions represent the PSD as a list of values representing the relative amounts of particles present, sorted according to sieves used.

By "substantially dry" is meant herein that the component does not contain any deliberately added water or moisture but the component may contain moisture absorbed from the atmosphere in an amount of up to 30, preferably up to 20, more preferably up to 10, even more preferably up to 5, most preferably up to 3, especially up to 2, more especially up to 1% w/w based on the total weight of the component.

By "thermosetting powder coating compositions" is meant herein, a mixture of components in the form of a powder and which compositions have the ability to form an irreversible crosslinked network (the so-called 'cured form') upon curing, preferably via heat and/or radiation curing, more preferably via heat curing.

By "heat-curable thermosetting powder coating composition" is meant herein a thermosetting powder coating composition, said composition has the ability to cure upon heating. For clarity, the thermosetting powder coating composition of the invention is heat-curable.

By "radiation-curable thermosetting powder coating composition" is meant herein a thermosetting powder coating composition, said composition has the ability to cure upon radiation i.e. UV and/or IR and/or electron beam radiation. For clarity, the composition of the invention is radiation curable.

By "heat- and/or radiation-curable thermosetting powder coating composition" is meant herein a thermosetting powder coating composition, said composition has the ability to cure upon heat- and/or radiation i.e. UV and/or IR and/or electron beam radiation. For clarity, the composition of the invention is heat- and/or radiation curable.

The terms amorphous and crystalline used to characterize a resin or a resin composition are informal terms used in the art to indicate the predominant character of the relevant resin or resin composition in respect to its degree of crystallinity but these terms are defined more precisely herein by melting enthalpy ($\Delta H_m$) values. The term "crystalline" denotes both crystalline and semicrystalline By "amorphous" is meant herein that a resin for example a vinyl functionalized urethane resin or resin composition for example a vinyl functionalized urethane resin composition has a melting enthalpy ($\Delta H_m$) lower than 35 J/g. Preferably the amorphous resin or resin composition does not have a melting temperature ($T_m$).

By "crystalline" is meant herein that a resin for example a vinyl functionalized urethane resin or resin composition for example a vinyl functionalized urethane resin composition has a melting enthalpy ($\Delta H_m$) of at least 35, more preferably of at least 38, even more preferably of at least 40, most preferably of at least 50, especially of at least 60 J/g.

By "$T_g$" is meant herein the glass transition temperature. The $T_g$ is measured using DSC (Differential Scanning calorimetry) as described herein.

By "$T_c$" is meant herein the crystallization temperature; in case a resin or resin composition or a compound has multiple crystallization peaks, then the peak temperature of the crystallization peak with the largest crystallization enthalpy ($\Delta H_c$) is mentioned herein as $T_c$. The $T_c$ is measured using DSC (Differential Scanning calorimetry) as described herein.

By "$T_m$" is meant herein the melting temperature; in case a resin or resin composition or a compound has multiple melting peaks then the peak temperature of the melting peak with the largest melting enthalpy is mentioned herein as $T_m$. The $T_m$ is measured using DSC as described herein.

By "$\Delta H_m$" is meant herein the melting enthalpy. The ($\Delta H_m$) is measured using DSC as described herein. In case a resin or resin composition or a compound has more than one melting peaks then the melting enthalpy ($\Delta H_m$) values mentioned herein, refer to the total of the melting enthalpy ($\Delta H_m$) said total obtained by summing up the $\Delta H_m$ values of each of the melting peaks.

By "$\Delta H_c$" is meant herein the crystallization enthalpy. The ($\Delta Hc$) is measured using DSC as described herein. In case a resin or resin composition or a compound has more than one crystallization peaks then the crystallization enthalpy ($\Delta H_c$) values mentioned herein, refer to the total of the crystallization enthalpy ($\Delta H_c$) said total obtained by summing up the $\Delta H_c$ values of each of the crystallization peaks.

The glass transition temperature ($T_g$) (inflection temperature), melting temperature ($T_m$), crystallization temperature ($T_c$), melting enthalpy ($\Delta H_m$) and crystallization enthalpy ($\Delta H_c$) measurements were carried out via differential scanning calorimetry (DSC) on a Mettler Toledo, TA DSC821, in $N_2$ atmosphere as described herein.

By "powder coating" is meant herein the partially or fully cured form of the heat- and/or radiation curable thermosetting powder coating composition of the invention.

By "article" is meant herein an individual object or item or element of a class designed to serve a purpose or perform a special function and can stand alone. A substrate is an example of an article.

By "di-acid" as used herein means a dicarboxylic acid or anhydride or diester or other derivatives of a dicarboxylic acid such as for examples dicarboxylic acid salts; preferably "di-acid" is a dicarboxylic acid or anhydride, more preferably "di-acid" is a dicarboxylic acid.

By "ethylenic unsaturation" as used herein means cis- or trans-configured reactive carbon-carbon double bond unsaturation and does not include aromatic unsaturation, carbon-carbon triple bond, carbon-heteroatom unsaturation.

The term 'di-acid ethylenic unsaturations' as used herein means ethylenic unsaturations obtainable from any isomer of an unsaturated di-acid and/or derivatives thereof, such as for example ethylenic unsaturations obtainable from a di-acid chosen from the group of 2-butenedioic acid, 2-methyl-2-butenedioic acid, itaconic acid and mixtures thereof. Derivatives of any isomer of unsaturated di-acids include esters, anhydrides, acid salts. Fumaric acid and maleic acid are isomers of 2-butenedioic acid, whereas citraconic acid and mesaconic acid are isomers of 2-methyl-2-butenedioic acid. For example "di-acid ethylenic unsaturations" may be obtainable from fumaric, maleic, itaconic, citraconic and/or mesaconic acids, derivatives thereof and/or mixtures thereof. Fumaric acid based unsaturation is an informal term used herein to denote unsaturation derived from fumaric acid, its isomers e.g. maleic acid and/or derivatives thereof.

By "2-butenedioic acid ethylenic unsaturations" as used herein means di-acid ethylenic unsaturations obtainable from any isomer of 2-butenedioic acid and/or derivatives thereof. Fumaric acid and maleic acid are isomers of 2-butenedioic acid. Maleic acid is the cis-isomer of 2-butenedioic acid, whereas fumaric acid is the trans-isomer of 2-butenedioic acid. Derivatives of any isomer of 2-butenedioic acid include esters, anhydrides, acid salts.

By "unsaturated resin comprising ethylenic unsaturations" or equally mentioned herein as "UR", is meant herein an unsaturated resin having ethylenic unsaturations. For example an unsaturated polyester resin comprising 2-butenedioic acid ethylenic unsaturations, an acrylated polyester resin are each an unsaturated resin comprising ethylenic unsaturations.

By "unsaturated resin comprising di-acid ethylenic unsaturations" is meant herein an unsaturated resin having di-acid ethylenic unsaturations; said resin is a sub-class of an unsaturated resin comprising ethylenic unsaturations. For example an unsaturated polyester resin comprising di-acid ethylenic unsaturations is an unsaturated resin comprising di-acid ethylenic unsaturations.

By "unsaturated resin comprising 2-butenedioic acid ethylenic unsaturations" is meant herein an unsaturated resin having 2-butenedioic acid ethylenic unsaturations; said resin is a sub-class of an unsaturated resin comprising di-acid ethylenic unsaturations and thus a further sub-class of an unsaturated resin comprising ethylenic unsaturations. For example an unsaturated polyester resin having 2-butenedioic acid ethylenic unsaturations is an unsaturated resin comprising 2-butenedioic acid ethylenic unsaturations.

By "unsaturated polyester resin comprising ethylenic unsaturations" or equally "unsaturated polyester resin comprising ethylenic unsaturations" is meant herein, an unsaturated polyester resin comprising ethylenic unsaturations.

By "unsaturated polyester resin comprising di-acid ethylenic unsaturations" or equally "unsaturated polyester resin comprising di-acid ethylenic unsaturations" is meant herein, an unsaturated polyester resin comprising di-acid ethylenic unsaturations; said polyester resin is a sub-class of an unsaturated polyester resin comprising ethylenic unsaturations By "unsaturated polyester resin comprising 2-butenedioic acid ethylenic unsaturations" or equally "unsaturated polyester resin comprising 2-butenedioic acid ethylenic unsaturations" is meant herein, an unsaturated polyester resin comprising 2-butenedioic acid ethylenic unsaturations. The "unsaturated polyester resin having 2-butenedioic acid ethylenic unsaturations" may for example be prepared from any isomer of 2-butenedioic acid and/or derivatives thereof. Fumaric acid and maleic acid are isomers of 2-butenedioic acid. Maleic acid is the cis-isomer of 2-butenedioic acid, whereas fumaric acid is the trans-isomer of 2-butenedioic acid. Derivatives of any isomer of 2-butenedioic acid include esters, anhydrides, acid salts. Maleic acid and maleic acid anhydride partly isomerize to fumaric acid when used in the synthesis of a polyester resin comprising 2-butenedioic acid ethylenic unsaturations.

By "radical initiator" is meant herein any organic or inorganic compound that upon heating and/or radiation is able to generate free radicals and initiate radical crosslinking in the thermosetting powder coating composition of the invention.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms). The invention comprises and/or uses all such forms which are effective as defined herein.

By "$M_n$" is meant herein the theoretical number average molecular weight and it is calculated as shown in the Examples unless stated otherwise. In case $M_n$ refers to the VFUR, then the "$M_n$" is calculated as shown in the relevant Examples. In case $M_n$ refers to the UR, then the "$M_n$" is calculated as shown in the relevant Examples. In case $M_n$ refers to a monomer then "$M_n$" corresponds to molecular weight values calculated on the basis of the molecular formula of said monomer, as such calculation is known to one skilled in the art.

By "WPU" is meant herein the measured weight per ethylenic unsaturation, unless otherwise stated; the WPU is measured using $^1$H-NMR spectroscopy as described in the Examples [see Examples, $^1$H-NMR method for the measurement of the WPU ($^1$H-NMR method WPU)].

By "theoretical WPU" is meant herein the calculated WPU which is being calculated by dividing the weight (g) of a resin produced by the number of moles (mol) of ethylenic unsaturations in said resin sample. The weight (g) of a resin produced is the total weight (g) of the individual monomers added during the synthesis of said resin (Table 1, 2 and 3) subtracting the weight (g) of the water which is formed during the synthesis of said resin (Table 1, 2 and 3).

By "viscosity" ($\eta$) is meant herein the melt viscosity (in Pa·s) at 160° C. Viscosity measurements were carried out at 160° C., on a Brookfield CAP 2000+H Viscometer. The applied shear-rate was 70 s$^{-1}$ and a 19.05 mm spindle (cone spindle CAP-S-05 (19.05 mm, 1.8°) was used.

By "pph" is meant herein parts of an ingredient in the composition of the invention per hundred parts of vinyl functionalized urethane resins and/or VFURC and unsaturated resins.

By "(N)IR lamp" denotes herein both a near-IR lamp and an IR lamp.

By the term "lower than" is meant herein that the relevant maximum boundary value is not included in the range.

By the term "higher than" is meant herein that the relevant minimum boundary value is not included in the range.

For all upper and lower boundaries of any parameters given herein, the boundary value is included in each range for each parameter. All combinations of minimum and maximum values of the parameters described herein may be used to define the parameter ranges for various embodiments and preferences of the invention.

In the context of the invention unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying in between the more preferred and the less preferred of said alternatives, is itself preferred to said less preferred value and also to each value lying between said less preferred value and said intermediate value.

The term "comprising" as used herein means that the list that immediately follows is non-exhaustive and may or may not include any other additional suitable items, for example one or more further feature(s), component(s), ingredient(s) and/or substituent(s) as appropriate. "Substantially comprising" as used herein means a component or list of component(s) is present in a given material in an amount greater than or equal to about 90% w/w, preferably greater than or equal to 95% w/w, more preferably greater than or equal to 98% w/w, even more preferably greater than or equal to 99% w/w of the total amount of the given material. The term "consisting of" as used herein mean that the list that follows is exhaustive and does not include additional items.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non-exhaustive the sum of the percentage for each of such components may be less than 100% to allow a certain percentage for additional amount(s) of any additional component(s) that may not be explicitly described herein.

Unless the context clearly indicates otherwise, as used herein plural forms of the terms herein (for example composition, component, resin, polymer,) are to be construed as including the singular form and vice versa.

Vinyl Functionalized Urethane Resin (VFUR) of the Invention and Process for Making VFUR This invention provides crystalline vinyl functionalized urethane resins (VFUR) having a R$_{VFUR}$ of at least 1.04 and of at most 1.80; said resins are particularly useful as curing agents in thermosetting powder coating compositions and powder coatings; said resins are urethane resins functionalized with either vinyl ether groups (see chemical structure 1;

indicates the points of attachment of the vinyl ether group)

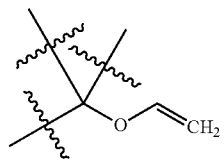

(1)

or vinyl ester (see chemical structure 2;

indicates the points of attachment of the vinyl ester group)

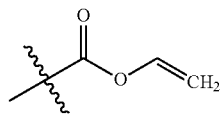

(2)

or a combination of vinyl ether and vinyl ester groups; said resins are crystalline and preferably solid at room temperature and at atmospheric pressure to enable them to be particularly useful as curing agents in thermosetting powder coating compositions and powder coatings.

Preferably the VFUR of the invention has a R$_{VFUR}$ of at least 1.05, most preferably of at least 1.06, especially of at least 1.07, more especially of at least 1.08, most especially of at least 1.10, for example of at least 1.12, for example of at least 1.15, for example of at least 1.17, for example of at least 1.18, for example of at least 1.20. Preferably the VFUR of the invention has a R$_{VFUR}$ of at most 1.79, more preferably of at most 1.78, most preferably of at most 1.77, especially of at most 1.75, more especially of at most 1.73, most especially of at most 1.71, for example of at most 1.70, for example of at most 1.65, for example of at most 1.60, for example of at most 1.55, for example of at most 1.50, for example of at most 1.48, for example of at most 1.45, for example of at most 1.40.

The vinyl functionalized urethane resin (VFUR) of the invention having a $R_{VFUR}$ of at least 1.10, when used in thermosetting powder coating compositions provide inventive thermosetting powder coating compositions which upon curing afford powder coatings that may also have good acetone resistance combined or not combined with any one of the other properties mentioned herein. Preferably, the vinyl functionalized urethane resin (VFUR) of the invention having a $R_{VFUR}$ of at least 1.10, when used in thermosetting powder coating compositions provide inventive thermosetting powder coating compositions which upon curing afford powder coatings having also good acetone resistance combined with any one of the other properties mentioned herein.

The vinyl functionalized urethane resin (VFUR) of the invention has preferably a melting enthalpy ($\Delta H_m$) of at least 35, more preferably of at least 38, even more preferably of at least 40, most preferably of at least 50, especially of at least 60 J/g. The vinyl functionalized urethane resin (VFUR) of the invention has preferably a melting enthalpy ($\Delta H_m$) of at most 400, more preferably of at most 300, even more preferably of at most 260, most preferably of at most 240, especially of at most 220, more especially of at most 210, most especially of at most 200, for example of at most 180, for example of at most 160, for example of at most 140, for example of at most 130 J/g.

The VFUR of the invention is preferably prepared from
at least a compound A comprising isocyanate groups; and
at least a compound B comprising hydroxyl groups and said compound B is selected from the group consisting of compounds comprising vinyl ether groups (VET) and compounds comprising vinyl ester groups (VES) and compounds comprising vinyl ether and vinyl ester groups (VET-VES); and preferably the hydroxyl groups of compound B are able to react with the isocyanate groups of compound A; and
at least an organic compound C comprising hydroxyl groups.

In case the VFUR of the invention is a vinyl ether functionalized urethane resin (VEFUR), then it is preferably prepared from:
at least a compound A comprising isocyanate groups; and
at least a compound B comprising hydroxyl groups and vinyl ether groups (VET); and preferably the hydroxyl groups of compound B are able to react with the isocyanate groups of compound A; and
at least an organic compound C comprising hydroxyl groups.

In case the VFUR of the invention is a vinyl ester functionalized urethane resin (VESFUR), then it is preferably prepared from:
at least a compound A comprising isocyanate groups; and
at least a compound B comprising hydroxyl groups and vinyl ester groups (VES); and preferably the hydroxyl groups of compound B are able to react with the isocyanate groups of compound A; and
at least an organic compound C comprising hydroxyl groups.

In case the VFUR of the invention is a vinyl(ether-ester) functionalized urethane resin (VEESFUR), then it is preferably prepared from
at least a compound A comprising isocyanate groups; and
at least a compound B comprising hydroxyl groups, vinyl ether groups (VET) and vinyl ester groups (VES); and preferably the hydroxyl groups of compound B are able to react with the isocyanate groups of compound A; and
at least an organic compound C comprising hydroxyl groups.

Preferably, the VFUR is selected from the group consisting of vinyl ether functionalized urethane resins, vinyl ester functionalized urethane resins, vinyl(ether-ester) functionalized urethane resins. More preferably, the VFUR is selected from the group consisting of vinyl ether functionalized urethane resins, vinyl ester functionalized urethane resins. Most preferably, the VFUR is a vinyl ether functionalized urethane resin.

The vinyl ether and/or vinyl ester groups may be pendant and/or terminal to the VFUR. Preferably, the vinyl ether and/or vinyl ester groups are terminal to the VFUR; in this case and depending on the existence of VET and/or VES groups in the VFUR, the VFUR is mentioned herein as a vinyl ether terminated urethane resin (VFUR comprises terminal VET groups and does not comprise VES groups), or vinyl ester terminated urethane resin (VFUR comprises terminal VES groups and does not comprise VET groups) or vinyl(ether-ester) terminated urethane resin (VFUR comprises terminal VET and VES groups).

Preferably, the VFUR is selected from the group consisting of vinyl ether terminated urethane resins, vinyl ester terminated urethane resins, vinyl(ether-ester) terminated urethane resins. More preferably, the VFUR is selected from the group consisting of vinyl ether terminated urethane resins, vinyl ester terminated urethane resins. Most preferably, the VFUR is a vinyl ether terminated urethane resin.

Preferably the vinyl functionalized urethane resin is nonvolatile at the temperatures and pressures used when processing, applying and storing the thermosetting powder coating composition of the invention. More preferably, the vinyl functionalized urethane resin is preferably solid at room temperature and at atmospheric pressure.

Preferably, the VFUR of the invention has a $T_g$ of at least −200, more preferably of at least −180, even more preferably of at least −150, most preferably of at least −125, especially of at least −100, more especially of at least −80, even more especially of at least −70, most especially of at least −50, for example of at least −40, for example of at least −35° C. Preferably, the VFUR of the invention has a $T_g$ of at most 100, more preferably of at most 90, even more preferably of at most 80, most preferably of at most 60, especially of at most 50, more especially of at most 40, most especially of at most 30, for example of at most 20, for example of at most 10, for example of at most 0, for example of at most −10, for example of at most −20, for example of at most −30° C. Preferably, the VFUR of the invention has a $T_g$ of at least −80° C. and of at most −20° C.

Preferably the VFUR of the invention has a melting temperature ($T_m$) of at least 30, more preferably of at least 40° C. Preferably, the VFUR of the invention has a $T_m$ of at most 200, more preferably of at most 180, even more preferably of at most 160, most preferably of at most 140, especially of at most 120° C.

Preferably the VFUR of the invention has a crystallization temperature ($T_c$) of at least 30, more preferably of at least 40° C. Preferably, the VFUR of the invention has a $T_m$ of at most 200, more preferably of at most 180, even more preferably of at most 160, most preferably of at most 140, especially of at most 120° C.

Preferably, the $T_c$ of the VFUR of the invention is lower than its $T_m$. Preferably the $T_c$ of the VFUR of the invention is at most 55, more preferably at most 40, even more preferably at most 25° C. lower than its $T_m$.

Preferably, the VFUR of the invention has a $M_n$ of at least 100, more preferably of at least 150, even more preferably of at least 200, most preferably of at least 205, especially of at least 220, more especially of at least 250, most especially of at least 300, for example of at least 350, for example of at least 400, for example of at least 500 Da. Preferably, the VFUR of the invention has a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da.

Preferably, the theoretical WPU of the VFUR is at least 100, more preferably at least 120, even more preferably at least 140, most preferably at least 145, especially at least 150, more especially at least 155, most especially at least 157, for example at least 170, for example at least 190, for example at least 200 g/mol. Preferably the theoretical WPU of the VFUR is at most 2000, more preferably at most 1500, even more preferably at most 1200, most preferably at most 1000, especially at most 900, more especially at most 800, most especially at most 700, for example at most 600, for example at most 500, for example at most 400, for example at most 350, for example at most 300 g/mol.

Preferably, the WPU of the VFUR is at least 100, more preferably at least 120, even more preferably at least 140, most preferably at least 145, especially at least 150, more especially at least 155, most especially at least 157, for example at least 170, for example at least 190, for example at least 200 g/mol. Preferably the WPU of the VFUR is at most 2000, more preferably at most 1500, even more preferably at most 1200, most preferably at most 1000, especially at most 900, more especially at most 800, most especially at most 700, for example at most 600, for example at most 500, for example at most 400, for example at most 350, for example at most 300 g/mol.

Preferably the viscosity of the VFUR is at least 0.0001, more preferably at least 0.001, even more preferably at least 0.005, most preferably at least 0.008, especially at least 0.009, more especially at least 0.01 Pa·s. Preferably the viscosity of the VFUR of the invention is at most 30, more preferably at most 25, even more preferably at most 20, most preferably at most 15, especially at most 10, more especially at most 8, most especially at most 6, for example at most 5, for example at most 4, for example at most 3, for example at most 2 Pa·s. Preferably, the viscosity of the VFUR of the invention ranges from 0.1 to 30 Pa·s. Most preferably, the viscosity of the VFUR of the invention ranges from 0.01 to 2 Pa·s.

Broadly stated, the desired vinyl functionalized urethane resin of this invention can be prepared by either:

i) reacting a compound A comprising isocyanate groups, for example a diisocyanate monomer or a polyisocyanate with a compound B comprising hydroxyl groups and said compound B is selected from the group consisting of compounds comprising vinyl ether groups (VET) and compounds comprising vinyl ester groups (VES) and compounds comprising vinyl ether and vinyl ester groups (VET-VES) and with at least an organic compound C comprising hydroxyl groups (process 1) or by ii) reacting a compound A comprising isocyanate groups, for example a diisocyanate monomer or a polyisocyanate with at least an organic compound C comprising hydroxyl groups e.g. a mono-alcohol or a polyol, to form an adduct of compound A with said organic compound C, mentioned herein as "adduct", wherein the reaction conditions will be chosen so as to form an isocyanate terminated adduct to the virtual exclusion of hydroxyl terminated polymeric materials that can for example be achieved by the use of a molar excess of the compound A (step 1); subsequently the adduct is reacted with a compound B comprising hydroxyl groups and said compound B is selected from the group consisting of compounds comprising vinyl ether groups (VET), compounds comprising vinyl ester groups (VES), compounds comprising vinyl ether and vinyl ester groups (VET-VES) (step 2) (process 2).

For each of the above mentioned processes 1 and 2, the relative amounts of compounds A, B and C are chosen such that the sum of the hydroxyl (—OH) group equivalents of compounds B and C is equal to the isocyanate (—NCO) groups equivalents of compound A and the relative amounts of compound A, B and C are chosen such that the obtained VFUR has a R value in the range according to the invention.

Preferably, the desired vinyl functionalized urethane resin of this invention is prepared according to i) (process 1).

Compound A may be monomer, oligomer or polymer. Preferably compound A is a monomer or oligomer, more preferably compound A is a monomer. Preferably, compound A is an organic compound e.g. organic monomer, oligomer or polymer. Preferably, the compound A has a $M_n$ of at least 50, more preferably of at least 100, even more preferably of at least 110, most preferably of at least 120, especially of at least 130, more especially of at least 140, most especially of at least 145, for example of at least 150, for example of at least 160, for example of at least 165 Da. Preferably, the compound A has a $M_n$ of at most 20000, more preferably of at most 15000, even more preferably of at most 10000, most preferably of at most 8000, especially of at most 6000, more especially of at most 5000, most especially of at most 4000, for example of at most 3000, for example of at most 2500, for example of at most 2000, for example of at most, 1800, for example of at most 1500, for example of at most 1200, for example of at most, 1000, for example of at most 800, for example of at most, 700, for example of at most 600, for example of at most 500, for example of at most 450, for example of at most 400, for example of at most 350, for example of at most 300, for example of at most 250, for example of at most 225 Da.

Exemplary compounds A in accordance with the invention include but are not limited to monomeric or polymeric diisocyanates for example toluene 2,4-diisocyanate, toluene 2,6-diisocyanate (TDI, is a mixture of toluene 2,4- and toluene 2,6-diisocyanate), 4,4'-diphenyl methane diisocyanate, 2,4'-diphenyl methane diisocyanate, 2,2'-diphenyl methane diisocyanate, 1,6'-hexamethylene diisocyanate (HDI), 5-isocyanato-1-(isocyanatomethy)-1,3,3-trimethyl-cyclohexane (isophorone diisocyanate), m-tetramethylxylene diisocyanate, dicyclohexylmethane 4,4'-diisocyanate, naphthalene 1,5-diisocyanate or 1,4-diisocyanatobenzene; monomeric or polymeric polyisocyanates for example triisocyanates for example triphenylmethane-4,4',4'''-triisocyanate, functionalized polymers derived from diisocyanates such as isocyanurates and uretdiones; and mixtures thereof. Preferably, compound A is a diisocyanate, more preferably compound A is selected from the group consisting of toluene 2,4-diisocyanate, toluene 2,6-diisocyanate, 1,6'-hexamethylene diisocyanate, isophorone diisocyanate, most preferably compound A is 1,6'-hexamethylene diisocyanate.

Compound B comprises hydroxyl groups and said compound B is selected from the group consisting of compounds comprising vinyl ether groups (VET) and compounds comprising vinyl ester groups (VES) and compounds comprising vinyl ether and vinyl ester groups (VET-VES). Compound B may be monomer, oligomer or polymer. Preferably compound B is a monomer or oligomer, more preferably compound B is a monomer. Preferably, compound B is an organic compound e.g. organic monomer, oligomer or polymer. Preferably, the compound B has a $M_n$ of at least 50, more preferably of at least 60, even more preferably of at least 65, most preferably of at least 70, especially of at least 75, more especially of at least 80, most especially of at least 85, for example of at least 90, for example of at least 95, for example of at least 100 Da. Preferably, the compound B has a $M_n$ of at most 20000, more preferably of at most 15000, even more preferably of at most 10000, most preferably of at most 8000, especially of at most 6000, more especially of at most 5000, most especially of at most 4000, for example of at most 3000, for example of at most 2500, for example of at most 2000, for example of at most, 1800, for example of at most 1400, for example of at most 1000, for example of at most, 800, for example of at most 600, for example of at most, 500, for example of at most 400, for example of at most 300, for example of at most 250, for example of at most 200, for example of at most 180, for example of at most 160, for example of at most 140, for example of at most 120 Da.

Exemplary vinyl ethers include but are not limited to mono (alcohol) functionalized vinyl ethers, for example 6-hydroxyhexyl vinyl ether, 4-hydroxybutyl vinyl ether, 2-hydroxyethyl vinyl ether, hydroxybutyl vinyl ether, hydroxyethyl vinyl ether, diethylene glycol monovinyl ether or 4-(hydroxymethyl) cyclohexyl methyl vinyl ether (1,4-cyclohexanedimethanol vinyl ether); vinyl ether polyester resins that can be prepared via transesterification of hydroxyl functional polyester resins with hydroxyl functional vinyl ethers.

The hydroxyl vinyl ethers which may be employed in making the desired VFUR include those prepared by any of the methods well known to those of ordinary skill in the art. The hydroxyl vinyl ethers are usually prepared by the reaction of acetylene with polyols for example diols, triols, at elevated temperatures in the presence of a basic catalyst. Examples of hydroxyl vinyl ethers which are commercially available and useful herein include hydroxybutyl vinyl ether and hydroxyethyl vinyl ether. It is understood that other hydroxyl vinyl ethers may be used, for example, those having the general formula $CH_2=CH-O-R-OH$, where R is selected from the group of alkyl, aryl, alkaryl, aralkyl, cycloalkyl, and alkyl oxide radicals, although n-butyl is preferred.

Alternatively, the hydroxyl vinyl esters are usually prepared by the reaction of acrylic acid with an epoxide monomer, for example phenyl glycidyl ether, allyl glycidyl ether, tert-butyl glycidyl ether, isopropyl glycidyl ether, styrene oxide, para-nitrostyrene oxide, benzyl glycidyl ether, bisphenol A diglycidyl ether.

It is understood that hydroxyl vinyl esters may be used, for example, those having the general formula $CH_2=CH-O-(C=O)-R-OH$, where R is selected from the group consisting of alkyl, aryl, alkaryl, aralkyl, cycloalkyl, and alkyl oxide radicals; more preferably R is n-butyl.

Exemplary vinyl esters include but are not limited to hydroxyl vinyl esters and to those prepared by any of the methods well known to those of ordinary skill in the art. The hydroxyl vinyl esters are usually prepared by the reaction of acetaldehyde with acid chlorides in the presence of tertiary amines; methods for the preparation of hydroxyl vinyl esters are known in the art.

Preferably compound B is a hydroxyl vinyl ether, more preferably compound B is selected from the group consisting of 6-hydroxyhexyl vinyl ether, 4-hydroxybutyl vinyl ether, 2-hydroxyethyl vinyl ether, hydroxybutyl vinyl ether, hydroxyethyl vinyl ether, diethylene glycol monovinyl ether or 4-(hydroxymethyl) cyclohexyl methyl vinyl ether (1,4-cyclohexanedimethanol vinyl ether); even more preferably compound B is a hydroxybutyl vinyl ether (HBVE); most preferably compound B is 4-hydroxybutyl vinyl ether (4-HBVE).

Preferably, the organic compound C is a mono-alcohol, polyol e.g. di-alcohol (diol), tri-alcohol (triol) or poly-alcohol that is an alcohol having more than three hydroxyl groups per molecule, a hydroxyl functional oligomer, a hydroxyl functional polymer e.g. a hydroxyl functional polyester resin. Preferably the organic compound C is selected from the group consisting of mono-alcohol, polyol, hydroxyl functional oligomer, hydroxyl functional polymer; more preferably the organic compound C is selected from the group consisting of diols, triols, polyalcohols, hydroxyl functional oligomer, hydroxyl functional polymer; even more preferably the organic compound C is selected from the group consisting of diols, triols, polyalcohols; most preferably the organic compound C is a diol. Preferably compound C is a monomer or oligomer, more preferably compound B is a monomer. Preferably, the compound B has a $M_n$ of at least 50, more preferably of at least 60, even more preferably of at least 65, most preferably of at least 70, especially of at least 75, more especially of at least 80, most especially of at least 85, for example of at least 90, for example of at least 95, for example of at least 100 Da. Preferably, the compound C has a $M_n$ of at most 20000, more preferably of at most 15000, even more preferably of at most 10000, most preferably of at most 8000, especially of at most 6000, more especially of at most 5000, most especially of at most 4000, for example of at most 3000, for example of at most 2500, for example of at most 2000, for example of at most, 1800, for example of at most 1400, for example of at most 1000, for example of at most, 800, for example of at most 600, for example of at most, 500, for example of at most 400, for example of at most 300, for example of at most 250, for example of at most 200, for example of at most 180, for example of at most 160, for example of at most 150, for example of at most 120 Da.

Mono-alcohols and polyols that may be used in i) (process 1) and/or ii) (process 2) include those selected from crystallizing or non-crystallizing mono-alcohols and polyols, although crystallizing mono-alcohols and polyols are particularly preferred. Exemplary polyols in accordance with the invention include but are not limited to ethylene glycol, diethylene glycol, triethylene glycol, 1,2-propylene glycol, 1,3-propylene glycol, 1,3-butylethyl propanediol, neopentyl glycol (2,2'-dimethyl-1,3-propanediol), 2-butyl-2-ethyl-1,3-propanediol (BEPD), 2-methyl-1,3-propanediol (MP diol), 1,2-butylene glycol, 1,3-butylene glycol, 1,4-butylene glycol, 1,3-isobutanediol, 1,2-isobutanediol, 2,3-butanediol, 2-butenediol(1,4), 2,2,4-trimethyl-1,3-pentanediol, 1,2-cyclopentanediol, 1,3-cyclopentanediol, 1,4-cyclopentanediol, 1,6-hexanediol, 1,4-dimethoxy cylcohexane, 1,2-cyclohexanediol, 1,3-cyclohexanediol, 1,4-cyclohexanediol, 1,4-cyclohexanedimethanol, 4,4'-methylene-bis(cyclohexanol), 4,4'-isopropylidene-bis(cyclohexanol), (hydrogenated bisphenol A) 1,4-bis(hydroxymethyl)cyclohexane, 1,3-bis(hydroxyethyl)cyclohexane, 1,3-bis(hydroxypropyl)cyclohexane, 1,3-bis(hydroxyisopropyl)cyclohexane, dodecanediol, xylene glycol, 4,4'-isopropylidene diphenol (bisphenol A), trimethylolpropane, triethylolpropane, pentaerythritol, bisphenol A/propylene oxide adducts, hydroquinone/propylene oxide adducts, and hydroquinone/ethylene oxide adducts. Preferably, 1,6-hexanediol is employed in i) (process 1).

Exemplary hydroxyl functional oligomers include but are not limited to castor oil which is a triglyceride with approximately 90% of ricinoleic acid.

Exemplary hydroxyl functional polymers include but are not limited to Uralac®P 1411, Uralac®P 1420, Uralac®P 1430, Uralac®P 1535, Uralac®P 1580, Uralac®P 1590, Uralac®P 1620, Uralac®P 1680, Uralac®P 2115, Uralac®P 4125, Uralac® P 5504 and Uralac® P 6504, the hydroxyl functional polymers of examples CompVFUR 6, CompVFUR 7 and that of InvVFUR12 used to prepare the corresponding VFURs in the Examples and moreover polymers prepared via esterification from preferably crystallizing polyols and polyacids. Preferably the hydroxyl functional polymers are hydroxyl functional polyester resins; all examples mentioned in this paragraph are hydroxyl functional polyester resins.

The reaction conditions which may be employed in i) (process 1) include temperatures that do not to exceed 120° C. Care must be taken to control the reaction exotherm as well. The reaction is also usually performed in a moisture free atmosphere, such as in a nitrogen atmosphere. It is preferred that the reaction is carried out in the presence of a catalyst such as an organotin catalyst, for example, dibutyltin dilaurate. In the reaction, a stoichiometric equivalent amount of the reactants is employed. Thus, the reactants (Compound A, B and C) are present in a 1:1 mol ratio of isocyanate to hydroxyl groups to ensure complete polymerization.

The reaction conditions which may be employed in ii) (process 2) include temperatures in the range of −20 to 120° C. Care must be taken to control the urethane reaction exotherm. The reaction is also usually performed in a moisture-free atmosphere, such as in a nitrogen atmosphere. It is also preferred that the reaction is carried out in the presence of a catalyst. A particularly preferred catalyst is one that contains tin, for example, dibutyltin dilaurate. In the reaction, a stoichiometric excess amount of the aliphatic diisocyanate is employed. Generally, the reactants (Compound A and C) for the preparation of the adduct (step 1 of process 2) are preferably present in a molar ratio (total mol of isocyanate groups to total mol of hydroxyl groups) ranging from 40:1 to 3.97:1; more preferably, said reactants are present in a molar ratio of 10:1. The reaction conditions which may be employed for step 2 of process 2 are generally the same as those for the step 1 of process 2. Usually, this step 2 will immediately follow the completion of step 1 in the same reaction vessel. Care must be taken here as well to control the exotherm. Preferably, the total of reactants (Compounds A, B and C) employed in steps 1 and 2 of process 2 are present in a 1:1 mol ratio of isocyanate to hydroxyl groups to ensure complete polymerization and to ensure that $R_{VRUF}$ is according to the invention. Preferably, the amount of Compound B added during the step 2 of the process 2, is chosen such that the total of reactants (Compounds A, B and C) employed in steps 1 and 2 of process 2 are present in a 1:1 mol ratio of isocyanate to hydroxyl groups to ensure complete polymerization and to ensure that $R_{VRUF}$ is according to the invention.

All preferred elements and embodiments presented herein for the VFUR and/or for any one of the resins encompassed by the definition of the VFUR apply equally to each other.

Vinyl Functionalized Urethane Resin Composition (VFURC) of the Invention and Process for Making VFURC This invention provides crystalline vinyl functionalized urethane resin compositions (VFURC); said compositions are particularly useful as curing agents in thermosetting powder coating compositions and powder coatings; the crystalline vinyl functionalized urethane resin compositions (VFURC) of the invention comprise at least a first vinyl functionalized urethane resin (FVFUR) and a second vinyl functionalized urethane resin (SVFUR), wherein
at least one of the FVFUR or the SVFUR is crystalline; and
the VFURC is crystalline; and
the VFURC has a $R_{VFURC}$ of at least 1.04 and of at most 1.80,
whereas $R_{VFURC}$ is defined as the following ratio described in Formula II:

$$R_{VFURC}=\text{[peak area of the chemical shift of the urethane proton ( ... —NH— ... ) of the urethane bonds ( ... —NH—C(=O)—O— ... ) in VFURC]/[peak area of the chemical shift of the methine proton ( ... —CH= ... ) of the vinyl groups ( ... —CH=CH}_2\text{) in VFURC]} \quad \text{(Formula II)}$$

and $R_{VFURC}$ is measured via $^1$H-NMR spectroscopy according to the method entitled "$^1$H-NMR method $R_{VFURC}$" described in the Examples.

Preferably, the vinyl functionalized urethane resin composition (VFURC) of the invention comprises at least a first vinyl functionalized urethane resin (FVFUR) and a second vinyl functionalized urethane resin (SVFUR), wherein
at least one of the FVFUR or the SVFUR is prepared from
at least a compound A comprising isocyanate groups; and
at least a compound B comprising hydroxyl groups and said compound B is selected from the group consisting of compounds comprising vinyl ether groups (VET), compounds comprising vinyl ester groups (VES), compounds comprising vinyl ether and vinyl ester groups (VET-VES); and
at least an organic compound C having hydroxyl groups and
wherein
at least one of the FVFUR or the SVFUR is crystalline; and
the VFURC is crystalline; and
the VFURC has a $R_{VFURC}$ of at least 1.04 and at most 1.80,
whereas $R_{VFURC}$ is defined as the following ratio described in Formula II:

$$R_{VFURC}=\text{[peak area of the chemical shift of the urethane proton ( ... —NH— ... ) of the urethane bonds ( ... —NH—C(=O)—O— ... ) in VFURC]/[peak area of the chemical shift of the methine proton ( ... —CH= ... ) of the vinyl groups ( ... —CH=CH}_2\text{) in VFURC]} \quad \text{(Formula II)}$$

and $R_{VFURC}$ is measured via $^1$H-NMR spectroscopy according to the method entitled "$^1$H-NMR method $R_{VFURC}$" described in the Examples.

Each of the FVFUR or the SVFUR can be different from the VFUR of the invention; preferably, the FVFUR or the SVFUR is the VFUR according to the invention, more preferably each of the FVFUR and the SVFUR, is the VFUR according to the invention. All preferred elements and embodiments presented herein for the VFUR apply equally for each of the FVFUR and SVFUR.

Each of the FVFUR or SVFUR may be prepared from the reactants and according to processes used for the preparation of the VFUR of the invention and described herein for the case of VFUR. Moreover, each of the FVFUR or SVFUR, preferably both of them are prepared from the reactants and according to processes used for the preparation of the VFUR of the invention and described herein for the case of VFUR.

Preferably, the vinyl functionalized urethane resin composition (VFURC) of the invention is prepared by a process comprising the steps of:

providing a FVFUR;
providing a SVFUR;
mixing together the FVFUR and SVFUR to obtain said vinyl functionalized urethane resin composition (VFURC).

The mixing of FVFUR and SVFUR may be effected by physical blending or blending in the melt or any other way to this purpose, known in the art; preferably the mixing of FVFUR and SVFUR is effected by physical blending and/or blending in the melt.

The amounts of FVFUR and SVFUR in the VFURC can vary; however said amounts should be such to ensure that the vinyl functionalized urethane resin composition (VFURC) of the invention is:
a) crystalline and
b) the $R_{VFURC}$ is within the relevant range and any one of said range's preferred embodiments, disclosed in the present invention.

For example, in order to prepare a crystalline VFURC with $R_{VFURC}$=1.19, one part of crystalline CompVFUR1 ($R_{FVFUR}$=1.02) (Table 2) and one part of crystalline InvVFUR9 ($R_{SVFUR}$=1.42) (Table 3) can be mixed together. For example, in order to prepare a crystalline VFURC with $R_{VFURC}$=1.19, two parts of crystalline CompVFUR1 ($R_{FVFUR}$=1.02) (Table 2) and one part of crystalline InvVFUR10 ($R_{SVFUR}$=1.69) (Table 3) can be mixed together. For example, in order to prepare a crystalline VFURC with $R_{VFURC}$=1.46, one part of crystalline InvVFUR2 ($R_{FVFUR}$=1.14) (Table 2) and two parts of crystalline InvVFUR10 ($R_{SVFUR}$=1.69) (Table 3) can be mixed together. All WPU and $R_{FVFUR}$ and $R_{SVFUR}$ values mentioned in the examples of this paragraph are measured values according to corresponding methods described herein.

Preferably, FVFUR or SVFUR are prepared by a process comprising the step of reacting compound A said compound A comprising isocyanate groups, with a compound B and an organic compound C said compound B comprising hydroxyl groups and said compound B is selected from the group consisting of compounds comprising vinyl ether groups (VET), compounds comprising vinyl ester groups (VES), compounds comprising vinyl ether and vinyl ester groups (VET-VES), said organic compound C comprises hydroxyl groups to afford said FVFUR or SVFUR, or alternatively said process comprising the steps:
reacting compound A with organic compound C to form an isocyanate terminated adduct of compound A with the organic compound C, and
reacting the isocyanate terminated adduct of compound A with the organic compound C with compound B to afford said FVFUR or SVFUR.

Preferably the VFURC of the invention has a $R_{VFURC}$ of at least 1.05, most preferably of at least 1.06, especially of at least 1.07, more especially of at least 1.08, most especially of at least 1.10, for example of at least 1.12, for example of at least 1.15, for example of at least 1.17, for example of at least 1.18, for example of at least 1.20. Preferably the VFURC of the invention has a $R_{VFURC}$ of at most 1.79, more preferably of at most 1.78, most preferably of at most 1.77, especially of at most 1.75, more especially of at most 1.73, most especially of at most 1.71, for example of at most 1.70, for example of at most 1.65, for example of at most 1.60, for example of at most 1.55, for example of at most 1.50, for example of at most 1.48, for example of at most 1.45, for example of at most 1.40.

The vinyl functionalized urethane resin compositions (VFURC) of the invention having a $R_{VFURC}$ of at least 1.10, when used in thermosetting powder coating compositions provide inventive thermosetting powder coating compositions which upon curing afford powder coatings that may also have good acetone resistance combined or not combined with any one of the other properties mentioned herein. Preferably, the vinyl functionalized urethane resin compositions (VFURC) of the invention having a $R_{VFURC}$ of at least 1.10, when used in thermosetting powder coating compositions provide inventive thermosetting powder coating compositions which upon curing afford powder coatings having also good acetone resistance combined with any one of the other properties mentioned herein.

The vinyl functionalized urethane resin composition (VFURC) of the invention has preferably a melting enthalpy ($\Delta H_m$) of at least 35, more preferably of at least 38, even more preferably of at least 40, most preferably of at least 50, especially of at least 60 J/g. The vinyl functionalized urethane resin composition (VFURC) of the invention has preferably a melting enthalpy ($\Delta H_m$) of at most 400, more preferably of at most 300, even more preferably of at most 260, most preferably of at most 240, especially of at most 220, more especially of at most 210, most especially of at most 200, for example of at most 180, for example of at most 160, for example of at most 140, for example of at most 130 J/g. The melting enthalpy ($\Delta H_m$) is measured using DSC as described herein.

Thermosetting Powder Coating Compositions of the Invention and Process for Making Said Compositions The invention provides thermosetting powder coating compositions (TPCC) comprising a vinyl functionalized urethane resin (VFUR) as defined herein and/or a vinyl functionalized urethane resin composition (VFURC) as defined herein and an unsaturated resin comprising ethylenic unsaturations (UR). Preferably, the ethylenic unsaturations are di-acid ethylenic unsaturations, more preferably the di-acid ethylenic unsaturations are 2-butenedioic acid ethylenic unsaturations.

Preferably the thermosetting powder coating compositions (TPCC) of the invention have a D of at least 0, more preferably of at least 5, even more preferably of at least 10, most preferably of at least 15, especially of at least 18° C. Preferably the thermosetting powder coating compositions (TPCC) of the invention have a D of at most 35, more preferably of at most 30, even more preferably of at most 25, most preferably of at most 23° C. Preferably the thermosetting powder coating compositions (TPCC) of the invention have a D that ranges from 0 to 35° C., more preferably from 10 to 35° C.

The amount of the VFUR of the invention in the thermosetting powder coating composition of the invention is preferably at least 1, more preferably at least 2, most preferably at least 5, most preferably at least 7, especially at least 10, more especially at least 15, most especially at least 16, for example at least 17, for example at least 18, for example 19% w/w on total amount of UR, VFUR and/or VFURC. The amount of the VFUR in the thermosetting powder coating composition of the invention is preferably at most 60, more preferably at most 50, most preferably at most 45, most preferably at most 40, especially at most 35, more especially at most 30, most especially at most 28, for example at most 25, for example at most 22, for example at most 20% w/w on total amount of UR, VFUR and/or VFURC. Preferably the amount of the VFUR in the thermosetting powder coating composition of the invention ranges from 16 to 31% w/w on total amount of UR, VFUR and/or VFURC.

The amount of the VFURC of the invention in the thermosetting powder coating composition of the invention is preferably at least 1, more preferably at least 2, most preferably at least 5, most preferably at least 7, especially at least 10, more especially at least 15, most especially at least 16, for example at least 17, for example at least 18, for example 19% w/w on total amount of UR, VFUR and/or VFURC. The amount of the VFUR of the invention in the thermosetting powder coating composition of the invention is preferably at most 60, more preferably at most 50, most preferably at most 45, most preferably at most 40, especially at most 35, more especially at most 30, most especially at most 28, for example at most 25, for example at most 22, for example at most 20% w/w on total amount of UR, VFUR and/or VFURC. Preferably the amount of the VFUR of the invention in the thermosetting powder coating composition of the invention ranges from 16 to 31% w/w on total amount of UR, VFUR and/or VFURC.

In the thermosetting powder coating composition of the invention, comprising the VFUR and the VFURC the total amount of VFUR and VFURC of the invention in the thermosetting powder coating composition of the invention is preferably at least 1, more preferably at least 2, most preferably at least 5, most preferably at least 7, especially at least 10, more especially at least 15, most especially at least 16, for example at least 17, for example at least 18, for example 19% w/w on total amount of UR, VFUR and/or VFURC. The amount of the VFUR and VFURC of the invention in the thermosetting powder coating composition of the invention is preferably at most 60, more preferably at most 50, most preferably at most 45, most preferably at most 40, especially at most 35, more especially at most 30, most especially at most 28, for example at most 25, for example at most 22, for example at most 20% w/w on total amount of UR, VFUR and/or VFURC. Preferably the amount of the VFUR and VFURC of the invention in the thermosetting powder coating composition of the invention ranges from 16 to 31% w/w on total amount of UR, VFUR and/or VFURC.

The amount of the unsaturated resin comprising ethylenic unsaturations (UR) in the thermosetting powder coating composition of the invention is preferably at least 40, more preferably at least 50, most preferably at least 55, most preferably at least 60, especially at least 65, more especially at least 69, most especially at least 70, for example at least 71, for example at least 72% w/w on total amount of UR, VFUR and/or VFURC. The amount of the unsaturated resin comprising ethylenic unsaturations in the thermosetting powder coating composition of the invention is preferably at most 99, more preferably at most 95, most preferably at most 90, most preferably at most 88, especially at most 86, more especially at most 84, most especially at most 82, for example at most 81, for example at most 80% w/w on total amount of UR, VFUR and/or VFURC. Preferably the amount of the unsaturated resin comprising ethylenic unsaturations in the thermosetting powder coating composition of the invention ranges from 69 to 84% w/w on total amount of UR, VFUR and/or VFURC.

Preferably, the molar ratio of the vinyl unsaturations in the VFUR and/or VFURC and the ethylenic unsaturations of the unsaturated resin comprising ethylenic unsaturations may range between 9:1 and 1:9, preferably between 2:1 and 1:2. Preferably, equimolar amounts of unsaturations between the VFUR and/or VFURC and the unsaturated resin comprising ethylenic unsaturations are particularly recommended to be used in formulating the thermosetting powder coating compositions of the invention.

The amount of the unsaturated resin comprising ethylenic unsaturations (UR) in the thermosetting powder coating composition of the invention is preferably at least 40, more preferably at least 50, most preferably at least 55, most preferably at least 60, especially at least 65, more especially at least 69, most especially at least 70, for example at least 71, for example at least 72% w/w on total amount of UR, VFUR and/or VFURC. The amount of the unsaturated resin comprising ethylenic unsaturations in the thermosetting powder coating composition of the invention is preferably at most 99, more preferably at most 95, most preferably at most 90, most preferably at most 88, especially at most 86, more especially at most 84, most especially at most 82, for example at most 81, for example at most 80% w/w on total amount of UR, VFUR and/or VFURC. Preferably the amount of the unsaturated resin comprising ethylenic unsaturations in the thermosetting powder coating composition of the invention preferably ranges from 69 to 84% w/w on total amount of UR, VFUR and/or VFURC.

Preferably, the unsaturated resin comprising ethylenic unsaturations (UR) has a $M_n$ of at least 800, more preferably of at least 1000, even more preferably of at least 1500, most preferably of at least 1800, especially of at least 2000, more especially of at least 2500, most especially of at least 3000, for example of at least 3500, for example of at least 4000, for example of at least 5000. Preferably, the unsaturated resin comprising ethylenic unsaturations (UR) has a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da.

Preferably, the unsaturated resin comprising ethylenic unsaturations (UR) has a theoretical WPU of at least 250, more preferably of at least 300, even more preferably of at least 350, most preferably of at least 400, most preferably of at least 450, especially of at least 500 g/mol. Preferably, the unsaturated resin comprising ethylenic unsaturations (UR) has a theoretical WPU of at most 2000, more preferably of at most 1500, even more preferably of at most 1300, most preferably of at most 1200, especially of at most 1000, more especially of at most 900, most especially of at most 850, for example of at most 800 g/mol. Preferably the theoretical WPU of the the unsaturated resin comprising ethylenic unsaturations ranges from 500 to 1000 g/mol.

Preferably, the unsaturated resin comprising ethylenic unsaturations has a WPU of at least 250, more preferably of at least 300, even more preferably of at least 350, most preferably of at least 400, most preferably of at least 450, especially of at least 500 g/mol. the unsaturated resin comprising ethylenic unsaturations has a WPU of at most 2000, more preferably of at most 1500, even more preferably of at most 1300, most preferably of at most 1200, especially of at most 1000, more especially of at most 900, most especially of at most 850, for example of at most 800 g/mol. Preferably the WPU of the the unsaturated resin comprising ethylenic unsaturations ranges from 500 to 1000 g/mol.

In case in which the unsaturated resin comprising ethylenic unsaturations has also acid functional groups e.g. carboxyl groups, then the acid value (AV) of the unsaturated resin comprising ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50 mg KOH/g unsaturated polyester resin. In case in which the unsaturated resin comprising ethylenic unsaturations has also acid functional groups e.g. carboxyl groups, then the acid value (AV) of the unsaturated resin comprising ethylenic unsaturations is preferably at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g unsaturated polyester resin. Preferably the acid value (AV) of the unsaturated resin comprising ethylenic unsaturations ranges from 0.1 to 60 mg KOH/g unsaturated resin comprising ethylenic unsaturations. Preferably, the acid value (AV) of the unsaturated resin comprising ethylenic unsaturations is at most 5, more preferably at most 2 mg KOH/g unsaturated resin comprising ethylenic unsaturations.

In case in which the unsaturated resin comprising ethylenic unsaturations has also hydroxyl groups, then the hydroxyl value (OHV) of the unsaturated resin comprising ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50 mg KOH/g unsaturated polyester resin. In case in which the unsaturated resin comprising ethylenic unsaturations has also acid functional groups e.g. carboxyl groups, then the acid value (AV) of the unsaturated resin comprising ethylenic unsaturations is preferably at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g unsaturated polyester resin. Preferably the hydroxyl value (OHV) of the unsaturated resin comprising ethylenic unsaturations ranges from 0.1 to 70 mg KOH/g unsaturated resin comprising ethylenic unsaturations.

The unsaturated resin comprising ethylenic unsaturations may be amorphous or crystalline.

In case in which the unsaturated resin comprising ethylenic unsaturations is amorphous, said polyester resin has preferably a $M_n$ of at least 800, more preferably of at least 1000, even more preferably of at least 1500, most preferably of at least 1800, especially of at least 2000, more especially of at least 2500, most especially of at least 3000, for example of at least 3500, for example of at least 4000, for example of at least 5000. In case in which the unsaturated resin comprising ethylenic unsaturations is amorphous, said polyester resin has preferably a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da.

In case in which the unsaturated resin comprising ethylenic unsaturations is amorphous, said resin has preferably a theoretical WPU of at least 250, more preferably at least 350, for example at least 400, for example at least 450, for example at least 500 g/mol. In case in which the unsaturated resin comprising ethylenic unsaturations is amorphous, said resin has preferably a theoretical WPU of at most 2000, more preferably at most 1600, even more preferably at most 1400, most preferably at most 1200, especially at most 1000, more especially at most 900, even more especially at most 850, most especially at most 800 g/mol.

In case in which the unsaturated resin comprising ethylenic unsaturations is amorphous, said resin has preferably a WPU of at least 250, more preferably at least 350, for example at least 400, for example at least 450, for example at least 500 g/mol. In case in which the unsaturated resin comprising ethylenic unsaturations is amorphous, said resin has preferably a WPU of at most 2000, more preferably at most 1600, even more preferably at most 1400, most preferably at most 1200, especially at most 1000, more especially at most 900, even more especially at most 850, most especially at most 800 g/mol.

In case in which the unsaturated resin comprising ethylenic unsaturations is amorphous, said resin has preferably a glass transition temperature ($T_g$) of at least 20, more preferably of at least 25, even more preferably of at least 30, most preferably of at least 40, especially of at least 45, more especially of at least 50. In case in which the unsaturated resin comprising ethylenic unsaturations is amorphous, said resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 65, for example of at most 60° C.

In case in which the unsaturated resin comprising ethylenic unsaturations is amorphous, said resin has preferably a theoretical WPU of at least 250, more preferably at least 350, for example at least 400, for example at least 450, for example at least 500 g/mol. In case in which the unsaturated resin comprising ethylenic unsaturations is amorphous, said resin has preferably a theoretical WPU of at most 2000, more preferably at most 1600, even more preferably at most 1400, most preferably at most 1200, especially at most 1000, more especially at most 900, even more especially at most 850, most especially at most 800 g/mol.

In case in which the unsaturated resin comprising ethylenic unsaturations is amorphous, said resin has preferably a viscosity of at least 1, more preferably of at least 5, even more preferably of at least 10, most preferably of at least 15 Pa·s. In case in which the unsaturated resin comprising ethylenic unsaturations is amorphous, said resin has preferably a viscosity of at most 400, more preferably of at most 300, even more preferably of at most 200, most preferably of at most 150, especially of at most 100, more especially of at most 80, most especially of at most 50 Pa·s. In case in which the unsaturated resin comprising ethylenic unsaturations is amorphous, said resin has preferably a viscosity in the range of from 15 to 30 Pa·s.

In case in which the unsaturated resin comprising ethylenic unsaturations is crystalline, said polyester resin has preferably a $M_n$ of at least 800, more preferably of at least 1000, even more preferably of at least 1500, most preferably of at least 1800, especially of at least 2000, more especially of at least 2500, most especially of at least 3000, for example of at least 3500, for example of at least 4000, for example of at least 5000. In case in which the unsaturated resin comprising ethylenic unsaturations is crystalline, said polyester resin has preferably a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da.

In case in which the unsaturated resin comprising ethylenic unsaturations is crystalline, said resin has preferably a theoretical WPU of at least 250, more preferably at least 350, for example at least 400, for example at least 450, for example at least 500 g/mol. In case in which the unsaturated resin comprising ethylenic unsaturations is crystalline, said resin has preferably a theoretical WPU of at most 2000, more preferably at most 1600, even more preferably at most 1400, most preferably at most 1200, especially at most 1000, more especially at most 900, even more especially at most 850, most especially at most 800 g/mol.

In case in which the unsaturated resin comprising ethylenic unsaturations is crystalline, said resin has preferably a WPU of at least 250, more preferably at least 350, for example at least 400, for example at least 450, for example at least 500 g/mol. In case in which the unsaturated resin comprising ethylenic unsaturations is crystalline, said resin has preferably a WPU of at most 2000, more preferably at most 1600, even more preferably at most 1400, most preferably at most 1200, especially at most 1000, more especially at most 900, even more especially at most 850, most especially at most 800 g/mol.

In case in which the unsaturated resin comprising ethylenic unsaturations is crystalline, said polyester has preferably a glass transition temperature ($T_g$) of at least −70° C., more preferably of at least −50° C., even more preferably of at least −30° C., even more preferably of at least −20° C., most preferably of at least −10° C., especially of at least 0° C., more especially of at least 10° C., even more especially of at least 20° C. In case in which the unsaturated resin comprising ethylenic unsaturations is crystalline, said resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 60, for example of at most 50° C.

In case in which the unsaturated resin comprising ethylenic unsaturations is crystalline, said resin has preferably a melting temperature ($T_m$) of at least 30, more preferably of at least 40, more preferably of at least 50, most preferably of at least 60° C. In case in which the unsaturated resin comprising ethylenic unsaturations is crystalline, said resin has preferably a melting temperature ($T_m$) of at most 200, more preferably at most 180, even more preferably at most 160, even more preferably at most 140, most preferably at most 120, especially at most 100° C.

In case in which the unsaturated resin comprising ethylenic unsaturations is crystalline, said resin has preferably a crystallization temperature ($T_c$) of at least 30, more preferably of at least 40° C. In case in which the unsaturated resin comprising ethylenic unsaturations is crystalline, said resin has preferably a crystallization temperature ($T_c$) of at most 200, more preferably of at most 180, even more preferably of at most 160, more preferably of at most 140, most preferably at most 120, especially at most 100.

In case in which the unsaturated resin comprising ethylenic unsaturations is crystalline, said resin has preferably a melting enthalpy ($\Delta H_m$) of at least 35, more preferably of at least 38, even more preferably of at least 40, most preferably of at least 50, especially of at least 60 J/g. In case in which the unsaturated resin comprising ethylenic unsaturations is crystalline, said resin has preferably a melting enthalpy ($\Delta H_m$) of at most 400, more preferably of at most 300, most preferably of at most 260, especially of at most 240, more especially of at most 220, most especially of at most 200, for example of at most 180, for example of at most 160, for example of at most 140, for example of at most 130 J/g. The melting enthalpy ($\Delta H_m$) is measured using DSC as described herein.

In case in which the unsaturated polyester resin comprising ethylenic unsaturations is crystalline, said polyester resin has preferably a viscosity of at least 0.001, more preferably of at least 0.01, even more preferably of at least 0.1, Pa·s. In case in which the unsaturated polyester resin comprising ethylenic unsaturations is crystalline, said polyester resin has preferably a viscosity of at most 100, more preferably of at most 50, even more preferably of at most 30, most preferably of at most 25, especially of at most 15, more especially of at most 10, most especially of at most 5 Pa·s. In case in which the unsaturated polyester resin comprising ethylenic unsaturations is crystalline, said polyester resin has preferably a viscosity in the range of from 0.1 to 5 Pa·s.

Preferably, the unsaturated resin comprising ethylenic unsaturations (UR) is selected from the group consisting of polyester resins, acrylic resins (polyacrylates), polyurethanes, epoxy resins, polyamides, polyesteramides, polycarbonates, polyureas and combinations thereof; more preferably the UR is selected from the group consisting of polyester resins, polyurethanes, polyamides, polyesteramides, polyureas; most preferably the UR is selected from the group consisting of unsaturated polyester resins, acrylic resins (polyacrylates), unsaturated polyurethanes, unsaturated epoxy resins, unsaturated polyamides, unsaturated polyesteramides, unsaturated polycarbonates, unsaturated polyureas and combinations thereof; especially the UR is selected from the group consisting of unsaturated polyester resins, unsaturated polyurethanes, unsaturated polyamides, unsaturated polyesteramides, unsaturated polyureas and combinations thereof. For example the UR is a polyester resin; most preferably the UR is an unsaturated polyester resin; most preferably the UR is an unsaturated polyester resin comprising ethylenic unsaturations such as acrylated polyester resins, unsaturated polyester resins comprising di-acid ethylenic unsaturations, unsaturated polyester resins comprising 2-butenedioic acid ethylenic unsaturations; especially the UR is an unsaturated polyester resin comprising di-acid ethylenic unsaturations; more especially the UR is an unsaturated polyester resin comprising 2-butenedioic acid ethylenic unsaturations.

The UR may be a polyacrylate, also known as acrylic resin. Generally, an acrylic resin is based on alkyl esters of acrylic acid or methacrylic acid, optionally in combination with styrene. These alkyl esters of acrylic or methacrylic acid may be replaced by hydroxyl or glycidyl functional acrylic or methacrylic acids. Exemplary alkyl esters of acrylic or methacrylic acids include but are not limited to ethyl methacrylate, ethyl acrylate, isopropyl methacrylate, isopropyl acrylate, n-butyl methacrylate, n-butyl acrylate, n-propyl methacrylate, n-propyl acrylate, isobutyl methacrylate, isobutyl acrylate, ethylhexyl acrylate, cyclohexyl methacrylate, cyclohexyl acrylate and mixtures thereof. To obtain an acrylic resin having a hydroxyl functionality, the acrylic resin contains a hydroxyl functional (meth)acrylic acid [by the term "(meth)acrylic" is meant herein "methacrylic or acrylic"], preferably in combination with alkyl esters of (meth)acrylic acid. Examples of hydroxyl functional (meth)acrylic acid esters include hydroxyethyl (meth)acrylate, and hydroxypropyl (meth)acrylate etc. To obtain an acrylic resin having a glycidyl functionality, the acrylic resin contains a glycidyl functional (meth)acrylic acid esters, preferably in combination with alkyl esters of (meth)acrylic acid. Examples of glycidyl functional (meth)acrylic acid esters include glycidyl methacrylate, etc. It is also possible to synthesize acrylic resins with both hydroxyl and glycidyl functionality.

The UR may be a polyurethane. Polyurethanes can for example be prepared using customary, generally known polyaddition reaction of a (poly)isocyanate with a (poly) alcohol in the presence of, if needed a catalyst and other additives. For example, if needed, customary catalysts such as, for example tertiary amines or organometallic compounds, such as for example monobutyltin, tris(2-ethylhexanoate), tetrabutyl titanate or dibutyl tin dilaurate can be used. Examples of amounts of these catalysts used are usually around 0.01 wt % based on the total weight of the resin. Examples of the (poly)alcohols that may be used in the preparation of polyurethanes are the same as those that can be used in the preparation of a polyester resin. Examples of isocyanates that may be used in the preparation of polyurethanes include but are not limited to those mentioned herein for the preparation of the VFUR.

The UR may be an epoxy resin. Epoxy resins may for example be prepared from phenolic compounds in combination with epichlorohydrins resulting in epoxy resins like for example a bisphenol A diglycidyl ether such as is commercially available as Epicote 1001 or a Novolac epoxide.

The UR may be a polyamide. Polyamides can for example be prepared by a polycondensation reaction of a diamine and a dicarboxylic acid. The dicarboxylic acids may be branched, non-linear or linear. Exemplary dicarboxylic acids include but are not limited to phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, phenylenedi (oxyacetic acid), sebacic acid, succinic acid, adipic acid, glutaric acid and/or azelaic acid. Exemplary diamines include but are not limited to isophorondiamine, 1,2-ethylenediamine, 1,3-propylenediamine, 1,6-hexamethylenediamine, 1,12-dodecylenediamine, 1,4 cyclohexanebismethylamine, piperazine, p-xylylenediamine and/or m-xylylenediamine. The polyamide may also be branched using branching agents. Exemplary branching agents include but are not limited to amines for example di-alkylene-triamines, such as for example di-ethylene-triamine or di-hexamethylene-triamine; di-alkylene-tetramines or di-alkylene-pentamines; acids, for example 1,3,5-benzene tricarboxylic acid, trimellitic anhydride or pyromelitic anhydride; and poly-functional amino acids, such as for example aspartic acid or glutamic acid.

The UR may be a polyesteramide. Polyesteramides are resins containing both ester bonds (as in a polyester) and amide bonds (as in a polyamide) and may for example be prepared from mono-, di-, tri- or polyfunctional monomers, such as monomers with carboxylic acid functionality, monomers with hydroxyl functionality, monomers with amine functionality and/or monomers having a combination of any of these functionalities.

The UR may be a polycarbonate.

The UR may be a polyurea. Polyureas can for example be prepared using customary, generally known polyaddition reactions of a (poly)isocyanate with a (poly)amine in the presence of, if needed a catalyst and other additives similar to what is described above for polyurethanes. Suitable (poly)amines for the preparation of polyureas include those as are exemplified above for the polyamides. Suitable (poly) isocyanates for the preparation of polyureas include those as are exemplified above for the polyurethanes.

The UR may be a polyester. Preferably the UR is an unsaturated polyester resin; most preferably the UR is an unsaturated polyester resin comprising ethylenic unsaturations such as acrylated polyester resins, unsaturated polyester resins comprising di-acid ethylenic unsaturations, unsaturated polyester resins comprising 2-butenedioic acid ethylenic unsaturations; especially the UR is an unsaturated polyester resin comprising di-acid ethylenic unsaturations; more especially the UR is an unsaturated polyester resin comprising 2-butenedioic acid ethylenic unsaturations. The unsaturated polyester resins comprising ethylenic unsaturations may be amorphous or crystalline. The unsaturated polyester resin comprising di-acid ethylenic unsaturations may be amorphous or crystalline. The unsaturated polyester resins comprising 2-butenedioic acid ethylenic unsaturations may be amorphous or crystalline.

Polyesters (or commonly known in the art as polyester resins) are generally polycondensation products of polyols and polycarboxylic acids. According to the invention a polyester resin is preferably the polycondensation product of polyols and polycarboxylic acids, more preferably a polyester resin is the polycondensation product of dicarboxylic acids, di-alcohols (diols) and/or trifunctional alcohols and/or trifunctional carboxylic acids.

Examples of polycarboxylic acids, especially dicarboxylic acids which may be used in the preparation of a polyester resininclude isophthalic acid, terephthalic acid, hexahydroterephthalic acid, 2,6-naphthalenedicarboxylic acid and 4,4'-oxybisbenzoic acid, 3,6-dichlorophthalic acid, tetrachlorophthalic acid, tetrahydrophthalic acid, hexahydroterephthalic acid, hexachloroendomethylenetetrahydrophthalic acid, endomethylenetetrahydrophthalic acid, phthalic acid, azelaic acid, sebacic acid, decanedicarboxylic acid, adipic acid, succinic acid and trimellitic acid. These illustrative polycarboxylic acids can be used in their acid form or where available, in the form of their anhydrides, acyl chlorides or lower alkyl esters. Mixtures of polycarboxylic acids can also be used. In addition hydroxycarboxylic acids and lactones can be used. Examples include hydroxypivalic acid and ε-caprolactone.

Polyols, in particular diols, can be reacted with the carboxylic acids or their analogues as described above to prepare the polyester resin resin. Examples of polyols include aliphatic diols, for example, ethylene glycol, propane-1,2-diol, propane-1,3-diol, butane-1,2-diol, butane-1, 4-diol, butane-1,3-diol, 2,2-dimethylpropane-1,3-diol (neopentyl glycol), hexane-2,5-diol, hexane-1,6-diol, 2,2-bis-(4-hydroxycyclohexyl)-propane (hydrogenated bisphenol-A), 1,4-dimethylolcyclohexane, diethylene glycol, dipropylene glycol and 2,2-bis[4-(2-hydroxyethoxy)-phenyl]propane, the hydroxypivalic ester of neopentylglycol and 4,8-bis-(hydroxymethyl)tricyclo[5,2,1,0]decane (=tricyclodecane dimethylol) and 2,3-butenediol.

Monofunctional carboxylic acids, for example para-tert-butyl benzoic acid, benzoic acid, methyl benzoic acid, cinnamic acid, crotonic acid may be used to block the polymer chain.

Trifunctional or more functional alcohols or carboxylic acids can be used to obtain branched polyester resins. Examples of suitable trifunctional or more functional alcohols or carboxylic acids include but not limited to glycerol, hexanetriol, trimethylol ethane, trimethylol propane, pentaerythritol and sorbitol, trimellitic acid, trimellitic acid anhydride, pyromellitic acid dimethylolpropionic acid (DMPA). To obtain branched polyester resins trifunctional monomers such as trimethylolpropane may be used.

The polyester resins can be prepared via customary, generally known polymerization methods by conventional esterification and/or transesterification or by esterification and/or transesterification via the use of an enzyme. For example, if needed, customary esterification catalysts such as, for example, butylchlorotindihydroxide, dibutyltin oxide, tetrabutyl titanate or butyl stannoic acid can be used. Examples of amounts of these esterification catalysts used are usually around 0.1 wt % based on the total weight of the polyester resin.

The conditions for preparing a polyester resin and the COOH/OH ratio can be chosen such that end products are obtained which have an acid value or hydroxyl value which is within the intended range of values.

The polyester resins used in the thermosetting powder coating compositions of the invention are unsaturated polyester resins comprising ethylenic unsaturations, preferably comprising di-acid ethylenic unsaturations, more preferably comprising 2-butenedioic acid ethylenic unsaturations; said ethylenic unsaturations may be present in the backbone of the polyester resin and/or pendant to the backbone of the polyester resin and/or at the terminus of the polyester resin. Preferably, said ethylenic unsaturations are in the backbone of the polyester resin and/or pendant to the backbone of the polyester resin, more preferably said ethylenic unsaturations are in the backbone of the polyester resin; said ethylenic unsaturations may be built into the polyester resin backbone, for instance by reacting a hydroxyl functional monomer (such as the polyalcohols mentioned before) with an unsaturated di-acid monomer as mentioned above. It is also possible to connect the di-acid ethylenic unsaturation to the terminus (or termini) of the polyester resin, for example by reacting a hydroxyl functional terminal group of the polyester resin with an unsaturated di-acid monomer or its corresponding anhydride as mentioned above.

Acrylated polyester resins are unsaturated polyester resins comprising ethylenic unsaturations said ethylenic unsaturations been derived from methacrylic acid, acrylic acid, ethylenically unsaturated glycidyl functional monomer, such as for example glycidyl methacrylate or glycidyl acrylate; in the acrylated polyester resins said ethylenic unsaturations are typically at the terminus (or termini) of the unsaturated polyester resin. Acrylated polyester resins may be prepared by reacting for example a hydroxyl or an epoxy or an amine functional (preferably also terminal) group of a polyester resin with methacrylic acid, acrylic acid, ethylenically unsaturated glycidyl functional monomer, such as for example glycidyl methacrylate or glycidyl acrylate. Alternatively, an acrylated polyester resin may be prepared by reacting a carboxyl functional (preferably also terminal) group of a polyester resin with an ethylenically unsaturated glycidyl functional monomer, such as for example glycidyl methacrylate or glycidyl acrylate.

Preferably polyester resins comprising di-acid ethylenic unsaturations have di-acids chosen from the group consisting of any isomer of 2-butenedioic acid, 2-methyl-2-butenedioic acid, itaconic acid and mixtures thereof. Derivatives of any isomer of unsaturated di-acids include esters, anhydrides, acid salts. Fumaric acid and maleic acid are isomers of 2-butenedioic acid, whereas citraconic acid and mesaconic acid are isomers of 2-methyl-2-butenedioic acid. For example "di-acid ethylenic unsaturations" may be obtainable from fumaric, maleic, itaconic, citraconic and/or mesaconic acids, derivatives thereof and/or mixtures thereof. Fumaric acid based unsaturation is an informal term used herein to denote unsaturation derived from fumaric acid, its isomers e.g. maleic acid and/or derivatives thereof. More preferably the di-acids are chosen from the group consisting of any isomer of 2-butenedioc acid, itaconic acid and mixtures thereof, even more the di-acids are chosen from the group consisting of any isomer of 2-butenedioc acid. Besides 2-butenedioic acid ethylenic unsaturations, the unsaturated polyester resin may of course also have other di-acid ethylenic unsaturations.

Preferably, the unsaturated polyester resin comprising ethylenic unsaturations such as di-acid ethylenic unsaturations such as 2-butenedioic acid ethylenic unsaturations is obtainable from at least the following monomers: unsaturated di-acid for example any isomer of 2-butenedioic acid, 2-methyl-2-butenedioic acid, itaconic acid, derivatives thereof and/or mixtures thereof, terephthalic acid, neopentylglycol and/or propylene glycol. Trifunctional monomers such as trimethylolpropane may be used in order to obtain branched unsaturated polyester resin comprising ethylenic unsaturations such as di-acid ethylenic unsaturations such as 2-butenedioic acid ethylenic unsaturations.

The amount of the unsaturated polyester resin comprising ethylenic unsaturations such as di-acid ethylenic unsaturations such as 2-butenedioic acid ethylenic unsaturations is preferably at least 40, more preferably at least 50, most preferably at least 55, most preferably at least 60, especially at least 65, more especially at least 69, most especially at least 70, for example at least 71, for example at least 72% w/w on total amount of UR, VFUR and/or VFURC. The amount of the unsaturated polyester resin comprising ethylenic unsaturations such as di-acid ethylenic unsaturations such as 2-butenedioic acid ethylenic unsaturations is preferably at most 99, more preferably at most 95, most preferably at most 90, most preferably at most 88, especially at most 86, more especially at most 84, most especially at most 82, for example at most 81, for example at most 80% w/w on total amount of UR, VFUR and/or VFURC. Preferably the amount of the unsaturated polyester resin comprising ethylenic unsaturations such as di-acid ethylenic unsaturations such as 2-butenedioic acid ethylenic unsaturations in a thermosetting powder coating composition ranges from 69 to 84% w/w on total amount of UR, VFUR and/or VFURC.

The $M_n$ of the unsaturated polyester resin comprising ethylenic unsaturations such as di-acid ethylenic unsaturations such as 2-butenedioic acid ethylenic unsaturations is preferably at least 800, more preferably at least 1000, even more preferably at least 1500, most preferably at least 1800, especially at least 2000, more especially at least 2500, most especially at least 3000, for example at least 3500, for example at least 4000, for example at least 5000. The $M_n$ of the unsaturated polyester resin comprising ethylenic unsaturations such as di-acid ethylenic unsaturations such as 2-butenedioic acid ethylenic unsaturations is preferably at most 20000, more preferably at most 10000, even more preferably at most 9000, most preferably at most 8000, especially at most 7000, more especially at most 6000, most especially at most 5000, for example at most 4000, for example at most 3500, for example at most 3000, for example at most 2500, for example at most 2200 Da.

The theoretical WPU of the unsaturated polyester resin comprising ethylenic unsaturations such as di-acid ethylenic unsaturations such as 2-butenedioic acid ethylenic unsaturations is preferably at least 250, more preferably at least 300, even more preferably at least 350, most preferably at least 400, most preferably at least 450, especially at least 500 g/mol. Preferably, the theoretical WPU of the unsaturated polyester resin comprising ethylenic unsaturations such as di-acid ethylenic unsaturations such as 2-butenedioic acid ethylenic unsaturations is at most 2000, more preferably at most 1500, even more preferably at most 1300, most preferably at most 1200, especially at most 1000, more especially at most 900, most especially at most 850, for example at most 800 g/mol. Preferably the theoretical WPU of the unsaturated polyester resin comprising ethylenic unsaturations such as di-acid ethylenic unsaturations such as 2-butenedioic acid ethylenic unsaturations ranges from 500 to 1000 g/mol.

The WPU of the unsaturated polyester resin comprising ethylenic unsaturations such as di-acid ethylenic unsaturations such as 2-butenedioic acid ethylenic unsaturations is preferably at least 250, more preferably at least 300, even more preferably at least 350, most preferably at least 400, most preferably at least 450, especially at least 500 g/mol. Preferably, the WPU of the unsaturated polyester resin comprising ethylenic unsaturations such as di-acid ethylenic unsaturations such as 2-butenedioic acid ethylenic unsaturations is at most 2000, more preferably at most 1500, even more preferably at most 1300, most preferably at most 1200, especially at most 1000, more especially at most 900, most especially at most 850, for example at most 800 g/mol. Preferably the WPU of the unsaturated polyester resin comprising ethylenic unsaturations such as di-acid ethylenic unsaturations such as 2-butenedioic acid ethylenic unsaturations ranges from 500 to 1000 g/mol.

The acid value (AV) of the unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50 mg KOH/g unsaturated polyester resin. The acid value (AV) of the unsaturated polyester resin comprising ethylenic unsaturations such as di-acid ethylenic unsaturations such as 2-butenedioic acid ethylenic unsaturations is preferably at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g unsaturated polyester resin. Preferably the acid value (AV) of the unsaturated polyester resin comprising ethylenic unsaturations such as di-acid ethylenic unsaturations such as 2-butenedioic acid ethylenic unsaturations is from 0.1 to 60 mg KOH/g unsaturated polyester resin. Preferably, the acid value (AV) of an unsaturated polyester resin comprising ethylenic unsaturations such as di-acid ethylenic unsaturations such as 2-butenedioic acid ethylenic unsaturations is at most 5 mg KOH/g unsaturated polyester resin, more preferably at most 2 mg KOH/g unsaturated polyester resin.

The hydroxyl value (OHV) of the unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50 mg KOH/g unsaturated polyester resin. The hydroxyl value (OHV) of the unsaturated polyester resin comprising ethylenic unsaturations such as di-acid ethylenic unsaturations such as 2-butenedioic acid ethylenic unsaturations is preferably at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g unsaturated polyester resin. Preferably the hydroxyl value (OHV) of the unsaturated polyester resin comprising ethylenic unsaturations such as 2-butenedioic acid ethylenic unsaturations is from 0.1 to 70 mg KOH/g unsaturated polyester resin.

The unsaturated polyester resins comprising ethylenic unsaturations may be amorphous or crystalline.

The unsaturated polyester resin comprising di-acid ethylenic unsaturations may be amorphous or crystalline.

The unsaturated polyester resins comprising 2-butenedioic acid ethylenic unsaturations may be amorphous or crystalline.

In case in which the unsaturated polyester resin comprising ethylenic unsaturations such as di-acid ethylenic unsaturations such as 2-butenedioic acid ethylenic unsaturations, is amorphous, said polyester resin has preferably a theoretical WPU of at least 250, more preferably at least 350, for example at least 400, for example at least 450, for example at least 500 g/mol. In case in which the unsaturated polyester resin comprising ethylenic unsaturations such as di-acid ethylenic unsaturations such as 2-butenedioic acid ethylenic unsaturations, is amorphous, said polyester resin has preferably a theoretical WPU of at most 2000, more preferably at most 1600, even more preferably at most 1400, most preferably at most 1200, especially at most 1000, more especially at most 900, even more especially at most 850, most especially at most 800 g/mol.

In case in which the unsaturated polyester resin comprising ethylenic unsaturations such as di-acid ethylenic unsaturations such as 2-butenedioic acid ethylenic unsaturations, is amorphous, said polyester resin has preferably a WPU of at least 250, more preferably at least 350, for example at least 400, for example at least 450, for example at least 500 g/mol. In case in which the unsaturated polyester resin comprising ethylenic unsaturations such as di-acid ethylenic unsaturations such as 2-butenedioic acid ethylenic unsaturations, is amorphous, said polyester resin has preferably a WPU of at most 2000, more preferably at most 1600, even more preferably at most 1400, most preferably at most 1200, especially at most 1000, more especially at most 900, even more especially at most 850, most especially at most 800 g/mol.

In case in which the unsaturated polyester resin comprising ethylenic unsaturations such as di-acid ethylenic unsaturations such as 2-butenedioic acid ethylenic unsaturations, is amorphous, said polyester resin has preferably a glass transition temperature ($T_g$) of at least 20, more preferably of at least 25, even more preferably of at least 30, most preferably of at least 40, especially of at least 45, more especially of at least 50. In case in which the unsaturated polyester resin comprising ethylenic unsaturations such as di-acid ethylenic unsaturations such as 2-butenedioic acid ethylenic unsaturations, is amorphous, said polyester resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 65, for example of at most 60° C.

In case in which the unsaturated polyester resin comprising ethylenic unsaturations such as di-acid ethylenic unsaturations such as 2-butenedioic acid ethylenic unsaturations, is amorphous, said polyester resin has preferably an acid value (AV) of at most 250, more preferably of at most 200, even more preferably of at most 150, most preferably of at most 100, especially of at most 90, more especially of at most 80, most especially of at most 70, for example of at most 65, for example of at most 60, for example of at most 50 mg KOH/g unsaturated polyester resin. In case in which the unsaturated polyester resin comprising ethylenic unsaturations such as di-acid ethylenic unsaturations such as 2-butenedioic acid ethylenic unsaturations, is amorphous, said polyester resin has preferably an acid value (AV) of at least 0.1, more preferably of at least 0.5, even more preferably of at least 1, most preferably of at least 2, especially of at least 2.5, more especially of at least 3, most especially of at least 4, for example of at least 5, for example of at least 8, for example of at least 10, for example of at least 15 mg KOH/g unsaturated polyester resin. Preferably the acid value (AV) of the amorphous unsaturated polyester resin comprising ethylenic unsaturations such as di-acid ethylenic unsaturations such as 2-butenedioic acid ethylenic unsaturations ranges from 0.1 to 60 mg KOH/g amorphous unsaturated polyester resin comprising ethylenic unsaturations such as di-acid ethylenic unsaturations such as 2-butenedioic acid ethylenic unsaturations. Preferably, the acid value (AV) of of the amorphous unsaturated polyester resin comprising ethylenic unsaturations such as di-acid ethylenic unsaturations such as 2-butenedioic acid ethylenic unsaturations is at most 5 mg KOH/g, more preferably at most 2 mg KOH/g amorphous unsaturated polyester resin comprising ethylenic unsaturations such as di-acid ethylenic unsaturations such as 2-butenedioic acid ethylenic unsaturations.

In case in which the unsaturated polyester resin comprising ethylenic unsaturations such as di-acid ethylenic unsaturations such as 2-butenedioic acid ethylenic unsaturations, is amorphous, said polyester resin has preferably a hydroxyl value (OHV) of at most 250, more preferably at most 200, even more preferably at most 150, most preferably at most 100, especially at most 90, more especially at most 80, most especially at most 70, for example at most 65, for example at most 60, for example at most 50 mg KOH/g unsaturated polyester resin. In case in which the unsaturated polyester resin comprising ethylenic unsaturations such as di-acid ethylenic unsaturations such as 2-butenedioic acid ethylenic unsaturations, is amorphous, said polyester resin has preferably a hydroxyl value (OHV) of at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g unsaturated polyester resin. Preferably the hydroxyl value (OHV) of the amorphous unsaturated polyester resin comprising ethylenic unsaturations such as di-acid ethylenic unsaturations such as 2-butenedioic acid ethylenic unsaturations, is amorphous ranges from 0.1 to 70 mg KOH/g amorphous unsaturated polyester resin comprising ethylenic unsaturations such as di-acid ethylenic unsaturations such as 2-butenedioic acid ethylenic unsaturations.

In case in which the unsaturated polyester resin comprising ethylenic unsaturations such as di-acid ethylenic unsaturations such as 2-butenedioic acid ethylenic unsaturations, is amorphous, said polyester resin has preferably a glass transition temperature ($T_g$) of at least 20, more preferably of at least 25, even more preferably of at least 30, most preferably of at least 40, especially of at least 45, more especially of at least 50. In case in which the unsaturated polyester resin comprising ethylenic unsaturations such as di-acid ethylenic unsaturations such as 2-butenedioic acid ethylenic unsaturations, is amorphous, said polyester resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 65, for example of at most 60° C.

In case in which the unsaturated polyester resin comprising ethylenic unsaturations such as di-acid ethylenic unsaturations such as 2-butenedioic acid ethylenic unsaturations, is amorphous, said polyester resin has preferably a viscosity of at least 1, more preferably of at least 5, even more preferably of at least 10, most preferably of at least 15 Pa·s. In case in which the unsaturated polyester resin comprising ethylenic unsaturations such as di-acid ethylenic unsaturations such as 2-butenedioic acid ethylenic unsaturations, is amorphous, said polyester resin has preferably a viscosity of at most 400, more preferably of at most 300, even more preferably of at most 200, most preferably of at most 150, especially of at most 100, more especially of at most 80, most especially of at most 50 Pa·s. In case in which the unsaturated polyester resin comprising ethylenic unsaturations such as di-acid ethylenic unsaturations such as 2-butenedioic acid ethylenic unsaturations, is amorphous, said polyester resin has preferably a viscosity in the range of from 15 to 30 Pa·s.

In case in which the unsaturated polyester resin comprising ethylenic unsaturations such as di-acid ethylenic unsaturations such as 2-butenedioic acid ethylenic unsaturations, is amorphous said polyester resin has preferably a $M_n$ of at least 800, more preferably of at least 1000, even more preferably of at least 1500, most preferably of at least 1800, especially of at least 2000, more especially of at least 2500, most especially of at least 3000, for example of at least 3500, for example of at least 4000, for example of at least 5000. In case in which the unsaturated polyester resin comprising ethylenic unsaturations such as di-acid ethylenic unsaturations such as 2-butenedioic acid ethylenic unsaturations, is amorphous said polyester resin has preferably a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da.

In case in which the unsaturated polyester resin comprising ethylenic unsaturations such as di-acid ethylenic unsaturations such as 2-butenedioic acid ethylenic unsaturations, is crystalline, said polyester resin has preferably a theoretical WPU of at least 250, more preferably at least 350, for example at least 400, for example at least 450, for example at least 500 g/mol. In case in which the unsaturated polyester resin comprising ethylenic unsaturations such as di-acid ethylenic unsaturations such as 2-butenedioic acid ethylenic unsaturations, is crystalline, said polyester resin has preferably a theoretical WPU of at most 2000, more preferably at most 1600, even more preferably at most 1400, most preferably at most 1200, especially at most 1000, more especially at most 900, even more especially at most 850, most especially at most 800 g/mol.

In case in which the unsaturated polyester resin comprising ethylenic unsaturations such as di-acid ethylenic unsaturations such as 2-butenedioic acid ethylenic unsaturations, is crystalline, said polyester resin has preferably a WPU of at least 250, more preferably at least 350, for example at least 400, for example at least 450, for example at least 500 g/mol. In case in which the unsaturated polyester resin comprising ethylenic unsaturations such as di-acid ethylenic unsaturations such as 2-butenedioic acid ethylenic unsaturations, is crystalline, said polyester resin has preferably a WPU of at most 2000, more preferably at most 1600, even more preferably at most 1400, most preferably at most 1200, especially at most 1000, more especially at most 900, even more especially at most 850, most especially at most 800 g/mol.

In case in which the unsaturated polyester resin comprising ethylenic unsaturations such as di-acid ethylenic unsaturations such as 2-butenedioic acid ethylenic unsaturations, is crystalline, said polyester has preferably a glass transition temperature ($T_g$) of at least −70° C., more preferably of at least −50° C., even more preferably of at least −30° C., even more preferably of at least −20° C., most preferably of at least −10° C., especially of at least 0° C., more especially of at least 10° C., even more especially of at least 20° C. In case in which the unsaturated polyester resin comprising ethylenic unsaturations such as di-acid ethylenic unsaturations such as 2-butenedioic acid ethylenic unsaturations, is crystalline, said resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 60, for example of at most 50° C.

In case in which the unsaturated polyester resin comprising ethylenic unsaturations such as di-acid ethylenic unsaturations such as 2-butenedioic acid ethylenic unsaturations, is crystalline, said polyester resin has preferably a melting temperature ($T_m$) of at least 30, more preferably of at least 40, more preferably of at least 50, most preferably of at least 60° C. In case in which the unsaturated polyester resin comprising ethylenic unsaturations such as di-acid ethylenic unsaturations such as 2-butenedioic acid ethylenic unsaturations, is crystalline, said polyester resin has preferably a melting temperature ($T_m$) of at most 200, more preferably at most 180, even more preferably at most 160, even more preferably at most 140, most preferably at most 120, especially at most 100° C.

In case in which the unsaturated polyester resin comprising ethylenic unsaturations such as di-acid ethylenic unsaturations such as 2-butenedioic acid ethylenic unsaturations, is crystalline, said polyester resin has preferably a crystallization temperature ($T_c$) of at least 30, more preferably of at least 40° C. In case in which the unsaturated polyester resin comprising ethylenic unsaturations such as di-acid ethylenic unsaturations such as 2-butenedioic acid ethylenic unsaturations, is crystalline, said polyester resin has preferably a crystallization temperature ($T_c$) of at most 200, more preferably of at most 180, even more preferably of at most 160, even more preferably of at most 140, most preferably at most 120, especially at most 100

In case in which the unsaturated polyester resin comprising ethylenic unsaturations such as di-acid ethylenic unsaturations such as 2-butenedioic acid ethylenic unsaturations, is crystalline, said polyester resin has preferably a melting enthalpy ($\Delta H_m$) of at least 35, more preferably of at least 38, even more preferably of at least 40, most preferably of at least 50, especially of at least 60 J/g. In case in which the unsaturated polyester resin comprising ethylenic unsaturations such as di-acid ethylenic unsaturations such as 2-butenedioic acid ethylenic unsaturations, is crystalline, said polyester resin has preferably a melting enthalpy ($\Delta H_m$) of at most 400, more preferably of at most 300, most preferably of at most 260, especially of at most 240, more especially of at most 220, most especially of at most 200, for example of at most 180, for example of at most 160, for example of at most 140, for example of at most 130 J/g. The melting enthalpy ($\Delta H_m$) is measured using DSC as described herein.

In case in which the unsaturated polyester resin comprising ethylenic unsaturations such as di-acid ethylenic unsaturations such as 2-butenedioic acid ethylenic unsaturations, is crystalline, said polyester resin has preferably an acid value (AV) of at most 250, more preferably of at most 200, even more preferably of at most 150, most preferably of at most 100, especially of at most 90, more especially of at most 80, most especially of at most 70, for example of at most 65, for example of at most 60, for example of at most 50 mg KOH/g unsaturated polyester resin. In case in which the unsaturated polyester resin comprising ethylenic unsaturations such as di-acid ethylenic unsaturations such as 2-butenedioic acid ethylenic unsaturations, is crystalline, said polyester resin has preferably an acid value (AV) of at least 0.1, more preferably of at least 0.5, even more preferably of at least 1, most preferably of at least 2, especially of at least 2.5, more especially of at least 3, most especially of at least 4, for example of at least 5, for example of at least 8, for example of at least 10, for example of at least 15 mg KOH/g unsaturated polyester resin. Preferably the acid value (AV) of the crystalline unsaturated polyester resin comprising ethylenic unsaturations such as di-acid ethylenic unsaturations such as 2-butenedioic acid ethylenic unsaturations ranges from 0.1 to 60 mg KOH/g crystalline unsaturated polyester resin comprising ethylenic unsaturations such as di-acid ethylenic unsaturations such as 2-butenedioic acid ethylenic unsaturations. Preferably, the acid value (AV) of the crystalline unsaturated polyester resin comprising ethylenic unsaturations such as di-acid ethylenic unsaturations such as 2-butenedioic acid ethylenic unsaturations is at most 5 mg KOH/g, more preferably at most 2 mg KOH/g crystalline unsaturated polyester resin comprising ethylenic unsaturations such as di-acid ethylenic unsaturations such as 2-butenedioic acid ethylenic unsaturations.

In case in which the unsaturated polyester resin comprising ethylenic unsaturations such as di-acid ethylenic unsaturations such as 2-butenedioic acid ethylenic unsaturations, is crystalline, said polyester resin has preferably a hydroxyl value (OHV) of at most 250, more preferably at most 200, even more preferably at most 150, most preferably at most 100, especially at most 90, more especially at most 80, most especially at most 70, for example at most 65, for example at most 60, for example at most 50 mg KOH/g unsaturated polyester resin comprising ethylenic unsaturations such as di-acid ethylenic unsaturations such as 2-butenedioic acid ethylenic unsaturations. In case in which the unsaturated polyester resin comprising ethylenic unsaturations such as di-acid ethylenic unsaturations such as 2-butenedioic acid ethylenic unsaturations, is crystalline, said polyester resin has preferably a hydroxyl value (OHV) of at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g unsaturated polyester resin comprising ethylenic unsaturations such as di-acid ethylenic unsaturations such as 2-butenedioic acid ethylenic unsaturations. Preferably the hydroxyl value (OHV) of the crystalline unsaturated polyester resin comprising ethylenic unsaturations such as di-acid ethylenic unsaturations such as 2-butenedioic acid ethylenic unsaturations, is crystalline ranges from 0.1 to 70 mg KOH/g crystalline unsaturated polyester resin comprising ethylenic unsaturations such as di-acid ethylenic unsaturations such as 2-butenedioic acid ethylenic unsaturations.

In case in which the unsaturated polyester resin comprising ethylenic unsaturations such as di-acid ethylenic unsaturations such as 2-butenedioic acid ethylenic unsaturations, is crystalline, said polyester resin has preferably a viscosity of at least 0.001, more preferably of at least 0.01, even more preferably of at least 0.1, Pa·s. In case in which the unsaturated polyester resin comprising ethylenic unsaturations such as di-acid ethylenic unsaturations such as 2-butenedioic acid ethylenic unsaturations, is crystalline, said polyester resin has preferably a viscosity of at most 100, more preferably of at most 50, even more preferably of at most 30, most preferably of at most 25, especially of at most 15, more especially of at most 10, most especially of at most 5 Pa·s. In case in which the unsaturated polyester resin comprising ethylenic unsaturations such as di-acid ethylenic unsaturations such as 2-butenedioic acid ethylenic unsaturations, is crystalline, said polyester resin has preferably a viscosity in the range of from 0.1 to 5 Pa·s.

In case in which the unsaturated polyester resin comprising ethylenic unsaturations such as di-acid ethylenic unsaturations such as 2-butenedioic acid ethylenic unsaturations, is crystalline, said polyester resin has preferably a $M_n$ of at least 800, more preferably of at least 1000, even more preferably of at least 1500, most preferably of at least 1800, especially of at least 2000, more especially of at least 2500, most especially of at least 3000, for example of at least 3500, for example of at least 4000, for example of at least 5000. In case in which the unsaturated polyester resin comprising ethylenic unsaturations such as di-acid ethylenic unsaturations such as 2-butenedioic acid ethylenic unsaturations, is crystalline, said polyester resin has preferably a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da.

The crystallinity of the unsaturated polyester resin comprising ethylenic unsaturations such as di-acid ethylenic unsaturations such as 2-butenedioic acid ethylenic unsaturations, may be introduced by using one or more of the following diacids: succinic acid, adipic acid, sebasic acid or dodecanedioc acid, and/or one or more of the following diols: ethyleneglycol, hexanediol, butanediol in the synthesis of said unsaturated polyester resin resins.

All preferred elements and embodiments presented herein for the UR and/or for any one of the resins encompassed by the definition of the UR apply equally to each other.

In the thermosetting powder coating composition of the invention the VFUR or VFURC may be combined with other curing agents suitable for curing unsaturated resins comprising ethylenic unsaturations that are known to the skilled person such as acrylates, methacrylates, vinyl amides, alkyne ethers, alkyne esters, alkyne amides, alkyne amines, propargyl ethers, propargyl esters, itaconates, enamines, thiols, allyls and mixtures thereof.

Preferably, the thermosetting powder coating composition of the invention further comprises a radical initiator; more preferably the thermosetting powder coating composition of the invention further comprises a radical initiator and optionally an accelerator and/or a co-accelerator and/or an inhibitor.

The radical initiator, accelerator, co-accelerator and the inhibitor are discussed separately herein.

The thermosetting powder coating composition of the invention may optionally further comprise the usual additives, such as for example waxes, pigments, fillers, degassing agents, flow (smoothness) agents, appearance enhancing agents or (light) stabilizers. It should be noted that none of these usual additives are considered to be transition metal compounds. The pigments may be inorganic or organic. Suitable inorganic pigments include for example, titanium dioxide, zinc sulphide, zinc phosphate, mica, iron oxide and/or chromium oxide. Suitable organic pigments include for example azo compounds. Suitable fillers include for example metal oxides, silicates, carbonates and sulphates. Suitable stabilizers include for example primary and/or secondary antioxidants and UV stabilizers for example quinones, (sterically hindered) phenolic compounds, phosphonites, phosphites, thioethers and HALS (hindered amine light stabilizers). Examples of suitable degassing agents include cyclohexane dimethanol bisbenzoate, benzoin and benzoin derivatives such as for example those described in WO02/50194, the relevant passages of which are incorporated herein by reference. Examples of flow agents include Byk® 361 N and Resiflow® PV-5. Other additives, such as additives for improving tribo-chargeability may also be added as well as nucleating agents may also be present in the composition of the invention in order to facilitate the crystallization of the VFUR and/or the VFURC and/or the crystalline UR.

The thermosetting powder coating composition of the invention can be cured via heat (heat-curable thermosetting powder coating composition) and/or radiation (radiation curable thermosetting powder coating composition). Preferably, the thermosetting powder coating composition of the invention is heat-curable. Heat curing has the advantage that it does not require the use of additional and rather expensive equipment, for instance equipment that generates UV light or accelerated electrons and in only one step involving heating of the thermosetting powder coating composition the latter is melted and cured onto a substrate. In contrast to that, a thermosetting powder coating composition that requires radiation curing, the curing of said composition requires two steps, one to melt (heating step) and one to cure (radiation cure typically induced via UV light or electron beam irradiation) the composition. Heat curing is especially desirable for coating 3D objects.

The thermosetting powder coating compositions of the invention may be prepared by mixing the separately weighed-out components in a premixer, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a powder coating composition of the right particle size.

Alternatively, the thermosetting powder coating compositions of the invention may be prepared by mixing the separately weighed-out VFUR and/or VFURC with the UR in a premixer, heat the obtained premix, for example in a kneader, preferably in an extruder to obtain an extrudate, cool down the obtained extrudate until it solidifies and grind it into granules or flakes that are further ground to reduce the particle size. Subsequently, mixing the rest of the separately weighed-out components and the extrudate of VFUR and/or VFURC with the UR, in a premixer, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a powder coating composition of the right particle size.

Preferably, the thermosetting powder coating composition of the invention is prepared by a process comprising the steps of:
 a. mixing the components of the thermosetting powder coating composition to obtain a premix;

b. heating the premix, preferably in an extruder, to obtain an extrudate;
c. cooling down the extrudate to obtain a solidified extrudate; and
d. grinding the solidified extrudate into smaller particles to obtain the thermosetting powder coating composition.

Preferably, the premix is heated to a temperature at least 5° C., more preferably at least 10° C. below the temperature at which it is intended to cure the powder coating composition. If the premix is heated in an extruder, it is preferred to use a temperature control in order to avoid too high temperatures that could lead to curing of the composition of the invention in the extruder.

Preferably, the thermosetting powder coating composition of the invention is prepared by a process comprising the steps of:
a. mixing the VFUR and/or VFURC with the UR to obtain a premix 1;
b. heating the premix 1, preferably in an extruder, to obtain an extrudate of VFUR and/or VFURC with the UR, namely extrudate 1;
c. cooling down the extrudate 1 to obtain a solidified extrudate 1; and
d. grinding the solidified extrudate 1 into smaller particles to obtain a mixture of VFUR and/or VFURC with the UR, namely mixture 1; and
e. mixing the rest of the components of the thermosetting powder coating composition with the mixture 1, to obtain a premix 2;
f. heating the premix 2, preferably in an extruder, to obtain an extrudate 2;
g. cooling down the extrudate 2 to obtain a solidified extrudate 2; and
h. grinding the solidified extrudate 2 into smaller particles to obtain the thermosetting powder coating composition.

Preferably, the premix 1 and/or 2 is/are heated to a temperature at least 5, more preferably at least 10° C. below the temperature at which it is intended to cure the thermosetting powder coating composition. If the premix 1 and/or 2 i/are heated in an extruder, it is preferred to use a temperature control in order to avoid too high temperatures that could lead to curing of the thermosetting powder coating composition of the invention in the extruder.

The thermosetting powder coating composition of the invention may be a one component (1K) system, but may also be a two component (2K) system. Preferably, the composition of the invention is one component (1K) system. With a 'one component system', also called a 1K system, is meant that all (reactive) components of the thermosetting powder coating composition form part of one powder. In a two component system, also called 2K system, a thermosetting powder coating composition is composed of at least two different powders with different chemical compositions, which keeps the reactive components physically separated. The at least two different powders may be mixed in a physical blend before the composition of the invention is put in a storage container or may be mixed just before applying the 2K system to a substrate to let a curing reaction take place. The compositions of the at least two different powders in the 2K system are usually selected such that each powder contains an ingredient which is needed for curing but is absent from the other powder(s). This separation allows preparation of the individual powder composition in a heated state (such as by melt mixing) without the initiation of the cure reaction.

Radical Initiators and Thermosetting Powder Coating Composition of the Invention The radical initiator may be any radical initiator known to the person skilled in the art. Examples of radical initiators include, but are not limited to azo compounds such as for example azo isobutyronitrile (AIBN), 1,1'-azobis(cyclohexanenitrile), 1,1'-azobis(2,4,4-trimethylpentane), C—C labile compounds such as for example benzopinacole, peroxides and mixtures thereof.

The radical initiators for example peroxides used in the thermosetting powder coating composition of the invention can be any radical initiator known to the person skilled in the art for being suitable for use in the radical curing of unsaturated resins. Such radical initiators for example peroxides include organic and inorganic peroxides, whether solid or liquid (including peroxides on a carrier); also hydrogen peroxide may be applied.

The radical initiators may be monomeric, oligomeric or polymeric in nature; consequently also peroxides may be monomeric, oligomeric or polymeric in nature. An extensive series of examples of suitable radical initiators such as peroxides can be found, for instance in US 2002/0091214 A1, paragraph [0018], hereby incorporated by reference.

Preferably, the radical initiator is an organic or inorganic peroxide, more preferably the radical initiator is an organic peroxide, most preferably the radical initiator is chosen from the group consisting of peranhydrides, percarbonates peresters and mixtures thereof, especially the radical initiator is selected from the group consisting of peranhydrides, peresters and mixtures thereof, more especially the radical initiator is a peranhydride, for example the radical initiator is selected from the group consisting of benzoyl peroxide, lauroyl peroxide, dilauroyl peroxide, di(4-t-butylcyclohexyl)-peroxydicarbonate, dicetyl peroxydicarbonate, dimyristylperoxydicarbonate, tert-butyl peroxybenzoate (Trigonox® C) and mixtures thereof, for example the radical initiator is selected from the group consisting of benzoyl peroxide, lauroyl peroxide, tert-butyl peroxybenzoate (Trigonox® C) and mixtures thereof, for example the radical initiator is selected from the group consisting of benzoyl peroxide, tert-butyl peroxybenzoate (Trigonox® C) and mixtures thereof; for example the radical initiator is benzoyl peroxide.

Exemplary organic peroxides include but are not limited to hydroperoxides (comprising a structure of formula . . . —O—O—H), ketone peroxides (comprising a structure of formula H—O—O—(C—O—O—)$_n$H, n≥1), peroxyketals (comprising a structure of formula ( . . . —O—O—)$_2$C< . . . ), dialkyl peroxides also known as perethers (comprising a structure of formula . . . —O—O— . . . ), peroxyesters also known as peresters (comprising a structure of formula . . . —O—O—C(=O)— . . . ), diacyl peroxides also known as peranhydrides (comprising a structure of formula . . . —C(=O)—O—O—C(=O)— . . . ), alkylperoxy carbonates also known as monopercarbonates (comprising a structure of formula . . . —O—O—C(=O)—O— . . . ) and peroxydicarbonates also known as percarbonates (comprising a structure of formula . . . —O—C(=O)—O—O—C(=O)—O— . . . ).

Exemplary hydroperoxides include but are not limited to tertiary alkyl hydroperoxides (such as, for instance, t-butyl hydroperoxide) and other hydroperoxides (such as, for instance, cumene hydroperoxide). Examples of a special class of hydroperoxides formed by the group of ketone peroxides (also known as perketones, being an addition product of hydrogen peroxide and a ketone), are for example methyl ethyl ketone peroxide, methyl isobutylketone peroxide and acetylacetone peroxide.

Exemplary peroxyketals include but are not limited to 1,1-di-(tert-butylperoxy)cyclohexane (Trigonox® 22), 1,1-di(tert-amylperoxy)cyclohexane (Trigonox® 122), 1,1-di(tert-butylperoxy)-3,3,5-trimethylcyclohexane (Trigonox® 29) and mixtures thereof.

Exemplary perethers include but are not limited to diperethers like 2,2-di(tert-butylperoxy)butane (Trigonox® D), butyl 4,4-di(tert-butylperoxy)valerate (Trigonox® 17), di(tert-butylperoxyisopropyl)benzene(s) (Perkadox® 14S), 2,5-dimethyl-2,5-di(tert-butylperoxy)hexane (Trigonox® 101) of for example monoperethers like dicumyl peroxide (Perkadox® BC-FF), tert-butyl cumyl peroxide (Trigonox® T), di-tert-butyl peroxide (Trigonox® B) or mixtures thereof.

It should be noted that Trigonox®, and Perkadox® are trademarks of Akzo Nobel.

Exemplary peresters include but are not limited to peracetates and perbenzoates, or for example tert-butyl peroxybenzoate (Trigonox® C), tert-butyl peroxyacetate (Trigonox® F-050), tert-amyl peroxybenzoate (Trigonox® 127), tert-amyl peroxyacetate (Trigonox® 133-CK60), tert-butyl-2-ethylhexanoate (Trigonox® 21 S), tert-butylperoxydiethylacetate (Trigonox® 27), di-tert-butylperoxypivalate (Trigonox® 25-C75), tert-butyl peroxyneoheptanoate (Trigonox® 257-C75), cumylperoxyneodecanoate (Trigonox® 99-C75), 2-ethylhexyl perlaurate or mixtures thereof.

Exemplary peranhydrides include but are not limited to benzoylperoxide (BPO) and lauroyl peroxide (commercially available as Laurox®), didecanoylperoxide (Perkadox® SE-10), di(3,5,5-trimethylhexanoyl)peroxide (Trigonox® 36-C75) and mixtures thereof.

Exemplary percarbonates include but are not limited to di-t-butylpercarbonate and di-2-ethylhexylpercarbonate or monopercarbonates. Exemplary monopercarbonates include but are not limited to tert-butyl peroxy-2-ethylhexylcarbonate (Trigonox® 117), tert-butyl peroxyisopropylcarbonate (Trigonox® BPIC75), tert-amylperoxy-2-ethylhexylcarbonate (Trigonox® 131) and mixtures thereof.

It is of course also possible to use mixtures of radical initiators for example peroxides in the powder coating composition of the present invention. Also, the radical initiator may be mixed peroxides, i.e. peroxides containing any two different peroxy-bearing moieties in one molecule.

Preferably, the amount of radical initiator in the thermosetting powder coating composition of the invention is at least 0.1, more preferably is at least 0.2, even more preferably is at least 0.3, most preferably is at least 0.4, especially is at least 0.5, more especially is at least 0.65, most especially is at least 0.7, for example is at least 0.75, for example is at least 0.8, for example is at least 0.9, for example is at least 1, for example is at least 1.2, for example is at least 1.5, for example is at least 2 pph. The amount of radical initiator in the thermosetting powder coating composition of the invention is preferably at most 10, more preferably at most 8, even more preferably at most 7, even more preferably at most 6.8 pph. The amount (pph) of the radical initiator in the thermosetting powder coating composition of the invention is calculated on the total amount of vinyl functionalized urethane resins and/or VFURC and unsaturated resins normalized to 100 parts of vinyl functionalized urethane resins and/or VFURC and unsaturated resins.

All preferred elements and embodiments presented herein for the radical initiators and/or for any one of the radical initiators encompassed by the definition of the radical initiator i.e. peroxides, types of peroxides apply equally to each other.

Accelerators, Co-Accelerators and Thermosetting Powder Coating Composition of the Invention In case the reactivity of the thermosetting powder coating composition is too low, one or more accelerators may be added to the thermosetting powder coating composition.

The accelerator may be chosen from the group of amines preferably tertiary amines or aromatic amines: diamines, polyamines, acetoacetamides, ammonium salts, transition metal compounds or mixtures thereof. There are some preferred combinations of initiator and accelerator as is explained below.

If a radical initiator is a peroxide comprising a structure of formula ... —C(=O)—O—O— ... (a perester, percarbonate, including peroxypolycarbonate; peranhydride, peroxyacids and the like) then as an accelerator preferably a tertiary aromatic amine or a transition metal compound may be used, the latter optionally in combination with a co-accelerator.

If a radical initiator is a peroxide comprising a structure formula ... —O—OH (hydroperoxides, including perketones and the like) then as an accelerator preferably a transition metal may be used, optionally in combination with a co-accelerator.

If a radical initiator is a peroxide comprising a structure formula ... —O—O— ... (perethers and the like) then as an accelerator preferably a transition metal is used, preferably in combination with a co-accelerator.

Suitable tertiary aromatic amine accelerators include N,N-dimethylaniline, N,N-diethylaniline; toluidines and xylidines such as N,N-diiosopropanol-para-toluidine, N.N-dimethyl-p-toluidine, N,N-bis(2-hydroxyethyl)xylidine, N,N-dimethylnaphtylamine, N,N-dimethyl toluidine and ethyl N,N-dimethylamino benzoate.

Also, the accelerator may be chosen from the group of transition metal compounds of transition metals with atomic numbers from/equal to 21 and up to/equal to 79. In chemistry and physics, the atomic number (also known as the proton number) is the number of protons found in the nucleus of an atom. It is traditionally represented by the symbol Z. The atomic number uniquely identifies a chemical element. In an atom of neutral charge, the atomic number is equal to the number of electrons. Examples of suitable transition metal compounds are those of the following transition metals Sc, Ti, V, Cr, Mn, Fe, Co, Ni, Cu, Zn, Mo, W; preferably Mn, Fe, Co, Cu, more preferably, Mn, Fe, Cu.

The transition metal compounds are preferably chosen from the group of transition metal salts or complexes or mixtures thereof, preferably from the group of organic metal salts or complexes, most preferably organic acid metal salts or derivatives thereof, for example transition metal carboxylates or transition metal acetoacetates, for example transition metal ethylhexanoate. If a copper compound is used, it may for example be in the form of a $Cu^+$ salt or a $Cu^{2+}$ salt. If a manganese compound is used, it may for example be in the form of a $Mn^{2+}$ salt or a $Mn^{3+}$ salt. If a cobalt compound is used, it may for example be in the form of a $Co^{2+}$ salt.

Depending on the reactivity of the transition metal compound, the reactivity of the initiation system may be enhanced using a co-accelerator (co-catalyst).

Examples of suitable co-accelerators include 1,3-dioxo-compounds, bases and thiol containing compounds.

The 1,3-dioxo compound is preferably a 1,3-dioxo compound having the following formula (A):

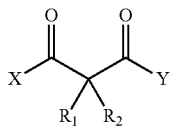
(A)

wherein X,Y=H, $C_1$-$C_{20}$ alkyl, $C_6$-$C_{20}$ aryl, alkylaryl, arylalkyl, part of a resin chain, $OR_3$, $NR_3R_4$; $R_1$, $R_2$, $R_3$, and $R_4$ each individually may represent hydrogen (H), or a $C_1$-$C_{20}$ alkyl, aryl, alkylaryl or arylalkyl group, that each optionally may contain one or more hetero-atoms (e.g. oxygen, phosphor, nitrogen or sulphur atoms) and/or substituents; a ring may be present between $R_1$ and $R_2$, $R_1$ and $R_3$, and/or between $R_2$ and $R_4$; $R_3$ and/or $R_4$ may be part of a polymer chain, may be attached to a polymer chain or may contain a polymerizable group. Preferably, X and/or Y are/is $C_1$-$C_{20}$ alkyl and/or $C_6$-$C_{20}$ aryl. More preferably, X and/or Y are/is a methyl group. Preferably, the 1,3-dioxo compound is acetylacetone. The 1,3-dioxo compound may be a resin or may be polymerizable.

Other examples of 1,3-dioxo compounds include 1,3-diketones, 1,3-dialdehydes, 1,3-ketoaldehydes, 1,3-ketoesters, and 1,3-ketoamides.

Examples of suitable base co-accelerators are organic bases or inorganic bases. Inorganic bases are for example alkali metal or earth alkali metal compounds. The organic base is preferably a nitrogen containing compound, preferably an amine.

Examples of suitable thiol-containing compounds that may be used as a co-accelerator include aliphatic thiols, more preferably primary aliphatic thiols. The aliphatic thiol is preferably an α-mercapto acetate, a β-mercapto propionate, a dodecylmercaptane or a mixture thereof. The thiol-functionality of the thiol-containing compound in the powder coating composition is preferably ≥2, more preferably ≥3.

Preferably, the amount of accelerator in the thermosetting powder coating composition of the invention is at least 0.000003, more preferably is at least 0.00003, even more preferably is at least 0.0003, most preferably is at least 0.003, especially is at least 0.03, more especially is at least 0.1, most especially is at least 0.2, for example is at least 0.3, for example is at least 0.4, for example is at least 0.5, for example is at least 0.8, for example is at least 1.0, for example is at least 1.5, for example is at least 2 pph. The amount of accelerator in the thermosetting powder coating composition of the invention is preferably at most 10, more preferably at most 8, even more preferably at most 7, most preferably at most 6, especially at most 5 pph, more especially at most 4, most especially at most 3 pph. The amount (pph) of the accelerator in the thermosetting powder coating composition of the invention is calculated on the total amount of vinyl functionalized urethane resins and/or VFURC and unsaturated resins normalized to 100 parts of vinyl functionalized urethane resins and/or VFURC and unsaturated resins.

Preferably, the amount of co-accelerator in the thermosetting powder coating composition of the invention is at least 0.000003, more preferably is at least 0.00003, even more preferably is at least 0.0003, most preferably is at least 0.003, especially is at least 0.03, more especially is at least 0.1, most especially is at least 0.2, for example is at least 0.3, for example is at least 0.4, for example is at least 0.5, for example is at least 0.8, for example is at least 1.0, for example is at least 1.5, for example is at least 2 pph. The amount of co-accelerator the amount of co-accelerator in the thermosetting powder coating composition of the invention is preferably at most 10, more preferably at most 8, even more preferably at most 7, most preferably at most 6, especially at most 5 pph, more especially at most 4, most especially at most 3 pph. The amount (pph) of the co-accelerator in the thermosetting powder coating composition of the invention is calculated on the total amount of vinyl functionalized urethane resins and/or VFURC and unsaturated resins normalized to 100 parts of vinyl functionalized urethane resins and/or VFURC and unsaturated resins.

Inhibitors and Thermosetting Powder Coating Composition of the Invention

In case the reactivity of the thermosetting powder coating composition is too high one or more inhibitors may be added to the thermosetting powder coating composition. Alternatively, the inhibitor may be added during the synthesis of the VFUR and/or that of the unsaturated resin comprising ethylenic unsaturations. The inhibitor may also be added during the preparation of the VFURC.

Examples of inhibitors are preferably chosen from the group of phenolic compounds, stable radicals, catechols, phenothiazines, hydroquinones, benzoquinones or mixtures thereof.

Examples of phenolic compounds include 2-methoxyphenol, 4-methoxyphenol, 2,6-di-t-butyl-4-methylphenol, 2,6-di-t-butylphenol, 2,6-di-6-butyl-4-ethyl phenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol and 6,6'-di-t-butyl-2,2'-methylene di-p-cresol.

Examples of stable radicals include 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL and galvinoxyl (2,6-di-tert-butyl-α-(3,5-di-tert-butyl-4-oxo-2,5-cyclohexadien-1-ylidene)-p-toly-loxy).

Examples of catechols include catechol, 4-t-butylcatechol, and 3,5-di-t-butylcatechol.

Examples of hydroquinones include hydroquinone, 2-methylhydroquinone, 2-t-butylhydroquinone, 2,5-di-t-butylhydroquinone, 2,6-di-t-butylhydroquinone, 2,6-dimethylhydroquinone and 2,3,5-trimethylhydroquinone.

Examples of benzoquinones include benzoquinone, 2,3, 5,6-tetrachloro-1,4-benzoquinone, methylbenzoquinone, 2,6-dimethylbenzoquinone, and napthoquinone.

Other suitable inhibitors may for example be chosen from the group of an aluminium-N-nitrosophenyl hydroxylamine, a diethylhydroxylamine and a phenothiazine.

It is also possible to use a mixture of (the above mentioned) inhibitors. Preferably as an inhibitor hydroquinones or catechols are used, depending on the choice of (type and amount of) transition metal compound; more preferably hydroquinones are to be used as inhibitors.

Preferably, the amount of inhibitor in the thermosetting powder coating composition of the invention is at least 0.0001, more preferably is at least 0.0005, even more preferably is at least 0.0010, most preferably is at least 0.0025, especially is at least 0.0050, more especially is at least 0.010, most especially is at least 0.020, for example is at least 0.030, for example is at least 0.040, for example is at least 0.050, for example is at least 0.060, for example is at least 0.070, for example is at least 0.080, for example is at least 0.100 pph. The amount of inhibitor in the thermosetting powder coating composition of the invention is preferably at most 10, more preferably at most 5, even more preferably at most 2, most preferably at most 1, especially at most 0.75 pph, more especially at most 0.50, most especially at most 0.25 pph. The amount (pph) of the inhibitor in the thermosetting powder coating composition of the invention is calculated on the total amount of vinyl functionalized urethane resins and/or VFURC and unsaturated resins normalized to 100 parts of vinyl functionalized urethane resins and/or VFURC and unsaturated resins.

The combination of radical initiator(s) and optionally inhibitor(s) and/or accelerator(s) optionally in combination with co-accelerator(s) in the thermosetting powder coating composition suitable for use in the powder coating composition of the present invention can easily be determined by the person skilled in the art.

Any feature or preferred combination of features or preferred combination of ranges disclosed in the invention and regard the vinyl functionalized urethane resins, processes for making thereof, vinyl functionalized urethane resin compositions, processes for making thereof, thermosetting powder coating compositions and their components, processes for making thereof, can be combined.

Processes for Coating an Article with the Thermosetting Powder Coating Composition of the Invention In another aspect, the invention relates to a process for coating a substrate comprising the steps of:
 a. applying a thermosetting powder coating composition according to the invention, to a substrate;
 b. heating the substrate.

The composition of the invention may be applied using the techniques known to the person skilled in the art, for example using electrostatic spray or electrostatic fluidized bed or flame spray.

Heating of the coated substrate may be done using conventional methods, such as with a convection oven and/or with an (N)IR lamp. Even microwave equipment may be used to heat the substrate.

The temperature, at which the thermosetting powder coating compositions of the invention are cured, is preferably in the range of 80 to 225° C., more preferably in the range 80 to 150° C., even more preferably from 80 to 140° C., most preferably from 80 to 130° C., especially from 90 to 130° C., more especially from 100 to 130° C. Preferably, the temperature at which the thermosetting powder coating compositions of the invention are cured, is preferably at most 160, more preferably at most 150, even more preferably at most 140, most preferably at most 130, most preferably at most 120, especially at most 110, more especially at most 100° C. Preferably, the temperature at which the thermosetting powder coating compositions of the invention are cured, is preferably at least 60, more preferably at least 70, even more preferably at least 75, most preferably at least 80, most preferably at least 85, especially at least 90, more especially at least 100° C.

The curing time of the thermosetting powder coating compositions of the invention is at most 60 min, more preferably is at most 45 min, even more preferably is at most 30 min, most preferably is at most 20 min, especially is at most 10 min, more especially is at most 5 min.

Preferably the thermosetting powder coating compositions of the invention are heat-cured at a temperature in the range of 80-150° C. for a time in the range of 5-30 min.

The thermosetting powder coating composition of the invention is in particular very suitable for use in a powder-in-mould-coating process in order to obtain a powder coated moulded object. The powder in-mould coating is a known technique for decorating or priming the surface of a moulded article formed in a matched die mould under heat and pressure. The thermosetting powder coating composition upon its application to the hot wall of the mould, it is desirable to flow out well and harden quickly upon heat and/or radiation curing as well as to afford at the same time a powder coating with good appearance.

The thermosetting powder coating composition of the invention is especially suitable where a low curing temperature to cure said composition is desired. The reason is that if the temperature needed to cure a thermosetting powder coating composition is too high (for example at a temperature of around 160° C. or higher), the mould may, due to the limited heat resistance of the composite material it is made of, have a rather limited and non-cost effective lifetime. Therefore, by using the thermosetting powder coating composition of the invention, the curing temperature can be lowered (for example to a temperature between 80° C. and 150° C.) and the life-time of the mould can be substantially extended, thereby providing a substantial economical and environmental advantage. In a powder-in-mould coating process, first a thermosetting powder coating composition is applied, for example through electrostatic spraying to the interior wall of a usually (not necessary though) pre-heated mould (generally temperatures are between 75° C. and 200° C., typically temperatures are between 100° C. and 160° C.). The thermosetting powder coating composition melts due to the heat of the mould and coalesces on the mould surface to produce a uniform and continuous layer. The fill compound which constitutes the bulk of the finished article is then inserted in the mould and it is moulded. A fill compound may be put in the mould according to techniques known to the skilled person, for example process techniques like SMC (sheet molding compound), BMC (bulk molding compound), light RTM (Resin Transfer Molding, Vacuum Infusion (VI) or standard HLU (Hand lay-up) or SU (Spray-up). The fill compound can for example be a (glas-) fibre reinforced thermoplast or duroplast resin (for example a sheet molding compound resin from DSM Composite Resins). Subsequently, heating and/or radiation is applied to effect the curing of the thermosetting powder coating composition and may also be used to effect the curing of the fill compound. Heating may be applied in several ways, for example hot air may be circulated over the powder coating composition and/or the fill compound; and/or infrared light may be irradiated on the powder coating composition and/or the fill compound; and/or the mould may be heated. When the curing of the thermosetting powder coating composition and that of the fill resin have advanced sufficiently, and the then formed powder coating and fill resins are integral, the mould is opened and the molding is removed and the moulded article coated with a powder coating is obtained. Preferably, the coating and fill resins are crosslinked across the interface between them to maximize adhesion.

Therefore, in another aspect, the invention also relates to a process for making a coated article comprising the steps of:
 applying a thermosetting powder coating composition of the invention to the interior wall of a mould;
 subsequently introducing a fill compound in the mould in order said fill compound to form an article said article is selected from the group consisting of articles comprising heat-sensitive components and articles comprising non-heat sensitive components and articles comprising a combination of heat-sensitive and non-heat sensitive components;

heating and/or irradiating the thermosetting powder coating composition and optionally also the fill compound to obtain the coated article.

The invention also relates to a process for the preparation of a partially or fully coated article, comprising the steps of:
applying a composition according to the invention to the interior surface of a mould covering part or the whole of said surface of the mould; and
subsequently putting a fill compound in the mould; and heating the composition; and
optionally heating the fill compound;
optionally applying pressure to the mould; and
maintaining heat and optionally pressure for a period of time sufficient to obtain an intact and partially or fully coated article.

In the context of the invention the above two processes will be referred herein as the "PIMC process" (PIMC stands for: Powder-in-Mould Coating).

The step of heating and/or irradiating the thermosetting powder coating composition of the invention may be done at several "times" in the process, for example the thermosetting powder coating composition of the invention may be heated and/or irradiated upon application to the mould and/or the thermosetting powder coating composition of the invention may be heated and/or irradiated upon application of said composition to the mould.

Similarly, the optional heating of the fill compound may be done upon entry of the fill compound in the mould and/or after entry of the fill compound in the mould. If heating of the mould is the method of choice, heating of the mould may be performed before, during and/or after the application of the thermosetting powder coating composition of the invention to the interior wall of the mould.

A powder-in-mould coating is to be distinguished from a post-molding coating process, wherein the article is formed in the mould before a coating composition is introduced into the mould. It is also to be distinguished from conventional powder coating operations in which the article is formed in the mould and only after release from the mould coated with a powder coating.

In general, it is difficult to coat an already moulded article as the surface of such moulded article may contain open pores, which may cause blistering during heat curing of the coating. Furthermore, the moulded article contains release agents, such as magnesium stearate, on the surface of the article which may lead to coating surface defects like craters and to poor adhesion of the coating to surface of the article.

Also different from a powder-in-mould coating process are the gelcoat and the liquid-in-mould coating processes, wherein a liquid coating composition is applied to the interior wall of a pre-heated mould. Gelcoat or liquid-in-mould coating processes have a number of disadvantages. For example, gelcoat or liquid coating compositions are difficult to apply uniformly to the interior wall of the mould and the overspray of such coating compositions needs to be collected and removed. Furthermore, the solvents or liquid monomers in the gel or liquid coating compositions tend to flash away when sprayed onto the pre-heated mould, thereby changing the coating formulation, creating bubbles and other irregularities in the coating and making it necessary to contain and to collect the vapour of the volatile ingredients. Also, gelcoats usually contain styrene, which is a reactive solvent under health and safety regulations.

Where large objects are cast, such as for example windmill blades, boats and boat parts, automotive parts such as wind deflectors, hoods, trunk lid spoilers, pipes, building parts etc., a metal mould is not preferred (as a metal mould is either too big or very uneconomical to produce) and therefore a composite mould is usually used. In a composite mould, to facilitate obtaining a homogeneous thermosetting powder coating composition layer on the mould, the composite mould may be conductive if said composition is applied using electrostatic (spraying) techniques) and/or the mould may be preheated.

In another embodiment, the invention relates to an article obtainable by the PIMC process.

In another embodiment, the invention also relates to the use of a thermosetting powder coating composition according to the invention in a process as defined herein above that affords a partially or fully coated moulded article.

In another embodiment, the invention also relates to the use of a composition according to the invention in a powder-in-mould-process that affords a partially or fully coated moulded article.

In yet another embodiment, the invention relates to the use of an article obtainable by the powder in-mould coating process described herein above for automotive applications (car parts, agricultural machines, composite structures, ceramic structures, etc.), marine applications (ships, boats), aerospace applications (planes, helicopters, composite structures, ceramic structures, etc.), medical applications (artificial joints, meshes, woven or non-woven sheets, tapes, ribbons, bands, cables, tube-like products for e.g. ligament replacement, composite structures, ceramic structures, etc.), defense applications (ballistic protection, body armor, ballistic vests, ballistic helmets, ballistic vehicle protection, composite structures, ceramic structures, etc.), sports/recreational applications (fencing, skates, skateboarding, snowboarding, suspension lines on sport parachutes, paragliders, kites, kite lines for kite sports, climbing equipment, composite structures, ceramic structures, etc.), architectural applications (windows, doors, (pseudo-)walls, cables, etc.), bottling applications, household applications (household appliances, whitegoods, furniture, computer housings, etc.), machinery applications (can and bottle handling machine parts, moving parts on weaving machines, bearings, gears, composite structures, ceramic structures, computer housings, etc.), can applications, coil applications.

Other Aspects and Embodiments of the Invention

In another aspect, the invention relates to an article for example a substrate, having coated and cured thereon a thermosetting powder coating composition as defined herein. Preferably, said article is selected from the group consisting of heat-sensitive articles and non-heat sensitive articles; more preferably said article is selected from the group consisting of wood for example low density fibre board, medium density fibreboard and high density fibreboard, plastic, thermoplastic composite, thermoset composite, fibre reinforced composites, sandwich materials e.g. sandwich materials comprising heat sensitive foam core, metal and combinations thereof.

Heat-sensitive articles for example heat-sensitive substrates, include plastic articles, wood articles for example solid wood, such as for example: hard wood, soft wood, plywood; veneer, particle board, low density fibre board, medium density fibreboard and high density fibreboard, OSB (Oriented Strand Board) wood laminates, chipboard and other articles in which wood is an important constituent, such as for example foil covered wooden articles, engineered wood, plastic modified wood, plastic articles or wood plastic compounds (WPC); articles with cellulosic fibres, for example cardboard or paper articles; textile and leather articles. Examples of plastic articles include unsaturated polyester resinbased compositions, ABS (acrylonitril butadiene styrene), melamine-formaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethyleneterephthalate and nylon, for example polyamide 6,6 and combinations thereof, for example polycarbonate-ABS. Other heat-sensitive articles include objects that are a combination of a non-heat-sensitive part such as metal parts with a heat-sensitive part, such as any one of the aforementioned for example plastic hosing with heavy metal parts, strips for example aluminium frames with heat strips etc.

Specific wood coating markets where the thermosetting powder coating compositions of the invention may be used include domestic furniture, such as tables, chairs, cabinets, etc., bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and wooden flooring.

Specific plastic coating markets where thermosetting powder coating compositions of the invention may be used include automotive applications, such as interior car parts, wheel covers, bumpers, under the hood parts etc., flexible flooring, sporting goods, cosmetics, audio-visual applications, such as TV sets, computer housing, phones, etc., household appliances and satellite dishes.

Typical examples of non-heat-sensitive articles include glass, ceramic, composite, fibre cement board, or metal, for example aluminum, copper or steel articles, for instance carbon steel, where the main alloying constituent is carbon. Carbon steel usually contains carbon 0.2 and 1.5% w/w based on the total alloy composition and often contains other constituents such as manganese, chromium, nickel, molybdenum, copper, tungsten, cobalt, or silicon, depending on the desired steel properties. Steel has properties similar to iron if the amount of carbon is not too high, for example not more than 1.5% w/w based on the total alloy composition. The steel may be surface treated (treatment with zinc, or zinc phosphate or iron phosphate etc.) or non-surface treated.

In another aspect, the invention relates to a powder coating derived upon partial or full cure of the thermosetting powder coating composition of the invention. The powder coating can be a primer, top coat or an intermediate coating.

In another aspect, the invention relates to the use of any one of the compositions according to the invention to fully or partially coat an article.

In another embodiment the invention relates to the use of any one of the compositions of the invention to coat a heat-sensitive article preferably wood for example low density fibre board, medium density fibreboard and high density fibreboard, plastic, etc., or combinations thereof.

In another aspect, the invention relates to an article that is fully or partially coated with any one of the compositions of the invention.

In one embodiment of the invention the substrate is a non-heat-sensitive substrate, for example glass, ceramic, fibre cement board, or metal, for example aluminum, copper or steel, preferably metal.

In yet another embodiment, the invention provides for a use of the composition of the invention to coat a heat-sensitive article as defined herein and/or a non-heat-sensitive article as defined herein.

In yet another embodiment, the invention provides for a use of the thermosetting powder coating compositions of the invention to coat an article wherein the article is a heat-sensitive article for example wood such as low density fibre board, medium density fibreboard and high density fibreboard, plastic and combinations thereof.

In yet another embodiment, the invention provides for a use of the thermosetting powder coating compositions of the invention to coat an article wherein the article is a non-heat-sensitive article for example glass, ceramic, composite, fibre cement board, or metal, for example aluminum, copper or steel articles, for instance carbon steel.

In yet another embodiment, the invention provides for a use of the thermosetting powder coating compositions of the invention to coat an article wherein the article is a heat-sensitive article for example wood such as low density fibre board, medium density fibreboard and high density fibreboard, plastic and combinations thereof and also to coat an article wherein the article is a non-heat-sensitive article for example glass, ceramic, composite, fibre cement board, or metal, for example aluminum, copper or steel articles, for instance carbon steel.

In another aspect the invention provides for a use of:
- a vinyl functionalized urethane resin (VFUR) resin as defined herein; or
- a vinyl functionalized urethane resin composition (VFURC) as defined herein; or
- a thermosetting powder coating composition as defined herein; or
- an article as defined herein;

in powder coatings, powder-in-mould coatings, 3D-printing, automotive applications (car parts, agricultural machines, composite structures, ceramic structures, etc.), marine applications (ships, boats), aerospace applications (planes, helicopters, composite structures, ceramic structures, etc.), medical applications (artificial joints, meshes, woven or non-woven sheets, tapes, ribbons, bands, cables, tube-like products for e.g. ligament replacement, composite structures, ceramic structures, etc.), defense applications (ballistic protection, body armor, ballistic vests, ballistic helmets, ballistic vehicle protection, composite structures, ceramic structures, etc.), sports/recreational applications (fencing, skates, skateboarding, snowboarding, suspension lines on sport parachutes, paragliders, kites, kite lines for kite sports, climbing equipment, composite structures, ceramic structures, etc.), architectural applications (windows, doors, (pseudo-)walls, cables, etc.), bottling applications, household applications (household appliances, whitegoods, furniture, computer housings, etc.), machinery applications (can and bottle handling machine parts, moving parts on weaving machines, bearings, gears, composite structures, ceramic structures, computer housings, etc.), can applications, coil applications, energy applications for e.g. generators for wind, tide or solar energy, textile applications for e.g. fabrics, this can be very broad from impregnation technical textiles to for example complete composites both as coating and as a binder for composites, and electrical applications for e.g. cabinets for electrical wire or switch boards.

Yet, another aspect of the invention is a VFUR chosen from the group of VFUR according to InvVFUR1-12.

Yet, another aspect of the invention is a thermosetting powder coating composition chosen from the group of thermosetting powder coating compositions according to InvPCC1-15.

Yet, another aspect of the invention is a powder coating chosen from the group of powder coatings according to InvPC1-15.

Many other variations and embodiments of the invention will be apparent to those skilled in the art and such variations are contemplated within the broad scope of the present invention.

All embodiments disclosed herein may be combined with each other and/or with preferred elements of the invention.

Further aspects of the invention and preferred features thereof are given in the claims herein.

The invention will now be described in detail with reference to the following non limiting examples which are by way of illustration only.

EXAMPLES

The invention is explained in more detail with reference to the following non-limiting examples.

In the Examples section, the abbreviation UR represents unsaturated resin comprising ethylenic unsaturations, the abbreviation VFUR represents vinyl functionalized urethane resins used as curing agent, the abbreviation PCC represents thermosetting powder coating composition and the abbreviation PC represents powder coating.

In all the examples the unsaturated resin comprising ethylenic unsaturations (UR) were unsaturated polyester resins comprising 2-butenedioic acid ethylenic unsaturations.

In all the examples the vinyl functionalized urethane resins (VFUR) used as curing agent were vinyl ether functionalized urethane resins (VEFUR).

All powder coating compositions presented in the Examples were thermosetting powder coating compositions.

In the Examples section the abbreviation "Comp" denotes a Comparative Example of either the VFUR e.g. CompVFUR1, or a thermosetting powder coating composition e.g. CompPCC1, or a powder coating e.g. CompPC1.

In the Examples section the abbreviation "Inv" denotes an Inventive Example of either the VFUR e.g. InvVFUR1, or a thermosetting powder coating composition e.g. InvPCC1, or a powder coating e.g. InvPC1.

In the Examples the abbreviation "n.m." denotes "not measured".

In the Examples the abbreviation "n.p.e" denotes "not possible to extrude".

In the Examples the abbreviation "n.p.g" denotes "not possible to grind and/or to sieve and/or to flake".

In the Examples the abbreviation "n.a." denotes "not applicable". For Tables 5-7, most often "n.a." is used when material was "n.p.e." or "n.p.g." and therefore no coated panels could be prepared and tested.

In the Examples, the abbreviation "n.a.b." denotes "no amorphous unsaturated resin comprising ethylenic unsaturations" and therefore no value could be given.

Analytical Methods and Techniques for the Measurement of the Properties of the Unsaturated Polyester Resins Comprising Ethylenic Unsaturations and the Vinyl Functionalized Urethane Resins Used as Curing Agents in the Thermosetting Powder Coating Compositions Unless otherwise stated the theoretical number average molecular weight ($M_n$) is defined as follows:

$$M_n = (\Sigma_i N_i M_i)/(\Sigma_i N_i)$$

where $N_i$ is the number of molecules of molecular weight $M_i$.

In the case of the UR, the $M_n$ was calculated by multiplying the targeted (theoretical) functionality (f) with 56110 and dividing the outcome thereof by the sum of the targeted (theoretical) acid value (AV) (mg KOH/g of the polyester resin) and the targeted (theoretical) hydroxyl value (OHV) (mg KOH/g of the polyester resin) according to the following equation:

$$M_n = (56110 \times f)/(AV + OHV)$$

In the case of the VFUR, the $M_n$ was calculated by the following equation:

$$M_n = \frac{\sum_{i=1}^{n}(N_i * MW_i) - M_{H2O}}{N_{VFUR}}$$

whereas $N_i$=mol of each monomer used for the preparation of the VFUR;

$MW_i = M_n$ (Da) of each monomer used for the preparation of the VFUR;

$M_{H2O}$=mass (g) of water formed during the preparation of the VFUR;

$N_{VFUR}$=mol of VFUR prepared from said monomers.

In case $M_n$ refers to a monomer then the $M_n$ corresponds to molecular weight values calculated on the basis of the molecular formula of said monomer, as such calculation is known to one skilled in the art.

Melt viscosity (herein mentioned as viscosity, in Pa·s) measurements were carried out at 160° C. on a Brookfield CAP 2000+H Viscometer. The applied shear-rate was 70 s$^{-1}$ and a 19.05 mm spindle [cone spindle CAP-S-05 (19.05 mm, 1.8°)] was used.

The acid and hydroxyl values of the unsaturated resins comprising ethylenic unsaturations (UR) that were unsaturated polyester resins comprising 2-butenedioic acid ethylenic unsaturations, were determined titrimetrically according to ISO 2114-2000 and ISO 4629-1978; in addition the targeted (theoretical) acid and hydroxyl values of said resins were also reported herein.

$^1$H-NMR Method for the Measurement of $R_{VFUR}$ or $R_{VFURC}$ ($^1$H-NMR Method R)

The $R_{VFUR}$ or $R_{VFURC}$ was measured via $^1$H-NMR spectroscopy according to the method entitled—for simplicity—"$^1$H-NMR method R" which is presented herein. The estimated margin of error of this method for determining the WPU is +/−1%; the margin of error was determined on the basis of measuring three samples of the same lot of a VFUR or VFURC.

a. $^1$H-NMR Method for the Measurement of $R_{VFUR}$ ($^1$H-NMR Method $R_{VFUR}$)

The $R_{VFUR}$ was measured via $^1$H-NMR spectroscopy according to the following Formula I:

$R_{VFUR}$=[peak area of the chemical shift of the urethane proton ( . . . —NH— . . . ) of the urethane bonds ( . . . —NH—C(=O)—O— . . . ) in VFUR]/[peak area of the chemical shift of the methine proton ( . . . —CH= . . . ) of the vinyl groups ( . . . —CH=CH$_2$) in VFUR]   (Formula I).

According to Formula I, $R_{VFUR}$ has no unit.

The peak areas of the urethane protons of the urethane bonds and the methine protons ( . . . —CH= . . . ) of the vinyl groups ( . . . —CH=CH$_2$) in the VFUR of Formula I were measured as follows: A sample of 75 mg of VFUR was diluted at 40° C. in a mixture of 0.200 ml methanol and 0.600 ml deuterated chloroform containing a known amount (mg) of pyrazine as internal standard for performing $^1$H-NMR spectroscopy. Subsequently, the $^1$H-NMR spectrum of the VFUR sample was recorded at 40° C. on a 400 MHz NMR-spectrometer such as those made by BRUKER. Afterwards, the chemical shifts (ppm) of the urethane protons of the urethane bonds and the methine protons ( ... —CH= ... ) of the vinyl groups ( ... —CH=CH$_2$) in the VFUR were identified; the chemical shifts (ppm) of the urethane protons of the urethane bonds and the methine protons ( ... —CH= ... ) of the vinyl groups ( ... —CH=CH$_2$) in the VFUR of Formula I measured on a 400 MHz BRUKER NMR-spectrometer in methanol and deuterated chloroform were at about 5.2-6.3 and at about 6.4-6.5 ppm, respectively. Subsequently, with the help of suitable commercially available software for analyzing $^1$H-NMR spectra such as ACD/Spectrus Processor software provided by ACD/Labs, the peak areas of the urethane protons of the urethane bonds and the methine protons ( ... —CH= ... ) of the vinyl groups ( ... —CH=CH$_2$) in the VFUR of Formula I were measured and from these values the $R_{VFUR}$ was determined according to Formula I.

In case in which 75 mg of a VFUR is not soluble at 40° C. in a mixture of 0.200 ml methanol and 0.600 ml deuterated chloroform, then any other suitable solvent or mixture of solvents known to the skilled person for performing the $^1$H-NMR spectroscopy may be used; for example DMSO (dimethyl sulfoxide). The choice of a suitable solvent or a mixture of suitable solvents depends on the solubility of the sample of the VFUR in said solvents. In case in which 0.75 mg of VFUR is soluble in a mixture of 0.200 ml methanol and 0.600 ml deuterated chloroform at 40° C., then this mixture of methanol and deuterated chloroform is the solvent of choice for performing the $^1$H-NMR spectroscopy for the VFUR. In case in which a different solvent or mixture of solvents is used for performing the $^1$H-NMR Method $R_{VFUR}$, then the chemical shifts of the protons of Formula I may shift from the ones reported herein for the selected solvents for the $^1$H-NMR Method $R_{VFUR}$ since the actual chemical shifts may depend on the solvent or mixture of solvents used to record the $^1$H-NMR spectrum; in such case one should identify and determine the chemical shifts of the corresponding protons and apply Formula I for the determination of the $R_{VFUR}$.

b. $^1$H-NMR Method for the Measurement of $R_{VFURC}$ ($^1$H-NMR Method $R_{VFURC}$)

The $R_{VFURC}$ was measured via $^1$H-NMR spectroscopy according to the following Formula II:

$R_{VFURC}$=[peak area of the chemical shift of the urethane proton ( ... —NH— ... ) of the urethane bonds ( ... —NH—C(=O)—O— ... ) in VFURC]/[peak area of the chemical shift of the methine proton ( ... —CH= ... ) of the vinyl groups ( ... —CH=CH$_2$) in VFURC]   (Formula II).

According to Formula II, $R_{VFURC}$ has no unit.

The peak areas of the urethane protons of the urethane bonds and the methine protons ( ... —CH=) of the vinyl groups ( ... —CH=CH$_2$) in the VFURC of Formula II were measured as follows: A sample of 75 mg of VFURC was diluted at 40° C. in a mixture of 0.200 ml methanol and 0.600 ml deuterated chloroform containing a known amount (mg) of pyrazine as internal standard for performing $^1$H-NMR spectroscopy. Subsequently, the $^1$H-NMR spectrum of the VFUR sample was recorded at 40° C. on a 400 MHz BRUKER NMR-spectrometer. Afterwards, the chemical shifts (ppm) of the urethane protons of the urethane bonds and the methine protons ( ... —CH= ... ) of the vinyl groups ( ... —CH=CH$_2$) in the VFURC were identified; the chemical shifts (ppm) of the urethane protons of the urethane bonds and the methine protons ( ... —CH= ... ) of the vinyl groups ( ... —CH=CH$_2$) in the VFURC of Formula II measured on a 400 MHz BRUKER NMR-spectrometer in methanol and deuterated chloroform were at about 5.2-6.3 and at about 6.4-6.5 ppm, respectively. Subsequently, with the help of suitable commercially available software for analyzing $^1$H-NMR spectra such as ACD/Spectrus Processor software provided by ACD/Labs, the peak areas of the urethane protons of the urethane bonds and the methine protons ( ... —CH= ... ) of the vinyl groups ( ... —CH=CH$_2$) in the VFURC of Formula II were measured and from these values the $R_{VFUR}$ was determined according to Formula II.

In case in which 75 mg of a VFURC is not soluble at 40° C. in a mixture of 0.200 ml methanol and 0.600 ml deuterated chloroform, then any other suitable solvent or mixture of solvents known to the skilled person for performing the $^1$H-NMR spectroscopy may be used; for example DMSO (dimethyl sulfoxide). The choice of a suitable solvent or a mixture of suitable solvents depends on the solubility of the sample of the VFURC in said solvents. In case in which 0.75 mg of VFURC is soluble in a mixture of 0.200 ml methanol and 0.600 ml deuterated chloroform at 40° C., then the mixture of methanol and deuterated chloroform is the solvent of choice for performing the $^1$H-NMR spectroscopy for the VFURC. In case in which a different solvent or mixture of solvents is used for performing the $^1$H-NMR Method $R_{VFURC}$, then the chemical shifts of the protons of Formula II may shift from the ones reported here for the selected solvents for the $^1$H-NMR Method $R_{VFURC}$ since the actual chemical shifts may depend on the solvent or mixture of solvents used to record the $^1$H-NMR spectrum; in such case one should identify and determine the chemical shifts of the corresponding protons and apply Formula II for the determination of the $R_{VFURC}$.

Estimation the $R_{VFUR}$ of the VFUR or the $R_{VFURC}$ of the VFURC of the Invention a. Estimation of the $R_{VFUR}$ of the VFUR of the Invention A way to estimate the $R_{VFUR}$ of the VFUR of the invention (referred herein as "theoretical $R_{VFUR}$") can be done by dividing the total equivalents of urethane groups of the VFUR (which corresponds in case of compound A is an isocyanate to the total equivalents of isocyanate groups) by the total equivalents of vinyl ether groups used for the preparation of the VFUR [for examples, see Table 2, ComPCC1: 5.00 equivalents of isocyanate groups (2.50 moles of "1,6-hexamethylene diisocyanate"*2 equivalents isocyanate per "1,6-hexamethylene diisocyanate" monomer)/5.00 equivalents of vinyl ether (5.00 moles of "4-hydroxybutyl vinyl ether"*1 equivalent of vinyl ether per 4-hydroxybutyl vinyl ether molecule)=1.00].

Here, it needs to be stressed out that for the purpose of the invention, the aforementioned way of estimating the $R_{VFUR}$ is not by any means meant to replace or substitute the method used to measure the $R_{VFUR}$ that is disclosed herein (see Examples, $^1$H-NMR method $R_{VFUR}$). Any $R_{VFUR}$ value according to the invention must be measured according to the $^1$H-NMR Method $R_{VFUR}$ as it is disclosed herein.

b. Estimation of the $R_{VFURC}$ of the VFURC of the Invention

A way to estimate the $R_{VFURC}$ of the VFURC of the invention (referred herein as "theoretical $R_{VFURC}$") can be done by a calculation based on the following formula A:

$$R_{VFURC} = \frac{\sum_{i=1}^{n} \frac{W_i * R_{VFURi}}{WPUi}}{\sum_{i=1}^{n} \frac{W_i}{WPUi}} \quad \text{(Formula A)}$$

wherein,
Wi is the weight of VFURi;
$R_{VFURi}$ is the theoretical $R_{VFURi}$ of VFURi;
WPUi is the theoretical WPU of VFURi;
n denotes the amount of vinyl functionalized urethane resins contained in the VFURC;
n is an integer of at least 2.
Alternatively and in case measured values of Wi, $R_{VFURi}$ and WPU of the VFURi are available, Formula IV may also be used as follows:
Wi is the weight of VFURi;
$R_{VFURi}$ is the measured $R_{VFURi}$ of VFURi;
WPUi is the measured WPU of VFURi;
'n' denotes the amount of vinyl functionalized urethane resins contained in the VFURC;
n is an integer of at least 2.
For example, in case the VFURC consists of two VFURs, a FVFUR and a SVFUR, n=2, Formula A will afford:

$$R_{VFURC} = \frac{\sum_{i=1}^{2} \frac{W_i * R_{VFURi}}{WPUi}}{\sum_{i=1}^{2} \frac{W_i}{WPUi}} = \frac{\left[\frac{W1 * R_{VFUR1}}{WPU1} + \frac{W2 * R_{VFUR2}}{WPU2}\right]}{\left[\frac{W1}{WPU1} + \frac{W2}{WPU2}\right]}$$

Here, it needs to be stressed out that for the purpose of the invention, the aforementioned way of estimating the $R_{VFURC}$ is (theoretical $R_{VFURC}$) is not meant to replace or substitute the method used to measure the $R_{VFURC}$ that is disclosed herein (see Examples, $^1$H-NMR method $R_{VFURC}$); any $R_{VFURC}$ value according to the invention must be measured according to the $^1$H-NMR Method $R_{VFURC}$ as it is disclosed herein.

$^1$H-NMR Method for the Measurement of the WPU ($^1$H-NMR Method WPU)

The WPU was measured via $^1$H-NMR spectroscopy according to the method entitled—for simplicity—"$^1$H-NMR method WPU" which is presented herein. The estimated margin of error of this method for determining the WPU is +/−2%; the margin of error was determined on the basis of measuring three samples of the same lot of a VFUR or VFURC or UR.

More specifically, said WPU was measured via $^1$H-NMR spectroscopy as explained herein after and it was calculated according to the following Formula III:

$$WPU = \left[\frac{W_{pyr}}{W_{resin}} \frac{1}{MW_{pyr}} \frac{A_{c=c}/N_{c=c}}{A_{pyr}/N_{pyr}}\right]^{-1} \quad \text{(Formula III)}$$

wherein,
$W_{pyr}$ and $W_{resin}$ are the weights of pyrazine (internal standard) and resin, respectively, expressed in the same units.
$MW_{pyr}$ is the molecular weight of the pyrazine (=80 gr/mol).
$A_{pyr}$ is the peak area for methine protons attached to the aromatic ring of pyrazine and $N_{pyr}$ is the number of the methine protons of pyrazine (=4).

In case of a VFUR:
$A_{C=C}$ is the peak area for the methine proton ( . . . —CH= . . . ) of the vinyl groups ( . . . —CH=CH$_2$) in the VFUR; $N_{C=C}$ is the number of methine protons ( . . . —CH= . . . ) of the vinyl groups ( . . . —CH=CH$_2$) in the VFUR.

In case of a VFURC:
$A_{C=C}$ is the peak area for the methine proton ( . . . —CH= . . . ) of the vinyl groups ( . . . —CH=CH$_2$) in VFURC; $N_{C=C}$ is the number of methine protons ( . . . —CH= . . . ) of the vinyl groups ( . . . —CH=CH$_2$) in the VFURC.

In case of a UR:
$A_{C=C}$ is the peak area for methine protons ( . . . —CH= . . . ) of the ethylenic unsaturations (>C=C<) of the UR; $N_{C=C}$ is the number of methine protons ( . . . —CH= . . . ) attached to the ethylenic unsaturations (>C=C<) of the UR.

The peak areas of the methine protons of pyrazine and methine protons ( . . . —CH= . . . ) of the vinyl groups ( . . . —CH=CH$_2$) in the VFUR of Formula III were measured as follows: A sample of 75 mg of VFUR was diluted at 40° C. in a mixture of 0.200 ml methanol and 0.600 ml deuterated chloroform containing a known amount (mg) of pyrazine as internal standard for performing $^1$H-NMR spectroscopy. Subsequently, the $^1$H-NMR spectrum of the VFUR sample was recorded at 40° C. on a 400 MHz BRUKER NMR-spectrometer. Afterwards, the chemical shifts (ppm) of the methine protons of pyrazine and the methine protons ( . . . —CH= . . . ) of the vinyl groups ( . . . —CH=CH$_2$) in the VFUR were identified; the chemical shifts (ppm) of the methine protons of pyrazine and methine protons ( . . . —CH= . . . ) of the vinyl groups ( . . . —CH=CH$_2$) in the VFUR of Formula III measured on a 400 MHz BRUKER NMR-spectrometer in methanol and deuterated chloroform were at about 8.6 and at about 6.4-6.5 ppm, respectively. Subsequently, with the help of suitable commercially available software for analyzing $^1$H-NMR spectra such as ACD/Spectrus Processor software provided by ACD/Labs, the peak areas of the methine protons of pyrazine and methine protons ( . . . —CH= . . . ) of the vinyl groups ( . . . —CH=CH$_2$) in the VFUR of Formula III were measured and from these values the WPU was determined according to Formula III.

The peak areas of the methine protons of pyrazine and methine protons ( . . . —CH= . . . ) of the vinyl groups ( . . . —CH=CH$_2$) in the VFURC of Formula III were measured as follows: A sample of 75 mg of VFURC was diluted at 40° C. in a mixture of 0.200 ml methanol and 0.600 ml deuterated chloroform containing a known amount (mg) of pyrazine as internal standard for performing $^1$H-NMR spectroscopy. Subsequently, the $^1$H-NMR spectrum of the VFURC sample was recorded at 40° C. on a 400 MHz BRUKER NMR-spectrometer. Afterwards, the chemical shifts (ppm) of the methine protons of pyrazine and the methine protons ( . . . —CH= . . . ) of the vinyl groups ( . . . —CH=CH$_2$) in the VFURC were identified; the chemical shifts (ppm) of the methine protons of pyrazine and methine protons ( . . . —CH= . . . ) of the vinyl groups ( . . . —CH=CH$_2$) in the VFURC of Formula III measured on a 400 MHz BRUKER NMR-spectrometer in methanol and deuterated chloroform were at about 8.6 and at about 6.4-6.5 ppm, respectively. Subsequently, with the help of suitable commercially available software for analyzing $^1$H-NMR spectra such as ACD/Spectrus Processor software provided by ACD/Labs, The peak areas of the methine protons of pyrazine and methine protons ( . . . —CH= . . . ) of the vinyl groups ( . . . —CH=CH$_2$) in the VFURC of Formula III were measured and from these values the WPU was determined according to Formula III.

The peak areas of the methine protons of pyrazine and methine protons ( . . . —CH= . . . ) of the ethylenic unsaturations (>C=C<) of the UR in Formula III were measured as follows: A sample of 75 mg of UR was diluted at 25° C. in 1 ml deuterated chloroform containing a known amount (mg) of pyrazine as internal standard for performing $^1$H-NMR spectroscopy. Subsequently, the $^1$H-NMR spectrum of the UR sample was recorded at 25° C. on a 400 MHz BRUKER NMR-spectrometer. Afterwards, the chemical shifts (ppm) of the methine protons of pyrazine and the methine protons ( . . . —CH= . . . ) of the ethylenic unsaturations (>C=C<) of the UR were identified; the chemical shifts (ppm) of the methine protons of pyrazine and the methine protons ( . . . —CH= . . . ) of the ethylenic unsaturations (>C=C<) of the UR in Formula III measured on a 400 MHz BRUKER NMR-spectrometer in methanol and deuterated chloroform were at about 8.6 and at about 6.4-6.5 ppm, respectively. Subsequently, with the help of suitable commercially available software for analyzing $^1$H-NMR spectra such as ACD/Spectrus Processor software provided by ACD/Labs, the peak areas of the methine protons of pyrazine and methine protons ( . . . —CH= . . . ) of the ethylenic unsaturations (>C=C<) of the UR of Formula III were measured and from these values the WPU was determined according to Formula III.

In case in which 75 mg of a VFUR or a VFURC is not soluble at 40° C. in a mixture of 0.200 ml methanol and 0.600 ml deuterated chloroform, then any other suitable solvent or mixture of solvents known to the skilled person for performing the $^1$H-NMR spectroscopy may be used; for example DMSO (dimethyl sulfoxide). In case in which 75 mg of a UR is not soluble at 25° C. in 1 ml of deuterated chloroform, then any other suitable solvent or mixture of solvents known to the skilled person for performing the $^1$H-NMR spectroscopy may be used; for example DMSO (dimethyl sulfoxide). The choice of a suitable solvent or a mixture of suitable solvents depends on the solubility of the sample of the VFUR or VFURC or UR in said solvents. In case in which 0.75 mg of VFUR or VFURC is soluble in a mixture of 0.200 ml methanol and 0.600 ml deuterated chloroform at 40° C., then a mixture of methanol and deuterated chloroform is the solvent of choice for performing the $^1$H-NMR spectroscopy for the VFUR or VFURC. In case in which 0.75 mg of UR is soluble in 1 mL of deuterated chloroform at 25° C., then deuterated chloroform is the solvent of choice for performing the $^1$H-NMR spectroscopy for the UR. In case in which a different solvent or mixture of solvents is used for performing the $^1$H-NMR Method WPU, then the chemical shifts of the protons of Formula III may shift from the ones reported here for the selected solvents for the $^1$H-NMR Method WPU since the actual chemical shifts may depend on the solvent or mixture of solvents used to record the $^1$H-NMR spectrum; in such case one should identify and determine the chemical shifts of the corresponding protons and apply Formula III for the determination of WPU.

DSC method for the measurement of $T_g$, $T_m$, $T_c$, $\Delta H_m$, $\Delta H_c$ The glass transition temperature ($T_g$) (inflection point), the crystallization temperature ($T_c$), the crystallization enthalpy ($\Delta H_c$), the melting temperature ($T_m$) and the melting enthalpy ($\Delta H_m$) were measured via Differential Scanning calorimetry (DSC) on a Mettler Toledo, TA DSC821 apparatus, in N$_2$ atmosphere as described herein after: A sample of 10 mg was placed in the DSC apparatus. The sample was brought to 25° C. In the first heating curve, the sample was heated to 150° C. with a heating rate of 5° C./min. The sample was kept at 150° C. for 1 min. The sample was subsequently cooled to −50° C. with a cooling rate of 5° C./min, resulting in a cooling curve. After reaching −50° C. the sample was immediately heated to 150° C. with a heating rate of 5° C./min, affording a second heating curve. The $T_c$ and the $\Delta H_c$ were determined from the cooling curve (150° C. to −50° C., cooling rate 5° C./min) whereas the $T_g$, $T_m$ and $\Delta H_m$ were determined from the second heating curve (−50° C. to 150° C., heating rate of 5° C./min).

Measurements and Assessment of Properties of the Thermosetting Powder Coating Compositions After extrusion the sample was evaluated on processability aspects like ease to transport between the cooling rollers and stickiness on these rollers. Also was visually evaluated whether viscosity after extrusion was not too low and whether flaking was possible. Additionally the D value, as described in the method below was taken into account. All formulations with D values of 35° C. or lower displays good processing behaviour. Good overall processing results in a 'very good' rating, poor overall processing results in a 'poor' rating (see Tables 5-8).

All thermosetting powder coating compositions described in the Examples and shown in the relevant Tables, had a particle size lower than 90 microns.

The physical powder storage stability (PPS) of the thermosetting powder coating compositions of the present invention was tested according to ISO 8130/part 8, at 25° C. for a total of 28 days. Prior to assessing the storage stability the thermosetting powder coating composition was left to cool down to room temperature for at least 2 hours. The extent of the agglomeration was visually assessed and ranked according to the following rating on a 1-10 scale [1: very poor stability (extensive agglomeration, thermosetting powder coating composition was compacted into one solid block) and 10: excellent stability (no agglomeration, free flowing powder, powder flow same as a freshly prepared thermosetting powder coating composition)]. In the context of the present invention thermosetting powder coating compositions that are rated with at least 5, are regarded as "storage stable".

The $T_g$ of the thermosetting powder coating composition was measured after extrusion according to the DSC method mentioned herein.

Method for the Measurement of D (Method D)

The measurement of D was carried out according to the following method:

An amount of 0.05 g of a compressed pill of a blend of UR with either i) VFUR or ii) VFURC or iii) VFUR and VFURC (depending on the presence of VFUR and/or VFURC in the thermosetting powder coating composition; see definition of D in the description); the composition of which the D values are to measured), was inserted in a 8 mm Ø plate-plate system (plate-plate distance=0.6 mm) of the Physica MCR301 rheometer, at a temperature of 100° C. After 5 minutes at 100° C., the sample is cooled down to 0° C., at a cooling rate of 10° C./min. This standard cooling procedure is meant to mimic the cooling procedure of a thermosetting powder coating composition leaving the extruder at a temperature of 100° C. Immediately after the cooling step, the $T_g$ achieved during cooling is measured during an heating step from 0 up to 100° C., at a heating rate of 10° C./min. While heating, the sample is subjected to a small oscillatory shear deformation (strain amplitude=0.001) at a frequency of 1 Hz, in order to monitor the loss modulus (G″)

as a function of temperature. The $T_g$ is defined as the temperature at which G″ reaches its maximum value. The margin of error of this method+/−1° C. In order to rule out the influence of the measuring method on the $T_g$ value, $T_g$'s have been considered relative to the $T_g$ values of the UR, measured according to the same procedure.

Since all the thermosetting powder coating compositions of the Examples comprised only one UR and one VFUR, the reported D values of the thermosetting powder coating compositions of the Examples were calculated according to the following equation: D=($T_g$ of UR)−($T_g$ of a blend of UR with VFUR).

Methods for the Measurement of Properties of the Powder Coatings Derived Upon Heat-Curing of the Thermosetting Powder Coating Compositions Prepared Herein.

The properties—as mentioned herein—of the powder coatings CompPC1-16 and InvPC1-15 derived upon heat-curing of their corresponding thermosetting powder coating compositions presented in Tables 5-7 (CompPCC1-16 and InvPCC1-15) were measured on aluminum panels (type: AL36) cured for 10 minutes at 120° C. in a convection oven or on MDF panels (type: Medite MR) cured for 5 minutes at 120° C. in a gas-catalytic IR oven by Vulcan or on Class A type sheet molding compound (known also as Class A Type SMC) as described below, cured for 10 minutes at 150° C.

Film Konig hardness measurements were carried out on aluminum panels (type: AL36) according to DIN 53157 (Byk 5840 apparatus).

Gloss and haze measurements were carried out on aluminum panels (type: AL36) according to ASTM-D-523/70 at 20° and 60° with a haze-gloss meter (Byk-Gardner).

Smoothness (or also known in the art as flow) of powder coatings derived upon full cure of the corresponding heat-curable thermosetting powder coating compositions was determined on aluminum panels (type: AL36) by comparing the smoothness of the coating with PCI Powder Coating Smoothness panels (ACT Test Panels Inc., APR22163 (A) Batch: 50708816) at a thickness of approximately 60 μm. The rating of smoothness is from 1 to 10, with 1 representing the roughest coating and 10 representing the smoothest coating. For the heat-curable thermosetting powder coating compositions of the invention, their corresponding powder coatings had smoothness equal or higher to 1, more preferably equal or higher to 2, even more preferably equal or higher to 3, most preferably equal or higher to 4, are desirable. In addition, a score of 0 corresponds to a textured surface, in other words a poorer surface than available on the reference panels.

Direct impact on MDF was measured on MDF panels (type: Medite MR) by dropping a steel ball with a diameter of ⅝ inch (16 mm) and a weight of 1 pound (452 gram) from a defined height. The height at which the ball is dropped is measured in inch (1 inch is 25.4 mm). The experiment is repeated by increasing the height with steps of one inch till the coating is damaged. The height at which no damage to the coating is observed when dropping the ball of 1 pound represents the maximal value in "inch pound". The direct impact resistance is viewed herein as a measure of the flexibility of a powder coating.

Ethanol (48 vol % ethyl alcohol) resistance (16 hr), coffee resistance (16 hr), red wine resistance (5 hr) and acetone resistance (10 sec) were carried out according to DIN 68861 1B on aluminum panels (type: AL36).

The minimum depth (mm) of indentation to cause failure [commonly known also as Erichsen Slow Penetration (ESP)] was determined on aluminum panels (type: AL36) according to ISO 1520:2006 (Cupping Test, especially § 7.3), 7 days after curing the panels with the heat-curable thermosetting powder coating compositions as described herein (curing conditions 120° C. for 10 min). The minimum depth of indentation to cause failure was determined. ISO 1520:2006 specifies an empirical test procedure for assessing the resistance of a coating to cracking and/or detachment from a metal substrate when subjected to gradual deformation by indentation under standard conditions. The method was carried out by gradually increasing the depth of indentation to determine the minimum depth (mm) at which the coating cracks and/or becomes detached from the substrate. The maximum of two valid measurements of the minimum depth of indentation to cause failure was reported.

The adhesion was determined on MDF panels (type: Medite MR) using a cross-cut test (Gitterschnitt) in accordance with ISO 2409 (edition 3, dated 15 May 2007). The degree of adhesion of the coating onto the substrate was classified with a scale from 0 to 5; 0 means cross-cut area was not affected (excellent adhesion); 1 means that the affected cross-cut area is significantly greater than 5%; 2 means that the affected cross-cut area is significantly greater than 5% but not significantly greater than 15%; 3 means that the affected cross-cut area is significantly greater than 15% but not significantly greater than 35%; 4 means that the affected cross-cut area is significantly greater than 35% but not significantly greater than 65%; 5 means any degree of flaking that cannot even be classified by classification 4 (very poor adhesion). A skilled person will appreciate that an adhesion value of 5 or less [as measured in accordance to ISO 2409 (edition 3, dated 15 May 2007)] on any common substrate such as aluminium (AL36), MDF (type: Medite MR), SMC (Class A Type SMC as described herein) of the powder coatings of the invention, is sufficient for the powder coatings of the invention to exhibit the desired advantages described herein; thus an adhesion value as described herein of 5 or less is sufficient to achieve the objects of the invention. The powder coatings of the invention have preferably a good adhesion on MDF; by "good adhesion on MDF" is meant herein that the adhesion (as this is defined and measured in the Examples) of powder coatings derived upon curing of thermosetting powder coating compositions is 5 or less, preferably is 4 or less, more preferably is 3 or less, even more preferably is 2 or less, most preferably is 1 or less.

The scratch resistance (in Newtons) of the powder coatings InvPC14-15 derived upon heat-curing of their corresponding thermosetting powder coating compositions presented in Table 8 (InvPCC14-15) was measured on sheet molding compounds [Class A Type SMC, prepared from resin Palapreg P 0423-02 (supplied by DSM Composite Resins) suitable for the preparation of a sheet molding compound, impregnated with glass fibers; Palapreg P 0423-02 is an unsaturated polyester resin derived from maleic acid and standard glycols, dissolved in styrene) powder coated with the InvPCC14-15 and cured for 10 minutes at 150° C. in a heated mould as described herein after. The scratch resistance was measured with the Universal Scratch Tester model 413 from Erichsen, according to EN 438-2:2005 on powder coated class A Type SMC as the latter are exemplified herein. Increasing loads are applied in specified steps to a diamond scratching point of defined geometry. The resistance to scratching of the decorative laminate sheet under test is expressed as a numerical rating which defines the maximum applied load which does not produce a continuous surface scratch. The higher the reported applied load, the better the scratch resistance. The test result is verified by visually confirming that the next higher load-step produces a continuous scratch. The definition of a scratch mark is where the contrast medium is engrained in the scratch, and is clearly visible as a line of colour contrasting with the colour of the specimen. As contrast medium black stamp pad ink was used.

Unsaturated Resins Comprising Ethylenic Unsaturations:
Unsaturated Polyester Resins Comprising 2-Butenedioic Acid Ethylenic Unsaturations Table 1 presents the monomers used for the preparation of the unsaturated polyester resin comprising 2-butenedioic acid ethylenic unsaturations and the properties of said resins.

Amorphous (UR1-UR3 and UR5) and crystalline (UR4) unsaturated polyesters comprising 2-butenedioic acid ethylenic unsaturations were prepared.

All unsaturated polyester resin comprising 2-butenedioic acid ethylenic unsaturations (UR1-UR5) prepared herein were solid at room temperature and at atmospheric pressure.
Synthesis of Amorphous Unsaturated Polyester Resins Comprising 2-Butenedioic Acid Ethylenic Unsaturations (UR1-UR3 and UR5)
Amorphous Unsaturated Polyester Resin Comprising 2-Butenedioic Acid Ethylenic Unsaturations UR1

A reaction vessel fitted with a thermometer, a stirrer and a distillation device for the removal of water formed during the synthesis, was filled with a tin catalyst (butyl stanoic acid, 1.0 g) and the monomers for the first step (terephthalic acid (477.5 g; 2.87 mol), neopentylglycol (383.0 g; 3.68 mol) and trimethylolpropane (38.3 g; 0.29 mol) as listed in Table 1. Stirring was then applied and a light nitrogen flow was passed over the reaction mixture while the temperature was raised to 220° C. The temperature was kept at 220° C. till an acid value of approximately 10 mg KOH/g resin was reached and till no water was being released. Subsequently, the temperature was lowered to 180° C. and for the second step fumaric acid (101,2 g; 0.87 mol) together with a small amount of radical inhibitor (2-t-butylhydroquinone, 0.1 g) was added at a temperature of 180° C. followed by esterification at 205° C. When an acid value of approximately 15 mg KOH/g resin was reached and nowater was being released, the third stage of the polyester resin preparation was initiated and carried out under reduced pressure at 205° C. till an acid value of approximately 5 mg KOH/g resin was reached. Subsequently, the vacuum was removed and the temperature was lowered to 185° C.; a small amount of catalyst (tetraethyl ammonium bromide, 1,8 g) and an amount of ethylene carbonate (7.8 g) were added to the resin; the reaction between ethylene carbonate and the acid groups of the resin continued for at least 30 minutes up until the resin reached an acid and a hydroxyl value as disclosed in Table 1. Subsequently, the polyester resin was discharged onto an aluminum foil kept at room temperature.
Amorphous Unsaturated Polyester Resin Comprising 2-Butenedioic Acid Ethylenic Unsaturations UR2

A reaction vessel fitted with a thermometer, a stirrer and a distillation device for the removal of water formed during the synthesis, was filled with a tin catalyst (butylchlorotin dihydroxide, 0.5 g) and the monomers for the first step (terephthalic acid (468.2 g; 2.82 mol), neopentylglycol (394.3 g; 3.79 mol) and trimethylolpropane (38.3 g; 0.29 mol)) as listed in Table 1. Stirring was then applied and a light nitrogen flow was passed over the reaction mixture while the temperature was raised to 220° C. The temperature was kept at 220° C. till an acid value of less than 100 mg KOH/g resin was reached. Subsequently, the temperature was lowered to 140° C. and for the second step fumaric acid (99.2 g; 0.85 mol) together with a small amount of tin catalyst (butylchlorotindihydroxide, 0.5 g) and a radical inhibitor (2-t-butylhydroquinone, 0.1 g) were added at 140° C. followed by esterification at 215° C. When an acid value of approximately 12 mg KOH/g resin was reached and no water was being released, the temperature was lowered to 180° C. The third stage of the polyester resin preparation was carried out under reduced pressure at 180° C. till an acid and a hydroxyl value as disclosed in Table 1 were reached. Subsequently, the polyester resin was discharged onto an aluminum foil kept at room temperature.
Amorphous Unsaturated Polyester Resin Comprising 2-Butenedioic Acid Ethylenic Unsaturations UR3

A reaction vessel fitted with a thermometer, a stirrer and a distillation device for the removal of water formed during the synthesis, was filled with a tin catalyst (butyl stannoic acid, 1,0 g) and the monomers for the first step (isophthalic acid (281,7 g; 1.70 mol), neopentylglycol (276.8 g; 2.66 mol) and hydrogenated bisphenol A (237.7 g; 0.99 mol)) as listed in Table 1. Stirring was then applied and a light nitrogen flow was passed over the reaction mixture while the temperature was raised to 220° C. The temperature was kept at 220° C. till an acid value of approximately 5 mg KOH/g resin was reached and till no water being was released. Subsequently, the temperature was lowered to 180° C. and for the second step fumaric acid (203.8 g; 1.76 mol) together with a small amount of radical inhibitor (2-t-butylhydroquinone, 0.2 g) was added followed by esterification at 205° C. When an acid value of approximately 15 mg KOH/g resin was reached and no water was being released, the third stage of the polyester resin preparation was carried out under reduced pressure at 205° C. till an acid and a hydroxyl value as disclosed in Table 1 were reached. Subsequently, the polyester resin was discharged onto an aluminum foil kept at room temperature.
Amorphous Unsaturated Polyester Resin Comprising 2-Butenedioic Acid Ethylenic Unsaturations UR5

A reaction vessel fitted with a thermometer, a stirrer and a distillation device for the removal of water formed during the synthesis, was filled with a tin catalyst (butyl stannoic acid, 1,0 g) and the monomers for the first step (terephthalic acid (547.9 g; 3.30 mol), 1,2-propylene glycol (314.2 g; 4.13 mol) and trimethylolpropane (39.1 g; 0.29 mol) as listed in Table 1. Stirring was then applied and a light nitrogen flow was passed over the reaction mixture while the temperature was raised to 220° C. The temperature was kept at 220° C. till an acid value of approximately 12 mg KOH/g resin was reached and till no water was being released. Subsequently, the temperature was lowered to 180° C. and for the second step fumaric acid (98.9 g; 0.85 mol) together with a small amount of radical inhibitor (2-t-butylhydroquinone, 0.1 g) was added at a temperature of 180° C. followed by esterification at 205° C. When an acid value of approximately 15 mg KOH/g resin was reached and no water was being released, the third stage of the polyester resin preparation was carried out under reduced pressure at 205° C. till an acid value of approximately 5 mg KOH/g resin was reached. Subsequently, the vacuum was removed and the temperature was then lowered to 185° C.; at this temperature an amount of 2,3-epoxy propyl neodecanoate (20.3 g) was added to the resin; the reaction between 2,3-epoxy propyl neodecanoate and the acid groups of the resin continued for at least 30 minutes up until the resin reached an acid and a hydroxyl value as disclosed in Table 1. Subsequently, the polyester resin was discharged onto an aluminum foil kept at room temperature.

Synthesis of Crystalline Unsaturated Polyester Resin Comprising 2-Butenedioic Acid Ethylenic Unsaturations (UR4) Crystalline Unsaturated Polyester Resin Comprising 2-Butenedioic Acid Ethylenic Unsaturations (UR4)

A reaction vessel fitted with a thermometer, a stirrer and a distillation device for the removal of water formed during the synthesis, was filled with a tin catalyst (butyl stannoic acid, 0.4 g) and radical inhibitor (2-t-butylhydroquinone, 0.2 g) and the monomers for the first and second step (terephthalic acid (303.5 g; 1.83 mol), hexane diol (475.8 g; 4.03 mol and fumaric acid (220.7 g; 1.90 mol) as listed in Table 1. Stirring was then applied and a light nitrogen flow was passed over the reaction mixture while the temperature was raised to 225° C. and kept at 225° C. up until an acid value of approximately 12 mg KOH/g resin was reached and no water was being released; subsequently, the temperature was lowered to 180° C. The second stage of the polyester resin preparation was carried out under reduced pressure at 180° C. till an acid and a hydroxyl value as disclosed in Table 1 were reached. Subsequently, the polyester resin was discharged onto an aluminum foil kept at room temperature.

Vinyl Functionalized Urethane Resins (VFUR)

Amorphous and crystalline vinyl functionalized urethane resins (VFUR) were prepared and they were used as curing agents in the thermosetting powder coating compositions prepared herein.

Table 2 presents the monomers used for the preparation of the comparative VFUR and the properties of said resins.

Table 3 presents the monomers used for the preparation of the inventive VFUR and the properties of said resins.

CompVFUR1

URACROSS® P3307 (supplied by DSM) was used as CompVFUR1. URACROSS® P3307 is a crystalline vinyl ether functionalized urethane resin (VEFUR), solid at room temperature and at atmospheric pressure.

The properties of the URACROSS® P3307 were: $T_m$=100° C.; $T_c$=76° C.; $\Delta H_m$=163 J/g; Theoretical WPU=200 g/mol; Theoretical $M_n$=400 Da [this was calculated by adding up 1 mol of hexanediisocyanate (168.20 Da) with 2 mol of 4-hydroxybutyl vinyl ether (116.16 Da)];

CompVFUR2-4, 8-11 and InvVFUR1-11

A reaction vessel fitted with a thermometer and a stirrer, was filled with a tin catalyst (dibutyltin dilaurate, 0.1 g) and the monomers for the first step as listed in Tables 2-3. Stirring was then applied and a light nitrogen flow was passed over the reaction mixture while the temperature was raised to approximately 60° C. Subsequently, for the second step an isocyanate as listed in Tables 2-3 was dosed such that the reaction mixture was kept below 120° C. during addition. After all the isocyanate was dosed, the temperature was kept or set at 120° C. and maintained at this temperature for approximately half an hour. The temperature was kept at 120° C. and vacuum was applied to remove all volatiles. After vacuum the content of the vessel was discharged.

CompVFUR5

A reaction vessel fitted with a thermometer and a stirrer, was filled with a tin catalyst (dibutyltin dilaurate, 0.1 g) and hexamethylene diisocyanate as listed in Table 2. Stirring was then applied and a light nitrogen flow was passed over the reaction mixture while the temperature was raised to approximately 60° C. Subsequently, trimethylol propane, the triol, as listed in Table 2 was dosed such that the reaction mixture was kept below 65° C. during addition. After all triol was dosed, 4-hydroxybutyl vinyl ether as listed in Table 2 was dosed such that the reaction mixture was kept below 100° C. during addition.

After the addition of the 4-hydroxybutyl vinyl ether was completed, the temperature was set at 120° C. and maintained at this temperature for approximately half an hour. The temperature was kept at 120° C. and vacuum was applied to remove all volatiles. After vacuum the content of the vessel was discharged.

CompVFUR6-7, 12-13 and InvVFUR12

A reaction vessel fitted with a thermometer, a stirrer and a distillation device for the removal of water formed during the synthesis, was filled with a tin catalyst (butyl stannoic acid, 0.5 g) and the monomers for the first step (except 4-hydroxybutyl vinyl ether) as listed in Tables 2-3. Stirring was then applied and a light nitrogen flow was passed over the reaction mixture while the temperature was raised to 220° C. The temperature was kept at 220° C. till an acid value of approximately 10 mg KOH/g resin was reached and till no water was being released. Subsequently, the temperature was lowered to 120° C. and as last monomer of the first step the 4-hydroxybutyl vinyl ether and a tin catalyst (dibutyltin dilaurate, 0.5 g) were added at a temperature of 120° C. Subsequently, for the second step the isocyanate as listed in Tables 2-3 was dosed such that the reaction mixture was kept below 120° C. during addition. After all the isocyanate was dosed, the temperature was kept or set at 120° C. and maintained at this temperature for approximately half an hour. The temperature was kept at 120° C. and vacuum was applied to remove all volatiles. After vacuum the content of the vessel was discharged.

Preparation of Thermosetting Powder Coating Compositions: General Procedure

The compositions of the thermosetting powder coating compositions are presented in Tables 5-7.

The thermal radical initiators for example peroxides, the inhibitors and the pigments used for the preparation of the heat-curable thermosetting powder coating compositions are presented in Table 4. Luparox® A75 is a dibenzoyl peroxide from Arkema, Kronos® 2310 is titanium dioxide from Kronos Titan GmbH, Resiflow® PV-5 is a flow control agent from Worlée-Chemie GmbH and Byk® 361 is a flow control agent from BYK.

The thermosetting powder coating compositions were prepared by first mixing in a blender the unsaturated resin comprising ethylenic unsaturations (UR) (see PE1-PE5) and the vinyl functionalized urethane resin (VFUR) used as curing agents (see CompVFUR1-13 and InvVFUR1-12) as presented in Tables 5-8; said mixture was subsequently extruded in a PRISM TSE16 PC twin screw extruder at 120° C. with a screw speed of 200 rpm and a torque higher than 90%. The extrudate of UR and VFUR was allowed to cool to room temperature and broken into chips. Subsequently, the extrudate of UR and VFUR was mixed with the rest of the ingredients of the thermosetting powder composition presented in Tables 5-8 in a blender; subsequently, the mixture obtained was extruded in a PRISM TSE16 PC twin screw extruder at 65° C. with a screw speed of 200 rpm and a torque higher than 90%. The extrudate was allowed to cool at room temperature and broken into chips. These chips were then ground in an ultra-centrifugal mill at 14,000 rpm and sieved in a Retsch ZM100 sieve. The sieve fraction with particle size below 90 μm was collected (by means of a Fritsch Analysette Spartan sieving apparatus equipped with a 90 micron sieve, sieving performed for 15 minutes at 2.5 mm amplitude) and used for further experiments.

Preparation of the Powder Coatings CompPC1-16 and InvPC1-15 a. Preparation of CompPC1-16 and InvPC1-15

The thermosetting powder coating compositions CompPCC1-16, and InvPCC1-15 prepared herein were electrostatically sprayed (corona spray gun, 60 kV) onto on aluminum (type: AL36) and MDF (type: Medite MR) test panels to a coating thickness upon curing of approximately 60 μm and cured at a temperature of 120° C. for 10 minutes in an air-circulation oven (Heraeus Instruments UT6120) (for the AL36 panels) or at a temperature of 120° C. for 5 minutes in a gas-catalytic IR (for the MDF panels) oven affording white powder coatings CompPC1-16 and InvPC1-15, respectively b. Preparation of InvPC14-15 Via Powder-in-Mould-Coating Process The thermosetting powder coating compositions InvPCC14-15 were also applied through electrostatic spraying (corona spray gun, 60 kV), as a powder to the interior wall of a (pre-heated) mould. Subsequently, a fill compound, a Class A Type SMC as described herein, is then put in the mould. The powder in mould coating was heat cured (10 minutes at 150° C.) on the hot mould and together with the Class A Type SMC as described herein (fill compound). After curing the mould was opened, and the moulded article coated with the powder coatings InvPC14 and InvPC15, respectively were obtained and removed from the mould.

TABLE 1

Composition and characterization of unsaturated polyester resins comprising 2-butenedioic acid ethylenic unsaturations

| | UR | | | | |
|---|---|---|---|---|---|
| | UR1 | UR2 | UR3 | UR4 | UR5 |
| Monomers first step | | | | | |
| Isophthalic acid (mol) | | | 1.70 | | |
| Terephthalic acid (mol) | 2.87 | 2.82 | | 1.83 | 3.30 |
| Neopentylglycol (mol) | 3.68 | 3.79 | 2.66 | | |
| Trimethylol propane (mol) | 0.29 | 0.29 | | | 0.29 |
| 1,2-propylene glycol (mol) | | | | | 4.13 |
| Hydrogenated bisphenol A (mol) | | | 0.99 | | |
| Hexane diol (mol) | | | | 4.03 | |
| Monomers second step | | | | | |
| Fumaric acid (mol) | 0.87 | 0.85 | 1.76 | 1.90 | 0.85 |
| Total (mol) | 7.71 | 7.74 | 7.10 | 7.75 | 8.57 |
| Monomers first step | | | | | |
| Isophthalic acid (g) | | | 281.7 | | |
| Terephthalic acid (g) | 477.5 | 468.2 | | 303.5 | 547.9 |
| Neopentylglycol (g) | 383.0 | 394.3 | 276.8 | | |
| Trimethylol propane (g) | 38.3 | 38.3 | | | 39.1 |
| 1,2-propylene glycol (g) | | | | | 314.2 |
| Hydrogenated bisphenol A (g) | | | 237.7 | | |
| Hexane diol (g) | | | | 475.8 | |
| Monomers second step | | | | | |
| Fumaric acid (g) | 101.2 | 99.2 | 203.8 | 220.7 | 98.9 |
| Total weight (g) | 1000.0 | 1000.0 | 1000.0 | 1000.0 | 1000.0 |
| Water formed during synthesis (g) | 133.6 | 132.2 | 123.4 | 134.1 | 148.2 |
| Weight (g) of resin produced | 866.4 | 867.8 | 876.6 | 865.9 | 851.8 |
| Characterisation of UR | | | | | |
| Theoretical values | | | | | |
| AV (mg KOH/g UR) | 1 | 0 | 4 | 1 | 1 |
| OHV (mg KOH/g UR) | 57 | 70 | 29 | 39 | 60 |
| Functionality (f) | 2.9 | 2.7 | 2.0 | 2.0 | 2.9 |
| $M_n$ (Da) | 2806 | 2164 | 3401 | 2792 | 2668 |
| WPU (g/mol) | 993 | 1016 | 499 | 455 | 1000 |
| Measured values | | | | | |
| WPU (g/mol) | 1031 | 1053 | 524 | 471 | 1028 |
| $T_g$ (° C.) | 48 | 48 | 53 | n.a. | 52 |
| $T_c$ (° C.) | n.a. | n.a. | n.a. | 45 | n.a. |
| $\Delta H_c$ (J/g) | n.a. | n.a. | n.a. | 55 | n.a. |
| $T_m$ (° C.) | n.a. | n.a. | n.a. | 67 | n.a. |
| $\Delta H_m$ (J/g) | n.a. | n.a. | n.a. | 39 | n.a. |
| Viscosity (Pa · s) @ 160° C. | 20.4 | 9.1 | 41.1 | 2.2 | 2.7 |
| AV (mg KOH/g UR) | 0.7 | 5.3 | 4.7 | 1.7 | 1.5 |
| OHV (mg KOH/g UR) | 49.8 | 69.8 | 35.7 | 35.6 | 56.7 |

TABLE 2

Composition and characterization of: i) comparative (amorphous) vinyl ether functionalized urethane resins and ii) comparative crystalline vinyl ether functionalized urethane resins having $R_{VFUR}$ outside the relevant claimed range.

| | VFUR | | | | | | |
|---|---|---|---|---|---|---|---|
| | CompVFUR1 | CompVFUR2 | CompVFUR3 | CompVFUR4 | CompVFUR5 | CompVFUR6 | CompVFUR7 |
| Monomers first step | | | | | | | |
| Isophthalic acid (mol) | | | | | | | |
| Terephthalic acid (mol) | | | | | | 2.08 | |
| Dodecane diolic acid (mol) | | | | | | | 1.98 |
| Ethylene glycol (mol) | | | | | | | 3.14 |
| Neopentylglycol (mol) | | | | | | | |
| Diethylene glycol (mol) | | | | 1.48 | | | |
| Trimethylol propane (mol) | | | | | 1.01 | | |
| Hydrogenated bisphenol A (mol) | | | | | | | |
| Hexane diol (mol) | | 1.45 | | | | 2.71 | |
| Butane diol (mol) | | | 1.51 | | | | |
| 4-hydroxybutyl vinyl ether (mol) | 5.00 | 2.90 | 3.02 | 2.95 | 3.03 | 1.16 | 1.20 |
| Monomers second step | | | | | | | |
| Toluene diisocyanate (mol) | | | | | | | |
| Isophorone diisocyanate (mol) | | | | | | | |
| Hexamethylene diisocyanate (mol) | 2.50 | 2.90 | 3.02 | 2.95 | 3.03 | 1.19 | 1.20 |
| Total (mol) | 7.50 | 7.25 | 7.55 | 7.38 | 7.06 | 7.13 | 7.52 |
| Total weight (g) | 1000 | 1000 | 1000 | 1000 | 1000 | 1000 | 1000 |
| Water formed during synthesis (g) | 0 | 0 | 0 | 0 | 0 | 75 | 71 |
| Weight (g) of resin produced | 1000 | 1000 | 1000 | 1000 | 1000 | 925.1 | 928.7 |
| RVFUR | | | | | | | |
| Theoretical | 1.00 | 2.00 | 2.00 | 2.00 | 2.00 | 2.06 | 2.07 |
| Measured | 1.02 | 2.22 | 2.42 | 2.02 | 1.82 | 2.62 | 2.45 |
| Characterisation of VFUR | | | | | | | |
| Amorphous or crystalline | Cryst | Cryst | Cryst | Cryst | Cryst | Cryst | Cryst |
| Theoretical values | | | | | | | |
| Mn (Da) | 400 | 688 | 660 | 670 | 987 | 1600 | 1540 |
| WPU (g/mol) | 200 | 345 | 331 | 339 | 330 | 801 | 772 |
| Measured values | | | | | | | |
| WPU (g/mol) | 202 | 417 | 408 | 337 | 335 | 907 | 906 |
| Tg (° C.) | n.a. | n.a. | n.a. | n.a. | n.a. | n.a. | n.a. |
| Tc (° C.) | 77 | 100 | 128 | 65 | n.a. | 84 | 53 |
| ΔHc (J/g) | 157 | 92 | 141 | 106 | n.a. | 52 | 87 |
| Tm (° C.) | 100 | 120 | 150 | 108 | 82 | 119 | 70 |
| ΔHm (J/g) | 162 | 102 | 142 | 128 | 39 | 77 | 85 |

| | VFUR | | | | | |
|---|---|---|---|---|---|---|
| | CompVFUR8 | CompVFUR9 | CompVFUR10 | CompVFUR11 | CompVFUR12 | CompVFUR13 |
| Monomers first step | | | | | | |
| Isophthalic acid (mol) | | | | | 0.39 | 0.84 |
| Terephthalic acid (mol) | | | | | | |
| Dodecane diolic acid (mol) | | | | | | |
| Ethylene glycol (mol) | | | | | | |
| Neopentylglycol (mol) | | | | | 0.39 | 0.84 |
| Diethylene glycol (mol) | | | | | | |
| Trimethylol propane (mol) | | | | | | |
| Hydrogenated bisphenol A (mol) | | | | | 0.39 | 0.84 |
| Hexane diol (mol) | | | 0.46 | 1.25 | | |
| Butane diol (mol) | | | | | | |
| 4-hydroxybutyl vinyl ether (mol) | 4.92 | 4.40 | 3.70 | 2.50 | 3.12 | 1.68 |
| Monomers second step | | | | | | |
| Toluene diisocyanate (mol) | 2.46 | | | | | |
| Isophorone diisocyanate (mol) | | 2.20 | 2.31 | 2.50 | 1.95 | 1.68 |
| Hexamethylene diisocyanate (mol) | | | | | | |
| Total (mol) | 7.38 | 6.60 | 6.47 | 6.25 | 6.25 | 5.89 |
| Total weight (g) | 1000 | 1000 | 1000 | 1000 | 1000 | 1000 |
| Water formed during synthesis (g) | 0 | 0 | 0 | 0 | 14 | 30 |

TABLE 2-continued

Composition and characterization of: i) comparative (amorphous) vinyl ether functionalized urethane resins and ii) comparative crystalline vinyl ether functionalized urethane resins having $R_{VFUR}$ outside the relevant claimed range.

| | | | | | | |
|---|---|---|---|---|---|---|
| Weight (g) of resin produced | 1000 | 1000 | 1000 | 1000 | 986 | 969.8 |
| $R_{VFUR}$ | | | | | | |
| Theoretical | 1.00 | 1.00 | 1.25 | 2.00 | 1.25 | 2.00 |
| Measured | 0.99 | 1.01 | 1.29 | 3.56 | 1.63 | 3.29 |
| Characterisation of VFUR | | | | | | |
| Amorphous or crystalline | Cryst | Amorp | Amorp | Amorp | Amorp | Amorp |
| Theoretical values | | | | | | |
| $M_n$ (Da) | 406 | 454 | 538 | 788 | 625 | 1152 |
| WPU (g/mol) | 203 | 227 | 270 | 400 | 316 | 576 |
| Measured values | | | | | | |
| WPU (g/mol) | 197 | 228 | 288 | 640 | 294 | 680 |
| Tg (° C.) | n.a. | −28 | −22 | 7 | 20 | 42 |
| Tc (° C.) | n.a. | n.a. | n.a. | n.a. | n.a. | n.a. |
| ΔHc (J/g) | n.a. | n.a. | n.a. | n.a. | n.a. | n.a. |
| Tm (° C.) | 57 | n.a. | n.a. | n.a. | n.a. | n.a. |
| ΔHm (J/g) | 93 | n.a. | n.a. | n.a. | n.a. | n.a. |

TABLE 3

Composition and characterization of inventive crystalline vinyl ether functionalized urethane resins

| | VFUR | | | | | |
|---|---|---|---|---|---|---|
| | InvVFUR1 | InvVFUR2 | InvVFUR3 | InvVFUR4 | InvVFUR5 | InvVFUR6 |
| Monomers first step | | | | | | |
| Dodecane dioic acid (mol) | | | | | | |
| Ethylene glycol (mol) | | | | | | |
| Diethylene glycol (mol) | | | | | | |
| Trimethylol propane (mol) | | | | | | |
| Hexane diol (mol) | 0.13 | 0.26 | 0.32 | 0.39 | 0.53 | 0.82 |
| Butane diol (mol) | | | | | | |
| 4-hydroxybutyl vinyl ether (mol) | 4.83 | 4.60 | 4.53 | 4.42 | 4.22 | 3.81 |
| Monomers second step | | | | | | |
| Hexamethylene diisocyanate (mol) | 2.52 | 2.56 | 2.58 | 2.60 | 2.64 | 2.72 |
| Total (mol) | 7.48 | 7.42 | 7.43 | 7.41 | 7.38 | 7.35 |
| Total weight (g) | 1000 | 1000 | 1000 | 1000 | 1000 | 1000 |
| Water formed during synthesis (g) | 0 | 0 | 0 | 0 | 0 | 0 |
| Weight (g) of resin produced | 1000 | 1000 | 1000 | 1000 | 1000 | 1000 |
| $R_{VFUR}$ | | | | | | |
| Theoretical | 1.05 | 1.11 | 1.14 | 1.18 | 1.25 | 1.43 |
| Measured | 1.05 | 1.14 | 1.17 | 1.19 | 1.29 | 1.44 |
| Characterisation of VFUR | | | | | | |
| Amorphous or crystalline VFUR | Cryst | Cryst | Cryst | Cryst | Cryst | Cryst |
| Theoretical values | | | | | | |
| $M_n$ (Da) | 414 | 430 | 440 | 450 | 470 | 520 |
| WPU (g/mol) | 207 | 217 | 221 | 226 | 237 | 262 |
| Measured values | | | | | | |
| WPU (g/mol) | 207 | 218 | 229 | 237 | 242 | 270 |
| $T_c$ (° C.) | 85 | 84 | 83 | 83 | 82 | 78 |
| $\Delta H_c$ (J/g) | 195 | 182 | 165 | 172 | 185 | 176 |
| $T_m$ (° C.) | 100 | 98 | 99 | 98 | 97 | 97 |
| $\Delta H_m$ (J/g) | 204 | 184 | 172 | 179 | 184 | 177 |

| | VFUR | | | | | |
|---|---|---|---|---|---|---|
| | InvVFUR7 | InvVFUR8 | InvVFUR9 | InvVFUR10 | InvVFUR11 | InvVFUR12 |
| Monomers first step | | | | | | |
| Dodecane dioic acid (mol) | | | | | | 1.13 |
| Ethylene glycol (mol) | | | | | | 1.79 |
| Diethylene glycol (mol) | | 0.53 | 0.82 | 1.14 | | |

TABLE 3-continued

| Composition and characterization of inventive crystalline vinyl ether functionalized urethane resins | | | | | | |
|---|---|---|---|---|---|---|
| Trimethylol propane (mol) | | | | | 0.56 | |
| Hexane diol (mol) | | | | | | |
| Butane diol (mol) | 0.54 | | | | | |
| 4-hydroxybutyl vinyl ether (mol) | 4.30 | 4.25 | 3.85 | 3.40 | 3.90 | 2.83 |
| Monomers second step | | | | | | |
| Hexamethylene diisocyanate (mol) | 2.68 | 2.65 | 2.75 | 2.84 | 2.78 | 1.77 |
| Total (mol) | 7.51 | 7.44 | 7.42 | 7.38 | 7.24 | 7.52 |
| Total weight (g) | 1000 | 1000 | 1000 | 1000 | 1000 | 1000 |
| Water formed during synthesis (g) | 0 | 0 | 0 | 0 | 0 | 41 |
| Weight (g) of resin produced | 1000 | 1000 | 1000 | 1000 | 1000 | 959 |
| $R_{VFUR}$ | | | | | | |
| Theoretical | 1.25 | 1.25 | 1.43 | 1.67 | 1.43 | 1.25 |
| Measured | 1.29 | 1.27 | 1.42 | 1.69 | 1.35 | 1.36 |
| Characterisation of VFUR | | | | | | |
| Amorphous or crystalline VFUR | Cryst | Cryst | Cryst | Cryst | Cryst | Cryst |
| Theoretical values | | | | | | |
| $M_n$ (Da) | 464 | 468 | 516 | 580 | 762 | 675 |
| WPU (g/mol) | 233 | 235 | 260 | 294 | 256 | 339 |
| Measured values | | | | | | |
| WPU (g/mol) | 233 | 233 | 260 | 290 | 279 | 366 |
| $T_c$ (° C.) | 81 | 74 | 68 | 66 | 66 | 61 |
| $\Delta H_c$ (J/g) | 177 | 161 | 147 | 124 | 86 | 99 |
| $T_m$ (° C.) | 97 | 91 | 91 | 89 | 94 | 74 |
| $\Delta H_m$ (J/g) | 185 | 165 | 139 | 124 | 91 | 102 |

TABLE 4

Radical initiator, flow agents, inhibitors and pigment used for the preparation of the thermosetting powder coating compositions

| Chemical name | Structure | Commercial name | Description or use |
|---|---|---|---|
| Benzoyl peroxide (BPO) | | Luperox ® A75 from Arkema | Radical initiator/ organic peroxide/ peranhydride |
| | | Byk ® 361 from Byk | Flowagent |
| | | Resiflow ® PV5 from Worlée-Chemie | Flowagent |
| Hydroquinone | | | Inhibitor |
| 2-t-butyl hydroquinone | | | Inhibitor |
| Titanium dioxide | | Kronos ® 2310 from Kronos Titan GmbH | White pigment |

TABLE 5

Comparative thermosetting powder coating compositions and powder coatings comprising a crystalline vinyl functionalized urethane resin (VFUR) as curing agent said VFUR having $R_{VFUR}$ outside the relevant claimed range.

| | CompPCC1 | CompPCC2 | CompPCC3 | CompPCC4 | CompPCC5 | CompPCC6 |
|---|---|---|---|---|---|---|
| Thermosetting powder coating composition | | | | | | |
| Unsaturated resin | UR1 | UR5 | UR1 | UR1 | UR1 | UR1 |
| (g) | 146.7 | 150.0 | 131.5 | 132.8 | 150.0 | 127.8 |
| Vinyl functionalized urethane resin | CompVFUR1 | CompVFUR1 | CompVFUR2 | CompVFUR3 | CompVFUR4 | CompVFUR5 |
| (g) | 29.9 | 30.6 | 45.2 | 43.8 | 50.3 | 48.9 |
| Peroxide Luparox ® A75 (g) | 11.4 | 11.7 | 11.4 | 11.4 | 12.9 | 11.4 |
| Inhibitor 2-t-butylhydroquinone (g) | 0.071 | 0.072 | 0.071 | 0.071 | 0.080 | 0.071 |
| Byk ® 361 (g) | | | | | | |
| Flowagent Resiflow ® PV 5 (g) | 3.53 | 3.61 | 3.53 | 3.53 | 4.01 | 3.53 |
| Pigment Kronos ® 2310 (g) | 58.3 | 59.6 | 58.3 | 58.3 | 66.1 | 58.3 |
| Amorphous or crystalline VFUR | Crystalline | Crystalline | Crystalline | Crystalline | Crystalline | Crystalline |
| $R_{VFUR}$ theoretical | 1.00 | 1.00 | 2.00 | 2.00 | 2.00 | 2.00 |
| $R_{VFUR}$ measured | 1.02 | 1.02 | 2.22 | 2.42 | 2.02 | 1.82 |
| Assesment of processability before, during and after extrusion | | | | | | |
| Processability | Poor | Poor | Very good | Very good | Very good | Very good |
| D (° C.) | 39.4 | 41.2 | 18.3 | 18.8 | 22.0 | 28.1 |
| TPCC properties | | | | | | |
| PPS 1 month (0-10, 10 = best) | 2 | 3 | 5 | 3 | 3 | 3 |
| $T_g$ (° C.) | 30 | 39 | 40 | 42 | 44 | 35 |
| Powder coating properties | CompPC1 | CompPC2 | CompPC3 | CompPC4 | CompPC5 | CompPC6 |
| Curing as mentioned in the Examples | | | | | | |
| König hardness (sec) | 186 | 216 | n.a. | n.a. | 130 | 144 |
| Adhesion (0-5, 0 = best) | 0 | n.m. | 0 | 3 | 1 | 0 |
| Direct impact on MDF (inch pounds) | 3 | 2 | 5 | 4 | 4 | 4 |
| ESP (mm) | 0.9 | 0.6 | 0.6 | 0.8 | 6.3 | 6.4 |
| Gloss 20° | 78 | 71 | n.a. | n.a. | 31 | 59 |
| Gloss 60° | 93 | 93 | n.a. | n.a. | 78 | 92 |
| Gloss haze | 112 | 219 | n.a. | n.a. | 494 | 341 |
| Smoothness (1-10, 10 = best) | 2 | 2 | 0 | 0 | 2 | 1 |
| Ethanol resistance (1-5, 5 = best) | 3 | 5 | 5 | 5 | 4 | 3 |
| Coffee resistance (1-5, 5 = best) | 4 | 4 | 2 | 2 | 3 | 2 |
| Red Wine resistance (1-5, 5 = best) | 4 | 4 | 3 | 3 | 3 | 3 |
| Aceton resistance (1-5, 5 = best) | 2 | 3 | 3 | 3 | 3 | 3 |

| | CompPCC7 | CompPCC8 | CompPCC9 | CompPCC10 | CompPCC11 |
|---|---|---|---|---|---|
| Thermosetting powder coating composition | | | | | |
| Unsaturated resin | UR4 | UR2 | UR2 | UR2 | UR1 |
| (g) | 173.3 | 135.0 | 120.0 | 138.3 | 146.7 |
| Vinyl functionalized urethane resin | CompVFUR1 | CompVFUR6 | CompVFUR7 | CompVFUR1 | CompVFUR8 |
| (g) | 76.7 | 115.0 | 130.0 | 111.7 | 29.9 |
| Peroxide Luparox ® A75 (g) | 16.1 | 16.1 | 16.1 | 16.1 | 11.4 |
| Inhibitor 2-t-butylhydroquinone (g) | 0.100 | 0.100 | 0.100 | 0.100 | 0.071 |
| Byk ® 361 (g) | 1.70 | | | | |
| Flowagent Resiflow ® PV 5 (g) | | 2.50 | 2.50 | 1.70 | 3.53 |
| Pigment Kronos ® 2310 (g) | 82.5 | 82.5 | 82.5 | 82.5 | 58.3 |
| Amorphous or crystalline VFUR | Crystalline | Crystalline | Crystalline | Crystalline | Crystalline |
| $R_{VFUR}$ theoretical | 1.00 | 2.06 | 2.07 | 1.00 | 1.00 |
| $R_{VFUR}$ measured | 1.02 | 2.62 | 2.45 | 1.02 | 0.99 |
| Assesment of processability before, during and after extrusion | | | | | |
| Processability | Poor | Poor | Poor | Poor | Poor |
| D (° C.) | n.a.b. | n.m. | n.m. | n.m. | 39.8 |
| TPCC properties | | | | | |
| PPS 1 month (0-10, 10 = best) | 2 | 6 | 7 | 1 | n.p.g. |
| $T_g$ (° C.) | 28 | 41 | 41 | 41 | n.p.g. |

TABLE 5-continued

Comparative thermosetting powder coating compositions and powder coatings comprising a crystalline vinyl functionalized urethane resin (VFUR) as curing agent said VFUR having $R_{VFUR}$ outside the relevant claimed range.

| Powder coating properties | CompPC7 | CompPC8 | CompPC9 | CompPC10 | CompPC11 |
|---|---|---|---|---|---|
| Curing as mentioned in the Examples | | | | | |
| König hardness (sec) | 175 | 88 | 25 | 17 | n.a. |
| Adhesion (0-5, 0 = best) | 1 | 1 | 1 | 1 | n.a. |
| Direct impact on MDF (inch pounds) | 5 | 14 | 10 | 12 | n.a. |
| ESP (mm) | 6.6 | 7.4 | 6.5 | 7.0 | n.a. |
| Gloss 20° | 54 | 70 | 43 | 20 | n.a. |
| Gloss 60° | 88 | 93 | 78 | 51 | n.a. |
| Gloss haze | 307 | 222 | 220 | 43 | n.a. |
| Smoothness (1-10, 10 = best) | 3 | 3 | 6 | 7 | n.a. |
| Ethanol resistance (1-5, 5 = best) | 3 | 4 | 3 | 2 | n.a. |
| Coffee resistance (1-5, 5 = best) | 3 | 2 | 2 | 2 | n.a. |
| Red Wine resistance (1-5, 5 = best) | 3 | 3 | 3 | 3 | n.a. |
| Aceton resistance (1-5, 5 = best) | 3 | 2 | 2 | 2 | n.a. |

TABLE 6

Comparative thermosetting powder coating compositions and their powder coatings comprising an amorphous vinyl functionalized urethane resin as curing agent.

| | CompPCC12 | CompPCC13 | CompPCC14 | CompPCC15 | CompPCC16 |
|---|---|---|---|---|---|
| Thermosetting powder coating composition | | | | | |
| Unsaturated resin | UR1 | UR1 | UR1 | UR1 | UR1 |
| (g) | 141.3 | 141.3 | 150.0 | 150.0 | 112.1 |
| Vinyl functionalized urethane resin | CompVFUR9 | CompVFUR10 | CompVFUR11 | CompVFUR12 | CompVFUR13 |
| (g) | 32.1 | 38.0 | 59.1 | 47.0 | 64.6 |
| Peroxide Luparox ® A75 (g) | 11.2 | 11.6 | 13.5 | 12.7 | 11.4 |
| Inhibitor 2-t-butylhydroquinone (g) | 0.069 | 0.072 | 0.084 | 0.079 | 0.071 |
| Flowagent Resiflow ® PV 5 (g) | 3.47 | 3.59 | 4.18 | 3.94 | 3.53 |
| Pigment Kronos ® 2310 (g) | 57.2 | 59.2 | 69.0 | 65.0 | 58.3 |
| Amorphous or crystalline VFUR | Amorphous | Amorphous | Amorphous | Amorphous | Amorphous |
| $R_{VFUR}$ theoretical | 1.00 | 1.25 | 2.00 | 1.25 | 2.00 |
| $R_{VFUR}$ measured | 1.01 | 1.29 | 3.56 | 1.63 | 3.29 |
| Assesment of processability before, during and after extrusion | | | | | |
| Processability | n.p.e. | n.p.e. | n.p.e. | n.p.e. | Very good |
| D (° C.) | n.a. | n.a. | n.a. | n.a. | 1.9 |
| TPCC properties | | | | | |
| PPS 1 month (0-10, 10 = best) | n.a. | n.a. | n.a. | n.a. | 6 |
| $T_g$ (° C.) | n.a. | n.a. | n.a. | n.a. | 42 |

| Powder coating properties | CompPC12 | CompPC13 | CompPC14 | CompPC15 | CompPC16 |
|---|---|---|---|---|---|
| Curing as mentioned in the Examples | | | | | |
| König hardness (sec) | n.a. | n.a. | n.a. | n.a. | 204 |
| Adhesion (0-5, 0 = best) | n.a. | n.a. | n.a. | n.a. | 4 |
| Direct impact on MDF (inch pounds) | n.a. | n.a. | n.a. | n.a. | 0 |
| ESP (mm) | n.a. | n.a. | n.a. | n.a. | 0.4 |
| Gloss 20° | n.a. | n.a. | n.a. | n.a. | 21 |
| Gloss 60° | n.a. | n.a. | n.a. | n.a. | 69 |
| Gloss haze | n.a. | n.a. | n.a. | n.a. | 527 |
| Smoothness (1-10, 10 = best) | n.a. | n.a. | n.a. | n.a. | 1 |
| Ethanol resistance (1-5, 5 = best) | n.a. | n.a. | n.a. | n.a. | 3 |
| Coffee resistance (1-5, 5 = best) | n.a. | n.a. | n.a. | n.a. | 4 |
| Red Wine resistance (1-5, 5 = best) | n.a. | n.a. | n.a. | n.a. | 3 |
| Aceton resistance (1-5, 5 = best) | n.a. | n.a. | n.a. | n.a. | 3 |

TABLE 7

Inventive thermosetting powder coating compositions and powder coatings comprising a crystalline vinyl functionalized urethane resin (VFUR) as curing agent, said VFUR having $R_{VFUR}$ within the relevant claimed range.

| | InvPCC1 | InvPCC2 | InvPCC3 | InvPCC4 | InvPCC5 | InvPCC6 | InvPCC7 |
|---|---|---|---|---|---|---|---|
| Thermosetting powder coating composition | | | | | | | |
| Unsaturated resin | UR1 | UR1 | UR1 | UR1 | UR1 | UR5 | UR1 |
| (g) | 146.4 | 150.0 | 150.0 | 150.0 | 150.0 | 150.0 | 150.0 |
| Vinyl functionalized urethane resin | InvVFUR1 | InvVFUR2 | InvVFUR3 | InvVFUR4 | InvVFUR5 | InvVFUR5 | InvVFUR6 |
| (g) | 30.3 | 32.3 | 33.0 | 33.8 | 35.3 | 35.3 | 39.0 |
| Luparox ® A75 (g) | 11.4 | 11.8 | 11.8 | 11.9 | 12.0 | 12.0 | 12.2 |
| 2-t-butylhydroquinone (g) | 0.071 | 0.073 | 0.073 | 0.074 | 0.074 | 0.074 | 0.076 |
| Hydroquinone (g) | | | | | | | |
| Resiflow ® PV 5 (g) | 3.53 | 3.65 | 3.66 | 3.68 | 3.71 | 3.71 | 3.78 |
| Kronos ® 2310 (g) | 58.3 | 60.1 | 60.4 | 60.6 | 61.1 | 61.1 | 62.4 |
| Amorphous or crystalline VFUR | Crystalline | Crystalline | Crystalline | Crystalline | Crystalline | Crystalline | Crystalline |
| $R_{VFUR}$ theoretical | 1.05 | 1.11 | 1.14 | 1.18 | 1.25 | 1.25 | 1.43 |
| $R_{VFUR}$ measured | 1.05 | 1.14 | 1.17 | 1.19 | 1.29 | 1.29 | 1.44 |
| Assesment of processability before, during and after extrusion | | | | | | | |
| Processability | Very good | Very good | Very good | Very good | Very good | Very good | Very good |
| D (° C.) | 22.4 | 18.8 | 21.3 | 22.3 | 21.8 | 22.8 | 19.8 |
| TPCC properties | | | | | | | |
| PPS 1 month (0-10, 10 = best) | 5 | 6 | 6 | 5 | 6 | 5 | 7 |
| $T_g$ (° C.) | 34 | 35 | 33 | 32 | 41 | 41 | 41 |
| Powder coating properties | InvPC1 | InvPC2 | InvPC3 | InvPC4 | InvPC5 | InvPC6 | InvPC7 |
| Curing as mentioned in the Examples | | | | | | | |
| König hardness (sec) | 185 | 176 | 181 | 176 | 174 | 197 | 64 |
| Adhesion (0-5, 0 = best) | 1 | 0 | 0 | 0 | 1 | 0 | 1 |
| Direct impact on MDF (inch pounds) | 2 | 6 | 4 | 3 | 4 | 2 | 3 |
| ESP (mm) | 7 | 1.9 | 6.2 | 6.5 | 3.5 | 0.4 | 0.4 |
| Gloss 20° | 73 | 51 | 65 | 61 | 47 | 53 | 1 |
| Gloss 60° | 92 | 89 | 90 | 91 | 88 | 91 | 5 |
| Gloss haze | 131 | 408 | 220 | 270 | 415 | 421 | 9 |
| Smoothness (1-10, 10 = best) | 2 | 3 | 2 | 2 | 2 | 2 | 1 |
| Ethanol resistance (1-5, 5 = best) | 3 | 4 | 4 | 4 | 4 | 5 | 5 |
| Coffee resistance (1-5, 5 = best) | 3 | 3 | 4 | 4 | 3 | 4 | 3 |
| Red Wine resistance (1-5, 5 = best) | 4 | 4 | 4 | 4 | 4 | 4 | 3 |
| Aceton resistance (1-5, 5 = best) | 2 | 3 | 3 | 3 | 3 | 3 | 3 |

| | InvPCC8 | InvPCC9 | InvPCC10 | InvPCC11 | InvPCC12 | InvPCC13 | InvPCC14 | InvPCC15 |
|---|---|---|---|---|---|---|---|---|
| Thermosetting powder coating composition | | | | | | | | |
| Unsaturated resin | UR1 | UR1 | UR1 | UR1 | UR1 | UR2 | UR3 | UR3 |
| (g) | 150.0 | 150.0 | 150.0 | 150.0 | 150.0 | 78.5 | 300.0 | 300.0 |
| Vinyl functionalized urethane resin | InvVFUR7 | InvVFUR8 | InvVFUR9 | InvVFUR10 | InvVFUR11 | InvVFUR12 | InvVFUR5 | InvVFUR8 |
| (g) | 34.8 | 35.1 | 38.7 | 43.5 | 38.1 | 26.5 | 129.1 | 128.6 |
| Luparox ® A75 (g) | 11.9 | 11.9 | 12.2 | 12.5 | 12.1 | 6.8 | 13.8 | 13.8 |
| 2-t-butylhydroquinone (g) | 0.074 | 0.074 | 0.075 | 0.077 | 0.075 | 0.042 | | |
| Hydroquinone (g) | | | | | | | 0.300 | 0.300 |
| Resiflow ® PV 5 (g) | 3.70 | 3.70 | 3.77 | 3.87 | 3.76 | 2.10 | 8.58 | 8.57 |
| Kronos ® 2310 (g) | 61.0 | 61.1 | 62.3 | 63.9 | 62.1 | 34.6 | 128.7 | 128.6 |
| Amorphous or crystalline VFUR | Crystalline | Crystalline | Crystalline | Crystalline | Crystalline | Crystalline | Crystalline | Crystalline |
| $R_{VFUR}$ theoretical | 1.25 | 1.25 | 1.43 | 1.67 | 1.43 | 1.25 | 1.25 | 1.25 |
| $R_{VFUR}$ measured | 1.29 | 1.27 | 1.42 | 1.69 | 1.35 | 1.36 | 1.29 | 1.27 |
| Assesment of processability before, during and after extrusion | | | | | | | | |
| Processability | Very good | Very good | Very good | Very good | Very good | Very good | Very good | Very good |
| D (° C.) | 18.9 | 35.0 | 24.3 | 23.3 | 31.9 | n.m. | 30.3 | 33.6 |
| TPCC properties | | | | | | | | |
| PPS 1 month (0-10, 10 = best) | 7 | 6 | 6 | 6 | 5 | 5 | 8 | 8 |
| $T_g$ (° C.) | 40 | 47 | 41 | 41 | 32 | 29 | 42 | 40 |

TABLE 7-continued

Inventive thermosetting powder coating compositions and powder coatings comprising a crystalline vinyl functionalized urethane resin (VFUR) as curing agent, said VFUR having $R_{VFUR}$ within the relevant claimed range.

| Powder coating properties | InvPC8 | InvPC9 | InvPC10 | InvPC11 | InvPC12 | InvPC13 | InvPC14 | InvPC15 |
|---|---|---|---|---|---|---|---|---|
| Curing as mentioned in the Examples | | | | | | | | |
| König hardness (sec) | 125 | 172 | 150 | 130 | 168 | 140 | 168 | 162 |
| Adhesion (0-5, 0 = best) | 1 | 1 | 1 | 1 | 1 | 0 | 1 | 1 |
| Direct impact on MDF (inch pounds) | 5 | 6 | 6 | 6 | 3 | 2 | 2 | 2 |
| ESP (mm) | 2.8 | 4.5 | 6 | 5.8 | 0.8 | 2 | n.m. | n.m. |
| Gloss 20° | 6 | 58 | 63 | 33 | 71 | 78 | 57 | 49 |
| Gloss 60° | 32 | 88 | 87 | 81 | 92 | 91 | 90 | 89 |
| Gloss haze | 237 | 228 | 142 | 469 | 166 | 82 | 92 | 200 |
| Smoothness (1-10, 10 = best) | 1 | 3 | 4 | 2 | 3 | 5 | 3 | 4 |
| Ethanol resistance (1-5, 5 = best) | 5 | 3 | 3 | 3 | 4 | 4 | 5 | 5 |
| Coffee resistance (1-5, 5 = best) | 4 | 4 | 3 | 3 | 3 | 3 | 4 | 4 |
| Red Wine resistance (1-5, 5 = best) | 4 | 3 | 3 | 3 | 3 | 3 | 3 | 3 |
| Aceton resistance (1-5, 5 = best) | 3 | 3 | 3 | 3 | 3 | 3 | 3 | 3 |

TABLE 8

Inventive thermosetting powder coating compositions InvPCC14 and InvPCC15 and their powder coatings comprising a crystalline vinyl functionalized urethane resin (VFUR) as curing agent, said VFUR having $R_{VFUR}$ within the relevant claimed range; The powder coatings of these thermosetting powder coating compositions were produced as described in Examples/b. Preparation of InvPC14-15 via powder-in-mould-coating process.

| | InvPCC14 | InvPCC15 |
|---|---|---|
| Thermosetting powder coating composition | | |
| Unsaturated resin | UR3 | UR3 |
| (g) | 300.0 | 300.0 |
| Vinyl functionalized urethane resin | InvVFUR5 | InvVFUR8 |
| (g) | 129.1 | 128.6 |
| Peroxide Luparox ® A75 (g) | 13.8 | 13.8 |
| Inhibitor Hydroquinone (g) | 0.300 | 0.300 |
| Flowagent Resiflow ® PV 5 (g) | 8.58 | 8.57 |
| Pigment Kronos ® 2310 (g) | 128.7 | 128.6 |
| Amorphous or crystalline VFUR | Crystalline | Crystalline |
| RVFUR theoretical | 1.25 | 1.25 |
| RVFUR measured | 1.29 | 1.27 |
| Assesment of processability before, during and after extrusion | | |
| Processability | Very good | Very good |
| D (° C.) | 30.3 | 33.6 |
| Powder coating properties | InvPC14 | InvPC15 |
| Curing a mentioned in the Examples | | |
| Scratch resistance (N) | 7 | 7 |

Examples of crystalline vinyl functionalized urethane resins having a $R_{VFUR}$ outside the relevant claimed range (comparative examples) used as a curing agent in thermosetting powder coating compositions, are given Table 5. As it can be seen from the comparative Examples in Table 5 most of said comparative compositions demonstrated poor processability (CompPCC1, CompPCC2, CompPCC7-12) whilst the ones who demonstrated good processability (CompPCC3-6), had either at least poor storage stability (<5) (CompPCC4-6), or at least unacceptable smoothness (<1) (CompPCC3-4), or poor coffee resistance (<3) (CompPCC3-4 and CompPCC6). Thus, it is clear that none of the comparative Examples of Table 5 combined enhanced processability with good storage stability, good smoothness, good coffee resistance.

Uracross® P3307 was used as a curing agent in the comparative thermosetting powder coating compositions CompPCC1, CompPCC2, CompPCC7, CompPCC10. Uracross® P3307 is an example of a crystalline solid vinyl functionalized urethane resin which is a vinyl ether terminated urethane resin that does not read on the vinyl functionalized urethane resin of the invention since it has a $R_{VRUF}$ equal to 1.02 that is outside the claimed range of $R_{VRUF}$ for the VFUR of the invention. The processability of all these comparative thermosetting powder coating compositions comprising Uracross® P3307 as a curing agent was poor since upon extrusion the composition was sticky (on the cooling rollers), was difficult to flake (poor flaking) and it was hard to grind and sieve (poor grinding and sieving). In addition the storage stability of all these comparative thermosetting powder coating compositions comprising Uracross® P3307 as a curing agent was poor (<5) and furthermore all these comparative compositions had a D value of higher than 35° C. Moreover, CompPCC1 and CompPCC10 failed also on acetone resistance whilst CompPCC10 failed further on coffee resistance (<3).

Examples of amorphous vinyl functionalized urethane resins (comparative examples) used as a curing agent in thermosetting powder coating compositions, are given Table 6. As it can be seen from the comparative Examples in Table 6 almost all powder coatings comprising an amorphous VFUR (see CompPCC13-16) failed in processability since these compositions failed during pre-mixing, thus it was not even possible to extrude/prepare these compositions as a consequence of stickiness, flaking, grinding and sieving as well the D values were not assessed/measured; the CompPCC16 which had good processability had no flexibility (i.e., direct impact resistance equal to 0 inch pounds). Thus, it is clear that none of the comparative Examples of Table 6 combined enhanced processability with good flexibility.

In addition, upon comparing the properties of the comparative thermosetting powder coating compositions and those of their corresponding powder coatings of Table 5 (comparative crystalline VFUR as explained herein) with the properties of the comparative thermosetting powder coating compositions and those of their corresponding powder coatings of Table 6 (amorphous VFUR as explained herein), it is was found that when amorphous vinyl ether functionalized urethane resins were used in thermosetting powder coating compositions said powder coating compositions and their powder coatings presented inferior coating film properties such as smoothness and/or flexibility in comparison to the coating film properties of powder coating compositions and their powder coatings obtained compositions comprising (comparative) crystalline vinyl ether functionalized urethane resins.

Examples of crystalline vinyl functionalized urethane resins having a $R_{VFUR}$ within the relevant claimed range (inventive examples) used as a curing agent in thermosetting powder coating compositions, are given Table 7. As it can be seen from the inventive examples in Table 7, all said inventive compositions had enhanced processability, good storage stability, acceptable smoothness, good flexibility, good coffee resistance.

Examples of inventive thermosetting powder coating compositions InvPCC14 and InvPCC15 and their powder coatings comprising a crystalline vinyl functionalized urethane resin (VFUR) as curing agent, said VFUR having $R_{VFUR}$ within the relevant claimed range are presented in Table 8. The powder coatings of these thermosetting powder coating compositions were produced as described in Examples/b. Preparation of InvPC14-15 via the powder-in-mould-coating process. As can be seen from Table 8, the inventive thermosetting powder coating compositions had good scratch resistance (>1 N).

Therefore, as can be seen from the Examples in Tables 5, 6, 7 and 8, thermosetting powder coating compositions having enhanced processability, good storage stability and once cured provided powder coatings having acceptable smoothness, good flexibility, good coffee resistance, good scratch resistance, can only be prepared from a thermosetting powder coating composition comprising a VFUR and/or a VFURC according to claim 1.

The invention claimed is:

1. A vinyl functionalized urethane resin (VFUR) wherein the VFUR is crystalline having a melting enthalpy measured via Differential Scanning calorimetry, of at least 35 J/g; and
the VFUR has a ratio ($R_{VFUR}$) of urethane bonds in the VFUR to vinyl groups in the VFUR as measured by $^1$H-NMR spectroscopy of at least 1.04 and at most 1.80.
2. The VFUR according to claim 1, wherein the VFUR is prepared from:
   (A) at least a compound A comprising isocyanate groups;
   (B) at least a compound B comprising hydroxyl groups, wherein the compound B is selected from compounds in the group consisting of compounds comprising vinyl ether groups (VET), compounds comprising vinyl ester groups (VES), and compounds comprising vinyl ether and vinyl ester groups (VET-VES); and
   (C) at least one organic compound C comprising hydroxyl groups.
3. The VFUR according to claim 2, wherein the compound B is selected from the group consisting of compounds comprising vinyl ether groups (VET) and compounds comprising vinyl ester groups (VES).
4. The VFUR according to claim 2, wherein the compound B is a compound comprising vinyl ether groups (VET).
5. The VFUR according to claim 4, wherein the compound B is a vinyl ether alcohol.
6. The VFUR according to claim 1, wherein the VFUR has a $R_{VFUR}$ of at least 1.06 and of at most 1.80.
7. The VFUR according to claim 1, wherein the VFUR has a $R_{VFUR}$ of at least 1.10 and of at most 1.80.
8. The VFUR according to claim 1, wherein the VFUR has a $R_{VFUR}$ of at least 1.10 and of at most 1.71.
9. The VFUR according to claim 1, wherein the VFUR has a $R_{VFUR}$ of at least 1.18 and of at most 1.45.
10. The VFUR according to claim 5, wherein the VFUR has a $R_{VFUR}$ of at least 1.06 and of at most 1.80.
11. The VFUR according to claim 5, wherein the VFUR has a $R_{VFUR}$ of at least 1.10 and of at most 1.80.
12. The VFUR according to claim 5, wherein the VFUR has a $R_{VFUR}$ of at least 1.10 and of at most 1.71.
13. The VFUR according to claim 5, wherein the VFUR has a $R_{VFUR}$ of at least 1.18 and of at most 1.45.
14. The VFUR according to claim 1, wherein the VFUR is solid at 23° C. and at atmospheric pressure.
15. The VFUR according to claim 2, wherein the VFUR is solid at 23° C. and at atmospheric pressure.
16. The VFUR according to claim 3, wherein the VFUR is solid at 23° C. and at atmospheric pressure.
17. The VFUR according to claim 4, wherein the VFUR is solid at 23° C. and at atmospheric pressure.
18. The VFUR according to claim 5, wherein the VFUR is solid at 23° C. and at atmospheric pressure.
19. The VFUR according to claim 6, wherein the VFUR is solid at 23° C. and at atmospheric pressure.
20. The VFUR according to claim 7, wherein the VFUR is solid at 23° C. and at atmospheric pressure.
21. The VFUR according to claim 8, wherein the VFUR is solid at 23° C. and at atmospheric pressure.
22. The VFUR according to claim 9, wherein the VFUR is solid at 23° C. and at atmospheric pressure.
23. The VFUR according to claim 10, wherein the VFUR is solid at 23° C. and at atmospheric pressure.
24. The VFUR according to claim 11, wherein the VFUR is solid at 23° C. and at atmospheric pressure.
25. The VFUR according to claim 12, wherein the VFUR is solid at 23° C. and at atmospheric pressure.
26. The VFUR according to claim 13, wherein the VFUR is solid at 23° C. and at atmospheric pressure.
27. A process for making the VFUR as defined in claim 1, wherein the process comprises the step of reacting a compound A which comprises isocyanate groups with a compound B comprising hydroxyl groups and an organic compound C, wherein the compound B is selected from the group of compounds consisting of compounds comprising vinyl ether groups (VET), compounds comprising vinyl ester groups (VES), and compounds comprising vinyl ether and vinyl ester groups (VET-VES), and wherein the organic compound C comprises hydroxyl groups to form the VFUR, or alternatively
the process comprises the steps of:
   (i) reacting the compound A with the organic compound C to form an isocyanate terminated adduct of the compound A with the organic compound C, and
   (ii) reacting the isocyanate terminated adduct of the compound A with the organic compound C obtained in step (i) with the compound B to form the VFUR.
28. The process according to claim 27, wherein the compound B is a vinyl ether alcohol.
29. The process according to claim 27, wherein the VFUR is solid at 23° C. and at atmospheric pressure.
30. The process according to claim 27, wherein the VFUR is solid at 23° C. and at atmospheric pressure, and the compound B is a vinyl ether alcohol.
31. A vinyl functionalized urethane resin composition (VFURC) comprising at least a first vinyl functionalized urethane resin (FVFUR) and a second vinyl functionalized urethane resin (SVFUR), wherein either the FVFUR or the SVFUR is a VFUR according to claim 1, and wherein the VFURC is crystalline having a melting enthalpy measured via Differential Scanning calorimetry, of at least 35 J/g; and the VFURC has a ratio ($R_{VFURC}$) of urethane bonds in the VFURC to vinyl groups in the VFURC as measured by $^1$H-NMR spectroscopy of at least 1.04 and at most 1.80.

32. A vinyl functionalized urethane resin composition (VFURC) comprising at least a first vinyl functionalized urethane resin (FVFUR) and a second vinyl functionalized urethane resin (SVFUR), wherein each of the FVUR and the SVFUR is a VFUR according to claim 1, and wherein the VFURC is crystalline having a melting enthalpy measured via Differential Scanning calorimetry, of at least 35 J/g; and the VFURC has a ratio ($R_{VFURC}$) of urethane bonds in the VFURC to vinyl groups in the VFURC as measured by $^1$H-NMR spectroscopy of at least 1.04 and at most 1.80.

33. A vinyl functionalized urethane resin composition (VFURC) comprising at least a first vinyl functionalized urethane resin (FVFUR) and a second vinyl functionalized urethane resin (SVFUR), wherein either the FVFUR or the SVFUR is a VFUR according to claim 6 wherein the compound B is a vinyl ether alcohol and the VFUR is solid at 23° C. and at atmospheric pressure, and wherein the VFURC is crystalline having a melting enthalpy measured via Differential Scanning calorimetry, of at least 35 J/g; and the VFURC has a ratio ($R_{VFURC}$) of urethane bonds in the VFURC to vinyl groups in the VFURC as measured by $^1$H-NMR spectroscopy of at least 1.04 and at most 1.80, and.

34. A vinyl functionalized urethane resin composition (VFURC) comprising at least a first vinyl functionalized urethane resin (FVFUR) and a second vinyl functionalized urethane resin (SVFUR), wherein either the FVFUR or the SVFUR is a VFUR according to claim 7 wherein the compound B is a vinyl ether alcohol and the VFUR is solid at 23° C. and at atmospheric pressure, and wherein the VFURC is crystalline having a melting enthalpy measured via Differential Scanning calorimetry, of at least 35 J/g; and the VFURC has a has a ratio ($R_{VFURC}$) of urethane bonds in the VFURC to vinyl groups in the VFURC as measured by $^1$H-NMR spectroscopy of at least 1.04 and at most 1.80, and.

35. A vinyl functionalized urethane resin composition (VFURC) comprising at least a first vinyl functionalized urethane resin (FVFUR) and a second vinyl functionalized urethane resin (SVFUR), wherein either the FVFUR or the SVFUR is a VFUR according to claim 8 wherein the compound B is a vinyl ether alcohol and the VFUR is solid at 23° C. and at atmospheric pressure, and wherein the VFURC is crystalline having a melting enthalpy measured via Differential Scanning calorimetry, of at least 35 J/g; and the VFURC has a ratio ($R_{VFURC}$) of urethane bonds in the VFURC to vinyl groups in the VFURC as measured by $^1$H-NMR spectroscopy of at least 1.04 and at most 1.80, and.

36. A vinyl functionalized urethane resin composition (VFURC) comprising at least a first vinyl functionalized urethane resin (FVFUR) and a second vinyl functionalized urethane resin (SVFUR), wherein either the FVFUR or the SVFUR is a VFUR according to claim 9 wherein the compound B is a vinyl ether alcohol and the VFUR is solid at 23° C. and at atmospheric pressure, and wherein the VFURC is crystalline having a melting enthalpy measured via Differential Scanning calorimetry, of at least 35 J/g; and the VFURC has a ratio ($R_{VFURC}$) of urethane bonds in the VFURC to vinyl groups in the VFURC as measured by $^1$H-NMR spectroscopy of at least 1.04 and at most 1.80.

37. A thermosetting powder coating composition comprising:

(i) a VFUR as defined in claim 1 and/or a vinyl functionalized urethane resin composition (VFURC) comprising at least a first vinyl functionalized urethane resin (FVFUR) and a second vinyl functionalized urethane resin (SVFUR), and (ii) an unsaturated resin comprising ethylenic unsaturations, and wherein at least one of the FVFUR or the SVFUR is crystalline having a melting enthalpy measured via Differential Scanning calorimetry, of at least 35 J/g;

the VFURC is crystalline having a melting enthalpy measured via Differential Scanning calorimetry, of at least 35 J/g; and the VFURC has a ratio ($R_{VFURC}$) of urethane bonds in the VFURC to vinyl groups in the VFURC as measured by $^1$H-NMR spectroscopy of at least 1.04 and at most 1.80.

38. The thermosetting powder coating composition according to claim 37, wherein the ethylenic unsaturations are di-acid ethylenic unsaturations.

39. The thermosetting powder coating composition according to claim 38, wherein the di-acid ethylenic unsaturations are 2-butenedioic acid ethylenic unsaturations.

40. The thermosetting powder coating composition according to claim 38, wherein the unsaturated resin comprising ethylenic unsaturations is selected from the group consisting of polyester resins, acrylic resins, polyurethanes, epoxy resins, polyamides, polyesteramides, polycarbonates, polyureas and combinations thereof.

41. The thermosetting powder coating composition according to claim 37, wherein the unsaturated resin comprising ethylenic unsaturations is an unsaturated polyester resin comprising 2-butenedioic acid ethylenic unsaturations.

42. The thermosetting powder coating composition according to claim 37, wherein the composition further comprises a radical initiator and optionally at least one of a) an accelerator, b) a co-accelerator and c) an inhibitor.

43. A thermosetting powder coating composition comprising:

(i) a vinyl functionalized urethane resin (VFUR) as defined in claim 6 which is solid at 23° C. and at atmospheric pressure and/or a vinyl functionalized urethane resin composition (VFURC) comprising at least a first vinyl functionalized urethane resin (FVFUR) and a second vinyl functionalized urethane resin (SVFUR), (ii) an unsaturated resin comprising di-acid ethylenic unsaturations, (iii) a radical initiator, and (iv) an inhibitor, wherein at least one of the FVFUR or the SVFUR is crystalline having a melting enthalpy measured via Differential Scanning calorimetry, of at least 35 J/g;

the VFURC is crystalline having a melting enthalpy measured via Differential Scanning calorimetry, of at least 35 J/g; and the VFURC has a ratio ($R_{VFURC}$) of urethane bonds in the VFURC to vinyl groups in the VFURC as measured by $^1$H-NMR spectroscopy of at least 1.04 and at most 1.80.

44. A thermosetting powder coating composition comprising:
(i) a vinyl functionalized urethane resin (VFUR) as defined in claim 7 which is solid at 23° C. and at atmospheric pressure and/or a vinyl functionalized urethane resin composition (VFURC) comprising at least a first vinyl functionalized urethane resin (FVFUR) and a second vinyl functionalized urethane resin (SVFUR),
(ii) an unsaturated resin comprising di-acid ethylenic unsaturations,
(iii) a radical initiator, and
(iv) an inhibitor, wherein
at least one of the FVFUR or the SVFUR is crystalline having a melting enthalpy measured via Differential Scanning calorimetry, of at least 35 J/g;
the VFURC is crystalline having a melting enthalpy measured via Differential Scanning calorimetry, of at least 35 J/g; and
the VFURC has a ratio ($R_{VFURC}$) of urethane bonds in the VFURC to vinyl groups in the VFURC as measured by $^1$H-NMR spectroscopy of at least 1.04 and at most 1.80.

45. A thermosetting powder coating composition comprising:
(i) a vinyl functionalized urethane resin (VFUR) as defined in claim 8 which is solid at 23° C. and at atmospheric pressure and/or a vinyl functionalized urethane resin composition (VFURC) comprising at least a first vinyl functionalized urethane resin (FVFUR) and a second vinyl functionalized urethane resin (SVFUR),
(ii) an unsaturated resin comprising di-acid ethylenic unsaturations,
(iii) a radical initiator, and
(iv) an inhibitor, wherein
at least one of the FVFUR or the SVFUR is crystalline having a melting enthalpy measured via Differential Scanning calorimetry, of at least 35 J/g;
the VFURC is crystalline having a melting enthalpy measured via Differential Scanning calorimetry, of at least 35 J/g; and
the VFURC has a ratio ($R_{VFURC}$) of urethane bonds in the VFURC to vinyl groups in the VFURC as measured by $^1$H-NMR spectroscopy of at least 1.04 and at most 1.80.

46. A thermosetting powder coating composition comprising:
(i) a vinyl functionalized urethane resin (VFUR) as defined in claim 9 which is solid at 23° C. and at atmospheric pressure and/or a vinyl functionalized urethane resin composition (VFURC) comprising at least a first vinyl functionalized urethane resin (FVFUR) and a second vinyl functionalized urethane resin (SVFUR),
(ii) an unsaturated resin comprising di-acid ethylenic unsaturations,
(iii) a radical initiator, and
(iv) an inhibitor, wherein
at least one of the FVFUR or the SVFUR is crystalline having a melting enthalpy measured via Differential Scanning calorimetry, of at least 35 J/g;
the VFURC is crystalline having a melting enthalpy measured via Differential Scanning calorimetry, of at least 35 J/g; and
the VFURC has a ratio ($R_{VFURC}$) of urethane bonds in the VFURC to vinyl groups in the VFURC as measured by $^1$H-NMR spectroscopy of at least 1.04 and at most 1.80.

47. A process for making a thermosetting powder coating composition as defined in claim 37 comprising the steps of:
(a) mixing the components (i)-(ii) of the thermosetting powder coating composition to obtain a premix;
(b) heating the premix in an extruder, to obtain an extrudate;
(c) cooling the extrudate to obtain a solidified extrudate; and
(d) grinding the solidified extrudate into smaller particles to obtain the thermosetting powder coating composition.

48. The thermosetting powder coating composition of claim 37 which is cured.

49. The thermosetting powder coating composition of claim 38 which is cured.

50. The thermosetting powder coating composition of claim 39 which is cured.

51. The thermosetting powder coating composition of claim 40 which is cured.

52. The thermosetting powder coating composition of claim 41 which is cured.

53. The thermosetting powder coating composition of claim 42 which is cured.

54. The thermosetting powder coating composition of claim 43 which is cured.

55. The thermosetting powder coating composition of claim 44 which is cured.

56. The thermosetting powder coating composition of claim 45 which is cured.

57. The thermosetting powder coating composition of claim 46 which is cured.

58. An article having coated and cured thereon the thermosetting powder coating composition as defined in claim 37.

59. An article having coated and cured thereon the thermosetting powder coating composition as defined in claim 38.

60. An article having coated and cured thereon the thermosetting powder coating composition as defined in claim 42.

61. An article having coated and cured thereon the thermosetting powder coating composition as defined in claim 43.

62. An article having coated and cured thereon the thermosetting powder coating composition as defined in claim 44.

63. An article having coated and cured thereon the thermosetting powder coating composition as defined in claim 45.

64. An article having coated and cured thereon the thermosetting powder coating composition as defined in claim 46.

65. The article according to claim 58, wherein the article is selected from the group consisting of heat-sensitive articles and non-heat sensitive articles.

66. An article according to claim 65, wherein the article is selected from the group consisting of wood, low density fibre board, medium density fibreboard, high density fibreboard, plastic, thermoplastic composite, thermoset composite, fibre reinforced composites, sandwich materials, metal and combinations thereof.

67. A process for making a coated article comprising the steps of:
(i) applying the thermosetting powder coating composition as defined in claim 37 to an article which is selected from the group consisting of articles comprising heat-sensitive components, articles comprising non-heat sensitive components and articles comprising a combination of heat-sensitive and non-heat sensitive components; and (ii) heating and/or irradiating the thermosetting powder coating composition applied to the article for enough time and at a suitable temperature to cure the thermosetting powder coating composition to obtain the coated article.

68. A process for making a coated article comprising the steps of:
(i) applying the thermosetting powder coating composition as defined in claim 42 to an article which is selected from the group consisting of articles comprising heat-sensitive components, articles comprising non-heat sensitive components and articles comprising a combination of heat-sensitive and non-heat sensitive components; and
(ii) heating and/or irradiating the thermosetting powder coating composition applied to the article for enough time and at a suitable temperature to cure the thermosetting powder coating composition to obtain the coated article.

69. A process for making a coated article comprising the steps of:
(i) applying a thermosetting powder coating composition as defined in claim 37 to the interior wall of a mould;
(ii) subsequently introducing a fill compound in the mould in order for the fill compound to form an article within the mould, wherein the article is selected from the group consisting of articles comprising heat-sensitive components, articles comprising non-heat sensitive components and articles comprising a combination of heat-sensitive and non-heat sensitive components; and
(iii) heating and/or irradiating the thermosetting powder coating composition and optionally also the fill compound to obtain the coated article.

70. A vinyl functionalized urethane resin composition (VFURC) comprising at least a first vinyl functionalized urethane resin (FVFUR) and a second vinyl functionalized urethane resin (SVFUR), wherein
at least one of the FVFUR and the SVFUR is crystalline having a melting enthalpy measured via Differential Scanning calorimetry, of at least 35 J/g;
the VFURC is crystalline having a melting enthalpy measured via Differential Scanning calorimetry, of at least 35 J/g; and
the VFURC has a ratio ($R_{VFURC}$) of urethane bonds in the VFURC to vinyl groups in the VFURC as measured by $^1$H-NMR spectroscopy of at least 1.04 and at most 1.80.

71. The VFURC according to claim 70, wherein at least one of the FVFUR and the SVFUR is prepared from:
(A) at least a compound A comprising isocyanate groups;
(B) at least a compound B comprising hydroxyl groups, wherein the compound B is selected from compounds in the group consisting of compounds comprising vinyl ether groups (VET), compounds comprising vinyl ester groups (VES), and compounds comprising vinyl ether and vinyl ester groups (VET-VES); and
(C) at least one organic compound C comprising hydroxyl groups.

72. The VFURC according to claim 70, wherein the VFURC has a $R_{VFURC}$ of at least 1.06 and of at most 1.80.

73. The VFURC according to claim 70, wherein the VFURC has a $R_{VFURC}$ of at least 1.10 and of at most 1.80.

74. The VFURC according to claim 70, wherein the VFURC has a $R_{VFURC}$ of at least 1.10 and of at most 1.71.

75. The VFURC according to claim 70, wherein the VFURC has a $R_{VFURC}$ of at least 1.18 and of at most 1.45.

76. A process for making a VFURC as defined in claim 70, the process comprising the steps of:
(i) providing the FVFUR;
(ii) providing the SVFUR;
(iii) mixing the FVFUR and SVFUR together to obtain the VFURC.

77. A process for making the VFURC as defined in claim 70, the process comprising making either the FVFUR or the SVFUR by reacting a compound A which comprises isocyanate groups, with a compound B comprising hydroxyl groups and an organic compound C, wherein the compound B is selected from the group of compounds consisting of compounds comprising vinyl ether groups (VET), compounds comprising vinyl ester groups (VES), and compounds comprising vinyl ether and vinyl ester groups (VET-VES), and wherein the organic compound C comprises hydroxyl groups to form the FVFUR or the SVFUR, or alternatively
the process comprises the steps of:
(i) reacting the compound A with the organic compound C to form an isocyanate terminated adduct of the compound A with the organic compound C, and
(ii) reacting the isocyanate terminated adduct of the compound A with the organic compound C obtained in step (i) with the compound B to form the FVFUR or the SVFUR.

78. A vinyl functionalized urethane resin composition (VFURC) comprising at least a first vinyl functionalized urethane resin (FVFUR) and a second vinyl functionalized urethane resin (SVFUR), wherein either the FVFUR or the SVFUR is a VFUR according to claim 5 and the VFUR is solid at 23° C. and at atmospheric pressure, and wherein
the VFURC is crystalline having a melting enthalpy measured via Differential Scanning calorimetry, of at least 35 J/g; and
the VFURC has a ratio ($R_{VFURC}$) of urethane bonds in the VFURC to vinyl groups in the VFURC as measured by $^1$H-NMR spectroscopy of at least 1.04 and at most 1.80, and.

79. A thermosetting powder coating composition comprising:
(i) a vinyl functionalized urethane resin (VFUR) as defined in claim 5 which is solid at 23° C. and at atmospheric pressure and/or a vinyl functionalized urethane resin composition (VFURC) comprising at least a first vinyl functionalized urethane resin (FVFUR) and a second vinyl functionalized urethane resin (SVFUR),
(ii) an unsaturated resin comprising di-acid ethylenic unsaturations,
(iii) a radical initiator, and
(iv) an inhibitor, wherein
at least one of the FVFUR or the SVFUR is crystalline having a melting enthalpy measured via Differential Scanning calorimetry, of at least 35 J/g;
the VFURC is crystalline having a melting enthalpy measured via Differential Scanning calorimetry, of at least 35 J/g; and
the VFURC has a ratio ($R_{VFURC}$) of urethane bonds in the VFURC to vinyl groups in the VFURC as measured by $^1$H-NMR spectroscopy of at least 1.04 and at most 1.80.

80. The thermosetting powder coating composition of claim 79 which is cured.

81. An article having coated and cured thereon the thermosetting powder coating composition as defined in claim 79.

82. A process for making a coated article comprising the steps of:
(i) applying the thermosetting powder coating composition as defined in claim 79 to an article which is selected from the group consisting of articles comprising heat-sensitive components, articles comprising non-heat sensitive components and articles comprising a combination of heat-sensitive and non-heat sensitive components; and
(ii) heating and/or irradiating the thermosetting powder coating composition applied to the article for enough time and at a suitable temperature to cure the thermosetting powder coating composition to obtain the coated article.

* * * * *